US012691436B2

(12) United States Patent
Nagaoka et al.

(10) Patent No.: US 12,691,436 B2
(45) Date of Patent: Jul. 28, 2026

(54) AMMONIA SYNTHESIS CATALYST

(71) Applicant: Japan Science and Technology Agency, Kawaguchi (JP)

(72) Inventors: Katsutoshi Nagaoka, Nagoya (JP); Yuta Ogura, Nagoya (JP); Katsutoshi Sato, Nagoya (JP); Shin-ichiro Miyahara, Nagoya (JP)

(73) Assignee: Japan Science and Technology Agency, Kawaguchi (JP)

( * ) Notice: Subject to any disclaimer, the term of this patent is extended or adjusted under 35 U.S.C. 154(b) by 672 days.

(21) Appl. No.: 17/796,478

(22) PCT Filed: Jan. 29, 2021

(86) PCT No.: PCT/JP2021/003257
§ 371 (c)(1),
(2) Date: Jul. 29, 2022

(87) PCT Pub. No.: WO2021/153738
PCT Pub. Date: Aug. 5, 2021

(65) Prior Publication Data
US 2023/0347320 A1 Nov. 2, 2023

(30) Foreign Application Priority Data

Jan. 31, 2020 (JP) ................................. 2020-015552

(51) Int. Cl.
B01J 23/04 (2006.01)
B01J 23/02 (2006.01)
(Continued)

(52) U.S. Cl.
CPC .............. B01J 23/04 (2013.01); B01J 23/02 (2013.01); B01J 23/462 (2013.01); B01J 23/745 (2013.01);
(Continued)

(58) Field of Classification Search
CPC . B01J 23/04; B01J 23/02; B01J 23/462; B01J 23/745; B01J 23/75; B01J 23/755;
(Continued)

(56) References Cited

U.S. PATENT DOCUMENTS 6,044,644 A  4/2000  Hu et al.
6,350,421 B1  2/2002  Strehlau et al.
(Continued)

FOREIGN PATENT DOCUMENTS

CA       2280631 A1    2/2000
CN       1263789 A     8/2000
(Continued)

OTHER PUBLICATIONS

Cai Wu, Chun Shen, Yahui Gong, and Jie Wang, Domino Reactions for Biofuel Production from Zymotic Biomass Wastes over Bifunctional Mg-Containing Catalysts, Nov. 11, 2019, ACS Sustainable Chem. Eng., 7, 18943-18954 and S1-S13 (Year: 2019).*
(Continued)

*Primary Examiner* — Daniel Berns
*Assistant Examiner* — Joshua Maxwell Speer
(74) *Attorney, Agent, or Firm* — The Webb Law Firm

(57) ABSTRACT

A composite oxide including an oxide of a metal element L and an oxide of a metal element N, and represented by a composition of general formula $L_nN_{1-n}$, wherein the metal element L is a Group 1 element, a Group 2 element, or a Group 1 element and a Group 2 element, the metal element N comprises a Group 1 or Group 2 element other than the metal element L, n is 0.001 or more and 0.300 or less, the oxide of the metal element L and the oxide of the metal element N form no solid solution, and oxide particles of the metal element L are deposited on surfaces of oxide particles of the metal element N. Also, a metal-carrier material and an ammonia synthesis catalyst having, supported on this com-
(Continued)

Co/BaMgOx CATALYST
CATALYST ACTIVITY (700°C, 1 h, red) (1 MPa)

posite oxide, particles of at least one metal M selected from the group consisting of cobalt, iron, and nickel.

20 Claims, 31 Drawing Sheets

(51) Int. Cl.

| | |
|---|---|
| *B01J 23/46* | (2006.01) |
| *B01J 23/745* | (2006.01) |
| *B01J 23/75* | (2006.01) |
| *B01J 23/755* | (2006.01) |
| *B01J 37/02* | (2006.01) |
| *B01J 37/08* | (2006.01) |
| *C01C 1/04* | (2006.01) |

(52) U.S. Cl.

CPC .............. *B01J 23/75* (2013.01); *B01J 23/755* (2013.01); *B01J 37/0205* (2013.01); *B01J 37/024* (2013.01); *B01J 37/088* (2013.01); *C01C 1/0411* (2013.01)

(58) Field of Classification Search

CPC .... B01J 37/0205; B01J 37/024; B01J 37/088; B01J 2523/00; B01J 23/002; B01J 23/83; B01J 37/0203; B01J 37/0236; B01J 37/18; B01J 23/78; C01C 1/0411; C01F 11/00; C01F 5/02; C01P 2002/52; C01P 2002/54; C01P 2006/12; Y02P 20/133; Y02P 20/52

See application file for complete search history.

(56) References Cited

U.S. PATENT DOCUMENTS

| | | | |
|---|---|---|---|
| 8,133,463 | B1 | 3/2012 | Berry et al. |
| 10,792,645 | B2 | 10/2020 | Hosono et al. |
| 2004/0204315 | A1 | 10/2004 | Krumpelt et al. |
| 2009/0283419 | A1 | 11/2009 | Del-Gallo et al. |
| 2010/0227759 | A1 | 9/2010 | Tanaka et al. |
| 2014/0315711 | A1 | 10/2014 | Kumar et al. |
| 2015/0353369 | A1 | 12/2015 | Sekine et al. |

FOREIGN PATENT DOCUMENTS

| | | | | |
|---|---|---|---|---|
| CN | 103357406 | A | 10/2013 | |
| CN | 103706360 | A | 4/2014 | |
| CN | 104289217 | A | 1/2015 | |
| CN | 108472632 | A | 8/2018 | |
| EP | 2949625 | A1 | 2/2015 | |
| JP | H679177 | A | 3/1994 | |
| JP | H8141399 | A | 6/1996 | |
| JP | H10509641 | | 9/1998 | |
| JP | 200084405 | A | 3/2000 | |
| JP | 2000084405 | A * | 3/2000 | ............ B01D 53/86 |
| JP | 2001179092 | A | 7/2001 | |
| JP | 2005171269 | A | 6/2005 | |
| JP | 20078799 | A | 1/2007 | |
| JP | 2012185994 | A | 9/2012 | |
| JP | 2013111562 | A | 6/2013 | |
| JP | 2014171916 | A | 9/2014 | |
| JP | 2016112538 | A | 6/2016 | |
| JP | 201718907 | A | 1/2017 | |
| WO | 9617671 | A1 | 6/1996 | |
| WO | 2007113981 | A1 | 10/2007 | |
| WO | 2016133213 | A1 | 8/2016 | |
| WO | 2019059190 | A1 | 3/2019 | |
| WO | 2019216304 | A1 | 11/2019 | |

OTHER PUBLICATIONS

Christopher T. Fishel, Robert J. Davis, and Juan M. Garces, Ammonia Synthesis Catalyzed by Ruthenium Supported on Basic Zeolites, Jun. 12, 1996, Journal of Catalysis 163, 148-157 (Year: 1996).*

Belliere et al., "Phase Segregation in Cerium-Lanthanum Solid Solutions", J. Phys Chem., 2006, pp. 9984-9990, vol. 110, American Chemical Society.

U.S. Department of Energy., "Materials Data on BaCeO3 by Materials Project", DOE Data Explorer, May 3, 2020, DOI: https://doi.org/10.17188/1272884.

Itoh et al., "Magnetic Properties of Ba1-xLaxPrO3 and PrLu1-yMgyO3 with x and y </= 0.075", Journal of Solid State Chemistry, 1999, pp. 104-109, vol. 145, Academic Press.

Kondawar et al., "Tandem Synthesis of Glycidol via Transesterification of Glycerol with DMC over Ba-Mixed Metal Oxide Catalysts", ACS Sustainable Chemistry & Engineering, Dec. 13, 2016, pp. 1763-1774, vol. 5, ACS Publications.

Marques et al., "Thermal and Crystalographic Studies of Mixture La2O3—SrO Prepared via Reaction in the Solid State", Journal of Thermal Analysis and Calorimetry, 1999, pp. 143-149, vol. 56, Kluwer Academic Publishers.

Venkatasubramanian, et al., "Synthesis and characterization of electrolytes based on BaO—CeO2—GdO1.5 system for Intermediate Temperature Solid Oxide Fuel Cells", International Journal of Hydrogen Energy, Apr. 1, 2010, 4597-4605, vol. 35, Elsevier Ltd.

Xiaodong, Wu., "Rare Earth Catalytic Materials", 1st Edition, Jun. 30, 2017, pp. 86, China Railway Publishing House.

Xie et al., "Preparation of La1.9Ca0.1Zr2O6.95 with pyrochlore structure and its application in synthesis of ammonia at atmospheric pressure", Solid State Ionics, Jan. 30, 2004, pp. 117-121, vol. 168, Elsevier B.V., doi: 10.1016/j.ssi.2004.01.025.

Zhang et al., "Highly efficient Ru/Sm2O3—CeO2 catalyst for ammonia synthesis", Catalysis Communications, Aug. 1, 2011, pp. 23-26, vol. 15, Elsevier B.V.

Fernández et al., "Effect of the size of distribution of supported Ru nanoparticles on their activity in ammonia synthesis under mild reaction conditions", Applied Catalysis A: General, 2014, pp. 194-202, vol. 474.

Naggar et al., "Novel nano-structured for the improvement of photo-catalyzed hydrogen production via water splitting with in-situ nano-carbon formation", Renewable and Sustainable Energy Reviews, 2015, pp. 1205-1216, No. 41.

Bilal et al., "Effect of Heating Atmosphere and Alkali Metal Doping on the Acidic and Basic Sites of Magnesium Oxide," International Journal of Materials Science and Applications, 2016, pp. 36-42, vol. 5:2, Science Publishing Group.

Fishel et al., "Ammonia Synthesis Catalyzed by Ruthenium Supported on Basic Zeolites," Journal of Catalysis, 1996, pp. 148-157, vol. 163, Academic Press, Inc.

Kodama, T., "High-temperature solar chemistry for converting solar heat to chemical fuels," Progress in Energy and Combustion Science, 2003, pp. 567-597, vol. 29, Elsevier.

Muller et al., "Calcium Doping Facilitates Water Dissociation in Magnesium Oxide," Advanced Sustainable Systems, Dec. 11, 2017, vol. 2, Issue 1.

Wu et al., "Domino Reactions for Biofuel Production from Zymotic Biomass Wastes over Bifunctional Mg-Containing Catalysts," ACS Sustainable Chemistry & Engineering, 2019, pp. 18943-18954, vol. 7, American Chemical Society.

Gao et al., Barium Hydride-Mediated Nitrogen Transfer and Hydrogenation for Ammonia Synthesis: A Case Study of Cobalt, ACS Catalysis, Apr. 17, 2017, pp. 3654-3661, 7 (5), American Chemical Society.

Ivanova et al., New Y (La)—M—O Binary Systems (M= Ca, Sr, or Ba): Synthesis, Physicochemical Characterization, and Application As the Supports of Ruthenium Catalysts for Ammonia Synthesis, Kinetics and Catalysis, 2004, pp. 541-546, vol. 45, No. 4.

Kitano et al., Self-organized Ruthenium-Barium Core-Shell Nanoparticles on a Mesoporous Calcium Amide Matrix for Efficient Low-Temperature Ammonia Synthesis, Angew. Chem. Int. Ed., Mar. 1, 2018, pp. 2648-2652, vol. 57, Issue 10.

Luo et al., Effect of La2O3 on Ru/CeO2—La2O3 Catalyst for Ammonia Synthesis, Catal Lett, Oct. 14, 2009, pp. 382-387, vol. 133.

Niwa et al., Ruthenium Catalyst Supported on CeO2 for Ammonia Synthesis, Chemistry Letters, 1996, pp. 3-4, vol. 25, No. 1.

(56) References Cited

OTHER PUBLICATIONS

Ogura et al., Efficient ammonia synthesis over a Ru/La0.5Ce0.5O1.75 catalyst pre-reduced at high temperature, Chem. Sci., 2018, pp. 2230-2237, vol. 9.

Hagen et al., "New efficient catalyst for ammonia synthesis: barium-promoted cobalt on carbon," Chemical Communications, 2002, pp. 1206-1207, vol. 11.

Inoue et al., "Direct Activation of Cobalt Catalyst by 12CaO·7Al2O3 Electride for Ammonia Synthesis", ACS Catalysis, 2019, pp. 1670-1679, vol. 9.

Bao, A. et al., "Effect of barium on reducibility and activity for cobalt-based Fischer-Tropsch synthesis catalysts," Journal of Natural Gas Chemistry, 2010, pp. 622-627, vol. 10.

Yang, X.-L et al., "Effect of Alumina Support and Barium Oxide on the Structure and Catalytic Activity of Ruthenium Catalysts for Ammonia Synthesis," Acta Phys-Chim. Sin., 2010, pp. 3263-3272, 26 (12).

* cited by examiner

Co/BaMgOx CATALYST
CATALYST ACTIVITY (700°C, 1 h, red) (1 MPa)

Co/BaMgOx CATALYST
STUDY ON AMOUNT OF Ba ADDED (700°C, 1 h, red) (1 MPa)

20 wt% Co/BaMgOx CATALYST
STUDY ON REDUCTION TEMPERATURE (1 MPa)

Co/BaMgOx CATALYST
XRD AT EACH REDUCTION TEMPERATURE (AFTER REACTION)

20 wt% Co/BaMgOx CATALYST
STUDY ON AMOUNT OF Co SUPPORTED (700°C, 1 h, red) (1 MPa)

Co/BaMgOx CATALYST
REACTION PRESSURE DEPENDENCE (700°C, 1 h, red)
REACTION TEMPERATURE DEPENDENCE OF 20 wt% Co/Ba$_{0.01}$Mg$_{0.99}$O$_x$ AT EACH REACTION PRESSURE Co/BaMgOx CATALYST
REACTION PRESSURE DEPENDENCE (700°C, 1 h, red)

Co-Fe/BaMgOx CATALYST
CATALYST ACTIVITY (700°C, 1 h, red) (1 MPa)

Co/BaMgOx CATALYST
H-TRP MEASUREMENT RESULTS (IN PRESENCE OF Ba)

H ONLY                                          OTHER ELEMENTS

Co/MgOx CATALYST
H-TPR MEASUREMENT RESULTS (IN ABSENCE OF Ba)

STUDY ON GROUP 2 ELEMENT ADDED TO 20 wt% Co/MgO (700°C, 1 h, red)

FIG. 35

AMMONIA SYNTHESIS CATALYST

CROSS-REFERENCE TO RELATED APPLICATIONS

This application is the United States national phase of International Application No. PCT/JP2021/003257 filed Jan. 29, 2021, and claims priority to Japanese Patent Application No. 2020-015552 filed Jan. 31, 2020, the disclosures of which are hereby incorporated by reference in their entirety.

BACKGROUND OF THE INVENTION

Field of the Invention

The present invention relates to a composite oxide useful in the synthesis of ammonia under mild conditions, a metal-carrier material and an ammonia synthesis catalyst using the composite oxide, a method of producing the composite oxide, a method of producing the metal-carrier material, and a method of producing ammonia.

Description of Related Art

Ammonia is a critical raw material in the modern chemical industry. Here, 80% or more of ammonia produced is used to manufacture chemical fertilizers for crops. Further, ammonia has attracted much attention as an energy and hydrogen carrier. This is because (1) the hydrogen content is large (17.6 wt %), (2) the energy density is high (12.8 $GJ/m^3$), and (3) carbon dioxide is not generated during decomposition for producing hydrogen. If ammonia can be efficiently produced from renewable energy such as solar energy and/or wind power, global problems associated with energy and food crises will be mitigated.

Currently, the Haber-Bosch process used to produce ammonia consumes a large amount of energy, which accounts for about 1 to 2% of the global energy consumption. In this process, approximately 60% of the energy consumed is recovered and is reserved as the enthalpy of ammonia. However, most of the remaining energy is lost during production of hydrogen from natural gas, synthesis of ammonia, and separation of gases. Since ammonia is synthesized by the Haber-Bosch process at very high temperatures (>450° C.) and pressures (>20 MPa), it is required to reduce the large amount of energy used in this process. In order to suppress global energy consumption, there is a need for a catalyst capable of synthesizing ammonia under milder conditions (at a lower temperature and a lower pressure) than the iron-based catalyst used in the Haber-Bosch process.

In recent years, a method of producing ammonia under a low-pressure condition of about 1 MPa (10 atm) is known. The ruthenium catalyst used for ammonia production is supported on a common carrier. For example, JP 6-079177 A discloses that when a rare earth oxide is used as a carrier for supporting ruthenium, the amount of ruthenium used can be reduced, and the reaction temperature can be lowered. However, in the ammonia production method of JP 6-079177 A, the ammonia yield in the case of producing ammonia under a lower-pressure condition is insufficient. Thus, the present inventors have developed a ruthenium catalyst with $La_{0.5}Ce_{0.5}O_{1.75}$ reduced at 650° C. as a carrier, and have reported that the ruthenium catalyst exhibits excellent characteristics even under a low-pressure condition (Y. Ogura et al., "Efficient ammonia synthesis over a Ru/La0.5Ce0.5O1.75 catalyst pre-reduced at high temperature", Chemical Science, Vol. 9, p. 2230-2237).

Further, the present inventors have developed a binary composite oxide composed of two kinds of metal elements and a metal-carrier material (catalyst for ammonia synthesis) in which a catalyst such as ruthenium is supported on the binary composite oxide (WO 2019/059190 A and WO 2019/216304 A). The following is disclosed as the ammonia synthesis catalyst using the binary composite oxide (carrier) disclosed in the literatures, including:

$Ru/Ce_{0.85}La_{0.15}O_x$_reduced (at 500° C., 600° C., 650° C., or 700° C.), $Ru/Ce_{0.67}La_{0.33}O_x$_reduced (at 500° C., 600° C., 650° C., or 700° C.), $Ru/Ce_{0.33}La_{0.67}O_x$_reduced (at 500° C., 600° C., 650° C., or 700° C.), $Ru/Ce_{0.15}La_{0.85}O_x$_reduced (at 500° C., 600° C., 650° C., or 700° C.), $Ru/Ce_{0.5}La_{0.5}O_x$_reduced (at 500° C., 650° C., or 800° C.), $Ru/Ce_{0.5}Zr_{0.5}O_x$_reduced at 700° C., $Ru/Ce_{0.5}Pr_{0.5}O_x$_reduced (at 500° C., 600° C., 650° C., 700° C., or 800° C.), $Ru/La_{0.5}Pr_{0.5}O_x$_reduced (at 450° C., 500° C., 600° C., 650° C., or 700° C.), $Ru/Ba_{0.1}La_{0.9}O_x$_reduced (at 500° C., 700° C., 800° C., or 900° C.), $Ru/Ba_{0.1}Ce_{0.9}O_x$_reduced (at 500° C. or 700° C.), $Co/Ba_{0.05}La_{0.99}O_x$_reduced (at 500° C., 600° C., 700° C., or 800° C.), $Co/Ba_{0.01}La_{0.99}O_x$_reduced at 700° C., $Co/Ba_{0.03}La_{0.97}O_x$_reduced at 700° C., or $Co/Ba_{0.1}La_{0.9}O_x$_reduced at 700° C.

In addition, the literatures have described 8.4 wt % Ba/4.5 wt % Ru/MgO_reduced (at 500° C. or 700° C.) (Example 80, Example 81). These oxides are obtained by impregnating a carrier MgO with a Ru solution, calcinating the carrier, and further having Ba supported using $Ba(OH)_2 \cdot 8H_2O$.

In addition to JP 6-079177 A and Ogura et al., various patent literatures disclose ammonia synthesis catalysts in which ruthenium is supported on each rare earth oxide carrier. Typical examples thereof include Patent Literatures 2 to 4 JP 2013-111562 A, WO 2016/133213 A, and JP 2017-018907 A or Y. Niwa and K. Aika, Chemistry Letters, (1996) 3-4; X. Luo et al., Catalysis Letters 133, 382 (2009); and A. S. Ivanova et al., Kinetics and Catalysis, Vol. 45, No. 4, 2004, pp. 541-546, Translated from Kinetika i Kataliz, Vol. 45, No. 4, 2004, pp. 574-579. JP 2013-111562 A and JP 2017-018907 A disclose each lanthanoid oxide, WO 2016/133213 A discloses a praseodymium oxide, and Niwa et al. discloses a Ce oxide as a carrier. Luo et al., discloses a $Ru/CeO_2$—$La_2O_3$-based catalyst produced by coprecipitating hydroxides of Ru, Ce, and La, followed by drying and activation.

The related art documents including JP 6-079177 A, JP 2013-111562 A, JP 2017-018907 A and Niwa et al. describe that Ru is present as particles on the surface of a carrier of a ruthenium catalyst used for ammonia synthesis. In the case of being present as particles, the average diameter is reportedly larger than 5 nm (see Luo et al.) and less than 2 nm (Ogura et al.). In addition, WO 2016/133213 A describes that Ru has an eggshell structure.

On the other hand, regarding the carrier, Ivanova et al. describes that in evaluating the ammonia synthesis activity of a Y(La)-M-O (M is Ca, Sr, or Ba) catalyst having Ru supported thereon, the carrier oxide before having Ru supported thereon has a large specific surface area when the calcination temperature of the carrier oxide is set to 450° C., and the carrier obtained at a calcination temperature raised to 650° C. has a reduced specific surface area.

In addition, in view of the fact that Ru is expensive, an ammonia synthesis catalyst in which a transition metal compound other than Ru, for example, Co, is supported on a carrier has also been disclosed (see, for example, M. Kitano et al., Angew. Chem. Int. Ed., 130(2018)2678 and W. Gao et al., ACS Catal., 7 (2017) 3654. Although Gao et al. discloses Co—BaO/C in which cobalt is supported on barium oxide, the ammonia synthesis activity was low. In Kitano et al., calcium amide (Co/Ba—Ca(NH₂)₂) is used instead of an oxide, but the ammonia yield at 1 MPa of the catalyst having Co supported thereon was lower than that of the catalyst having Ru supported thereon.

<center>CITATION LIST</center>

<center>Patent Literature</center>

Patent Literature 1: JP 6-079177 A
Patent Literature 2: JP 2013-111562 A
Patent Literature 3: WO 2016/133213 A
Patent Literature 4: JP 2017-018907 A
Patent Literature 5: WO 2019/059190 A
Patent Literature 6: WO 2019/216304 A <center>Non Patent Literature</center>

Non Patent Literature 1: Y. Niwa and K. Aika, Chemistry Letters, (1996) 3-4
Non Patent Literature 2: X. Luo et al., Catalysis Letters 133, 382 (2009)
Non Patent Literature 3: A. S. Ivanova et al., Kinetics and Catalysis, Vol. 45, No. 4, 2004, pp. 541-546. Translated from Kinetika i Kataliz, Vol. 45, No. 4, 2004, pp. 574-579.
Non Patent Literature 4: Y. Ogura et al., "Efficient ammonia synthesis over a Ru/La0.5Ce0.5O1.75 catalyst pre-reduced at high temperature", Chemical Science, Vol. 9, p. 2230-2237
Non Patent Literature 5: M. Kitano et al., Angew. Chem. Int. Ed., 130(2018)2678
Non Patent Literature 6: W. Gao et al., ACS Catal., 7 (2017) 3654

<center>SUMMARY OF THE INVENTION</center>

Generally speaking, high synthesis activity is sought for synthesis catalysts. Also, with regard to ammonia synthesis catalysts under development, there is a continuing demand for highly active catalysts that enable higher yields. Among the binary catalysts, for example, a catalyst such as Co/BaLaO$_x$ has sufficiently high ammonia synthesis activity, but further improvement in the activity has been sought.

The purpose of the present invention is to provide a binary composite oxide containing conventional rare earth metals, for example, a composite oxide exhibiting higher ammonia synthesis activity than that of BaLaO$_x$ when cobalt is supported. Another purpose of the present invention is to provide a metal-carrier material or ammonia synthesis catalyst exhibiting such high ammonia synthesis activity. Still another purpose of the present invention is to provide a method of producing such a composite oxide or a metal-carrier material, and a method of producing ammonia.

In order to solve the above problem, the present inventors have found that ammonia synthesis activity is high at the time of using, in combination as a catalyst, two kinds of Group 2 elements having specific properties as metal oxides constituting a composite oxide. Then, the following invention has been completed.

[1] A composite oxide comprising an oxide of a metal element L and an oxide of a metal element N, the composite oxide represented by a composition of general formula (1):

$$L_nN_{1-n} \tag{1}$$

4 the composite oxide having the following characteristics (a) to (d):
(a) the metal element L being an oxide of any element(s) selected from (i) a Group 1 element, (ii) a Group 2 element, or (iii) a Group 1 element and a Group 2 element,
(b) the metal element N comprising a Group 1 or Group 2 element other than the metal element L,
(c) n of 0.001 or more and 0.300 or less, and
(d) the oxide of the metal element L and the oxide of the metal element N forming no solid solution, and oxide particles of the metal element L being deposited on surfaces of oxide particles of the metal element N.
[2] The composite oxide according to [1], wherein
(a) the metal element L represents a metal element that is a strongly basic element having a value of partial negative charge $(-\delta_{OA})$ of oxygen in an oxide state of 0.56 or more and 0.70 or less, and
(b) the metal element N represents a metal element that is a weakly basic element having a value of partial negative charge $(-\delta_{OB})$ of oxygen in an oxide state of 0.35 or more and 0.55 or less.
[3] The composite oxide according to [1] or [2], which is a binary composite oxide consisting of a metal element A contained in the metal element L and a metal element B contained in the metal element N, wherein the general formula (1) is represented by a composition of general formula (2):

$$A_nB_{1-n} \tag{2}$$

the composite oxide having the following characteristics (a) to (d);
(a) the metal element A representing a Group 2 element that is a strongly basic element having a value of partial negative charge $(-\delta_{OA})$ of oxygen in an oxide state of 0.56 or more and 0.70 or less,
(b) the metal element B representing a Group 2 element that is a weakly basic element having a value of partial negative charge $(-\delta_{OB})$ of oxygen in an oxide state of 0.35 or more and 0.55 or less,
(c) n of 0.001 or more and 0.300 or less, and
(d) an oxide of the metal element A and an oxide of the metal element B forming no solid solution, and oxide particles of the metal element A being deposited on surfaces of oxide particles of the metal element B.
[4] A composite oxide comprising an oxide of a metal element L and an oxide of a metal element N, the composite oxide represented by a composition of general formula (3):

$$L_nN_{1-n}O_x \tag{3}$$

the composite oxide having the following characteristics (a) to (d):
(a) the metal element L being an oxide of any element(s) selected from
(i) a Group 1 element,
(ii) a Group 2 element, or
(iii) a Group 1 element and a Group 2 element,
(b) the metal element N comprising a Group 1 or Group 2 element other than the metal element L,
(c) n of 0.001 or more and 0.300 or less, and
(d) the oxide of the metal element L and the oxide of the metal element N forming no solid solution, and oxide particles of the metal element L being deposited on surfaces of oxide particles of the metal element N.
[5] The composite oxide according to [4], wherein
(a) the metal element L represents a metal element that is a strongly basic element having a value of partial negative charge ($-\delta_{OA}$) of oxygen in an oxide state of 0.56 or more and 0.70 or less, and (b) the metal element N represents a metal element that is a weakly basic element having a value of partial negative charge ($-\delta_{OB}$) of oxygen in an oxide state of 0.35 or more and 0.55 or less.

[6] The composite oxide according to [4] or [5], which is a binary composite oxide consisting of a metal element A contained in the metal element L and a metal element B contained in the metal element N, wherein the general formula (3) is represented by a composition of general formula (4):

$$A_nB_{1-n}O_x \tag{4}$$

the composite oxide according to [4] or [5] having the following characteristics (a) to (d);

(a) the metal element A representing a Group 2 element that is a strongly basic element having a value of partial negative charge ($-\delta_{OA}$) of oxygen in an oxide state of 0.56 or more and 0.70 or less, (b) the metal element B representing a Group 2 element that is a weakly basic element having a value of partial negative charge ($-\delta_{OB}$) of oxygen in an oxide state of 0.35 or more and 0.55 or less, (c) n of 0.001 or more and 0.300 or less, (d) an oxide of the metal element A and an oxide of the metal element B forming no solid solution, and oxide particles of the metal element A being deposited on surfaces of oxide particles of the metal element B, and (e) x is the number of oxygen atoms required to keep the composite oxide electrically neutral.

[7] The composite oxide according to any one of [1] to [6], which is $Ba_nMg_{1-n}O_x$ (where 0.001 n 0.300).

[8] The composite oxide according to [7], which is $Ba_nMg_{1-n}O_x$ (where 0.01 n 0.10).

[9] The composite oxide according to [7] or [8], wherein an amount of carbonate contained in the composite oxide is 10 mol % or less based on Ba.

[10] A metal-carrier material comprising the composite oxide according to any one of [1] to [9], the composite oxide having, supported thereon, particles of at least one metal M selected from the group consisting of cobalt, iron, and nickel.

[10-1] A metal-carrier material comprising, as a composition, metal particles M and the composite oxide according to any one of [1] to [3], wherein each element is recognized as an aggregate of particles, and it is observed that the metal element L having a particle diameter of 10% or less of particle diameter of the metal particles M is distributed on the metal particles M, between each metal particle M and the metal oxide N, and on the metal oxide N.

[10-2] The metal-carrier material according to [10-1], wherein it is observed that particles of the metal element L are uniformly distributed.

[10-3] The metal-carrier material according to [10-1] or [10-2], wherein the particles of the metal element L are also distributed at an intermediate layer between the metal particles M and the metal element N.

[10-4] The metal-carrier material according to any one of [10-1] to [10-3], wherein the composite oxide is the composite oxide according to [6], the metal element A is selected from the metal element L, and the metal element B is selected from the metal element N.

[11] The metal-carrier material according to [10], wherein the metal particles M are supported on the oxide of the metal element L deposited on a surface of the oxide of the metal element N, and oxide particles of the metal element L are deposited on surfaces of the metal particles M.

[12] The metal-carrier material according to [10], wherein oxide particles of the metal element N are distributed between the oxide particles of the metal element L and the metal particles M.

[12-1] The metal-carrier material according to [11] or [12], wherein the composite oxide is the composite oxide according to [6], the metal element A is selected from the metal element L, and the metal element B is selected from the metal element N.

[13] The metal-carrier material according to [10], wherein the metal particles M are cobalt particles.

[14] An ammonia synthesis catalyst comprising the metal-carrier material according to [10].

[15] A method of producing the metal-carrier material according to [10], comprising the steps of (a) to (d):

(a) an impregnation step of impregnating a metal element N-containing N precursor with a metal element L-containing L precursor;

(b) a composite oxide calcination step of calcinating the resulting mixture at a temperature of 500° C. or higher to obtain a carrier including a composite oxide;

(c) a supporting step of impregnating the composite oxide with a metal particles M-containing compound precursor to obtain an impregnated carrier; and (d) a carrier material calcination step of calcinating the impregnated carrier at a temperature of 400° C. or higher.

[15-1] The method of producing a metal-carrier material according to [15], wherein the metal element A is selected from the metal element L, the metal element B is selected from the metal element N, and the method includes the following steps (a) to (d):

(a) an impregnation step of impregnating a metal element B-containing B precursor with a metal element A-containing A precursor solution;

(b) a composite oxide calcination step of calcinating the resulting mixture at a temperature of 500° C. or higher to obtain a carrier including a composite oxide;

(c) a supporting step of impregnating the composite oxide in a solution containing a metal particles M-containing compound precursor to obtain an impregnated carrier; and (d) a carrier material calcination step of calcinating the impregnated carrier at a temperature of 400° C. or higher.

[15-2] The method of producing a metal-carrier material according to [15] or [15-1], wherein step (b) is carried out in air.

[15-3] The method of producing a metal-carrier material according to [15] or [15-1], wherein step (d) is carried out in an argon atmosphere.

[16] The method of producing a metal-carrier material according to any one of [15] to [15-3], further comprising step (e):

(e) a reduction step of calcinating the resulting metal-carrier material obtained in (d) at 500° C. or higher in a presence of hydrogen.

[17] A method of producing ammonia, comprising bringing hydrogen and nitrogen into contact with a catalyst, wherein the catalyst is the ammonia synthesis catalyst according to [14].

The present invention makes it possible to provide a binary composite oxide containing conventional rare earth metals, for example, a composite oxide exhibiting higher ammonia synthesis activity than that of $Ru/BaLaO_x$ when cobalt is supported. In addition, the present invention makes it possible to provide a metal-carrier material or ammonia synthesis catalyst exhibiting such high ammonia synthesis activity. Further, the present invention makes it possible to provide a method of producing such a composite oxide or a metal-carrier material, and a method of producing ammonia.

BRIEF DESCRIPTION OF DRAWINGS

FIG. 35 is diagrams for explaining the features of the structure of each metal-carrier material in Example 1 or 17.

DESCRIPTION OF THE INVENTION

<Composite Oxide>

Figure 1:
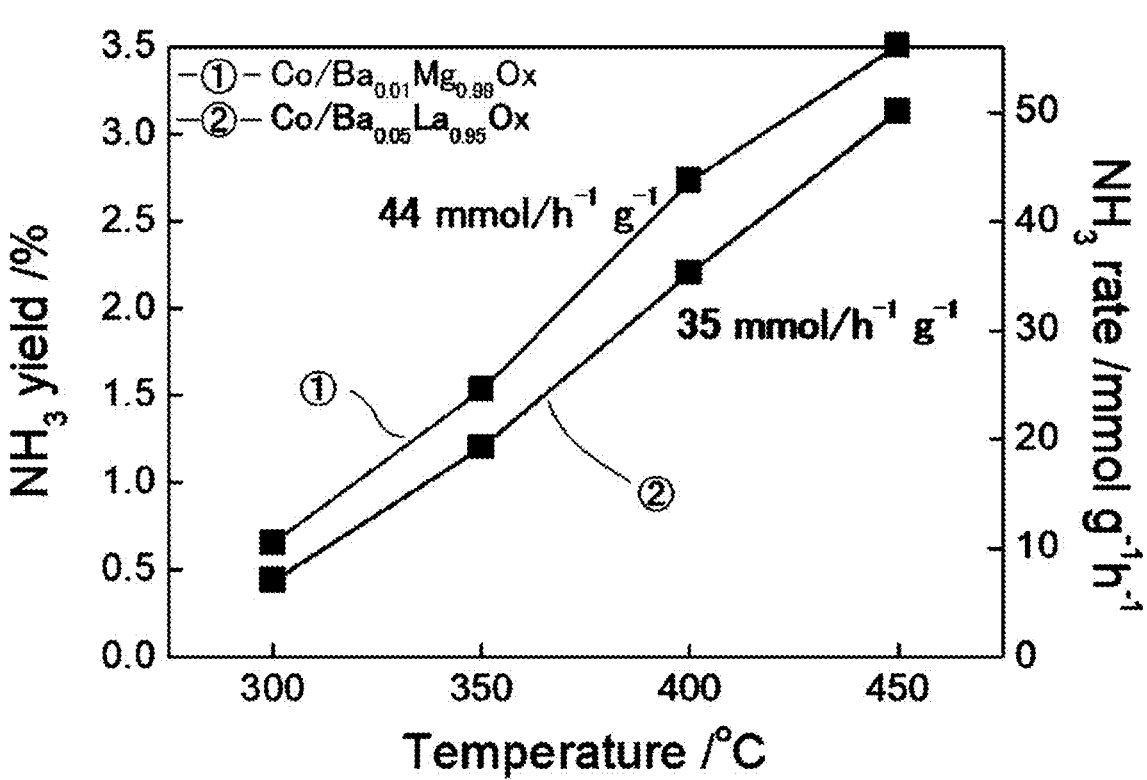
FIG. 1 is a graph showing ammonia synthesis activity of a catalyst $Co/Ba_{0.01}Mg_{0.99}O_x$_reduced at 700° C. (catalyst prepared by performing reduction at 700° C. after Co is supported thereon) in Examples.

A composite oxide of the invention is a composite oxide comprising an oxide of a metal element L and an oxide of a metal element N, the composite oxide having characteristics (a) to (d) below, the composite oxide represented by a composition of general formula (1):

$$L_nN_{1-n} \tag{1}$$

where the metal element L is an oxide of an element selected from any one of the following (i) to (iii):

(i) a Group 1 element, (ii) a Group 2 element, or (iii) a Group 1 element and a Group 2 element.

Note that as used herein, the "metal element L" includes not only one kind of element (Group 1 element or Group 2 element) but also two kinds of elements (Group 1 and Group 2 elements).

The Group 1 element as the metal element L is a metal called an alkali metal, and examples thereof include Li, Na, K, Rb, or Cs. In addition, the Group 2 element is a metal called an alkaline earth metal, and examples thereof include Be, Mg, Ca, Sr, Ba, or Ra. As the metal element L, a Group 1 element and a Group 2 element may be used at the same time. These elements are selected in consideration of basicity. Further, a partial negative charge described later may be used for calculation. When a Group 1 metal and a Group 2 metal are used, the ratio is preferably in the range of 0.1:1.9 to 1.9:0.1, more preferably in the range of 0.8:1.2 to 1.2:0.8, and particularly preferably 1:1. From the viewpoint of high ammonia synthesis activity of the below-described metal-carrier material, the metal element L is preferably a Group 2 element alone or a composite oxide of a Group 1 element and a Group 2 element.

As the metal element N, an oxide of a Group 1 or Group 2 element other than the metal element L is used. The amount of the metal element L used is smaller than that of the metal element N. The proportion of the metal element N based on the total amount of metal elements for the metal element L is usually 0.001 or more and 0.300 or less and preferably 0.01 or more and 0.100 or less. The ratio of the metal element L affects the morphology during production of the catalyst and also affects the catalytic activity. An oxide of the metal element L and an oxide of the metal element N form no solid solution, and the metal element L is observed on the metal element N. This state may be herein described such that the metal element L or an oxide of the metal element L is deposited on the metal element N or an oxide of the metal element N.

In the composite oxide used in the invention, a metal element A is selected from the metal element L, and a metal element B is selected from the metal element L. When this composite oxide is a binary composite oxide, the general formula (1) is represented by the following general formula (2):

$$A_nB_{1-n} \tag{2}$$

(a) The metal element A represents a Group 2 element that is an alkaline earth metal and a strongly basic element having a value of partial negative charge $(-\delta_{OA})$ of oxygen in an oxide state of 0.56 or more and 0.70 or less.

(b) The metal element B represents a Group 2 element that is an alkaline earth metal other than the metal element A and a weakly basic element having a value of partial negative charge $(-\delta_{OB})$ of oxygen in an oxide state of 0.35 or more and 0.55 or less.

(c) The proportion of the metal element A added to the total is 0.001 or more and 0.300 or less, and the morphology in the case of this range favorably affects the catalytic activity.

(d) An oxide of the metal element A and an oxide of the metal element B form no solid solution, and the state where oxide particles of the metal element A are observed on surfaces of oxide particles of the metal element B is herein expressed as "deposited" state.

The composite oxide represented by the composition of general formula (1) can be alternatively expressed as formula (3). Specifically, a composite oxide used in the invention is a composite oxide comprising an oxide of a metal element L and an oxide of a metal element N, the composite oxide represented by a composition of general formula (3):

$$L_nN_{1-n}O_x \tag{3}$$

the composite oxide having the following characteristics (a) to (d):

(a) the metal element L being an oxide of any element(s) selected from (i) a Group 1 element, (ii) a Group 2 element, or (iii) a Group 1 element and a Group 2 element, (b) the metal element N comprising a Group 1 or Group 2 element other than the metal element L, (c) n of 0.001 or more and 0.300 or less, (d) the oxide of the metal element L and the oxide of the metal element N forming no solid solution, and oxide particles of the metal element L being deposited on surfaces of oxide particles of the metal element N, and (e) x representing the number of oxygen atoms required to keep the composite oxide electrically neutral.

The composite oxide of the invention is a binary composite oxide consisting of a metal element A and a metal element B represented, when the above general formula (2) is alternatively expressed, by a composition of general formula (4):

$$A_nB_{1-n}O_x \tag{4}$$

wherein A, B, n, and x are as described in the above general formula (2).

<Basicity>

An oxide of the metal element L and an oxide of the metal element N in a composite oxide used in the invention form no solid solution. The metal element L is preferably a metal element that is a strongly basic element having a value of partial negative charge $(-\delta_{OA})$ of oxygen in an oxide state of 0.56 or more and 0.70 or less, and the metal element N is preferably a metal element that is a weakly basic element having a value of partial negative charge $(-\delta_{OB})$ of oxygen in an oxide state of 0.35 or more and 0.55 or less.

In the case where the metal element A is selected from the metal element L and the metal element B is selected from the metal element N to form a binary composite oxide, (a) the metal element A represents a Group 2 element that is a strongly basic element having a value of partial negative charge $(-\delta_{OA})$ of oxygen in an oxide state of 0.56 or more and 0.70 or less, (b) the metal element B represents a Group 2 element that is a weakly basic element having a value of partial negative charge $(-\delta_{OB})$ of oxygen in an oxide state of 0.35 or more and 0.55 or less, (c) n is 0.001 or more and 0.300 or less, (d) an oxide of the metal element A and an oxide of the metal element B form no solid solution, and oxide particles of the metal element A are deposited on surfaces of oxide particles of the metal element B, and (e) x is the number of oxygen atoms required to keep the composite oxide electrically neutral.

The metal element A is a strongly basic element having a value of partial negative charge $(-\delta_O)$ of oxygen in an oxide state of 0.56 or more and 0.70 or less. The value of $-\delta_{OA}$ is more preferably 0.60 or more and most preferably 0.65 or more. Specifically, the metal element A may be selected from barium (Ba), strontium (Sr), or calcium (Ca).

The metal element B is a weakly basic element having a value of partial negative charge $(-\delta_O)$ of oxygen in an oxide state of 0.35 or more and 0.55 or less. The value of $-\delta_{OB}$ is more preferably 0.40 or more. Also, the value of $-\delta_{OB}$ is more preferably 0.50 or less and most preferably 0.45 or less. Specifically, the metal element B may be selected from Mg (magnesium) or Be (beryllium).

The difference between $-\delta_{OA}$ and $-\delta_{OB}$ is preferably from 0.10 to 0.40, more preferably from 0.15 to 0.35, and most preferably from 0.20 to 0.30.

In the invention, the metal element A contained in the composite oxide is a strongly basic element exhibiting high basicity in an oxide state. This makes it possible to increase the activity of the ammonia synthesis catalyst. The mechanism will be overviewed below.

The metal element A is a strongly basic metal element. Electrons are generated from the base point of the composite oxide (carrier) made of such an element, and these electrons are back-donated to nitrogen molecules via transition metal particles as a catalyst supported on the composite oxide, thereby weakening the nitrogen triple bond. The present inventors consider that this stage is a rate-limiting step of the ammonia synthesis reaction, and the energy caused by the cleavage of the triple bond of each nitrogen molecule is lowered by the above-mentioned series of electron transfer, and the ammonia synthesis activity of the metal-carrier material (catalyst) is improved.

The basicity (Lewis basicity) of the metal oxide is related to the high electron donating capacity. That is, it is considered that a substance having a higher electron donating capacity exhibits stronger basicity. Since oxygen basically acts as an electron donor in the oxide, the amount of charge of oxygen in the oxide, that is, the partial negative charge of oxygen is useful as an indicator for basicity. In fact, in a non-patent literature (Sanderson "Inorganic Chemistry (first half)", Hirokawa Shoten (1975), page 276, Table 12.7), it is shown that the value of partial negative charge of oxygen correlates well with the acid basicity exhibited by some oxide.

Here, for the partial negative charge $(-\delta_O)$ of oxygen in an oxide made of an individual metal element(s), values listed in Table 12.7 of a non-patent literature (Sanderson, "Inorganic Chemistry (first half)", Hirokawa Shoten (1975), p. 276) can be used. Values not listed can be calculated by calculating the partial negative charge of oxygen as described above. Each value of partial negative charge $(-\delta_O)$ of oxygen in an oxide containing a Group 2 element is shown in the following table.

TABLE 1

| | BeO | MgO | CaO | SrO | BaO |
|---|---|---|---|---|---|
| Partial negative charge of oxygen | 0.35 | 0.42 | 0.57 | 0.62 | 0.67 |
| Basicity | VW (very weak base) | W (weak base) | S (strong base) | S (strong base) | S (strong base) |
| Acidity | VW (very weak acid) | 0 (without acidity) | 0 (without acidity) | 0 (without acidity) | 0 (without acidity) |

Meanwhile, for the method of calculating the partial negative charge of oxygen based on the whole composite oxide, a non-patent literature (Sanderson, "Inorganic Chemistry (first half)", Hirokawa Shoten (1975), page 122, Table 6.7, page 126 to 128) was used as a reference. First, the composition ratio between each element in the composite oxide is determined. For example, La in "$Ce_{0.5}La_{0.5}O_{1.75}$" has 0.5. This value is set to ni (i is a corresponding element). The electronegativity of each element is represented by $\chi i$. Then, the geometric mean of the electronegativity of all the atoms constituting the composite oxide is determined by $(\Pi(\chi i^{ni}))^{\wedge}(1/\Sigma ni)$. Next, to obtain a value of interest from a change in the electronegativity of oxygen, the difference (5.21) between the geometric mean and the electronegativity of oxygen is subtracted. Finally, the change in the electronegativity of oxygen is divided by a change in electronegativity $(-4.75)$ when one atom of oxygen acquires one electron. The above calculation makes it possible to calculate the partial negative charge of oxygen as exhibited by the composite oxide.

In short, when the composition ratio between each element contained in the composite oxide is ni (i=each element in the composite oxide containing at least A, B, and O) and the electronegativity of each element is $\chi i$ (i=each element in the composite oxide containing at least A, B, and O), the value of partial negative charge of oxygen in the composite oxide is represented by the following formula (A).

$$((\Pi(\chi i^{ni}))^{\wedge}(1/\Sigma ni)-5.21)/-4.75 \qquad \text{formula (A).}$$

If the partial negative charge of oxygen in the composite oxide is determined, (a) the partial negative charge of oxygen in an oxide state among elements forming the composite may be determined; or (b) when the composition ratio between each element contained in the composite oxide is ni (i=each element in the composite oxide containing A, B, and O) and the Sanderson electronegativity of each element is $\chi i$ (i=each element in the composite oxide containing A, B, and O), the partial negative charge of oxygen may be calculated by the following formula (A):

$$((\Pi(\chi i^{ni}))^{\wedge}(1/\Sigma ni)-5.21)/-4.75 \qquad \text{formula (A).}$$

When the composite oxide forms a homogenous composite oxide, the protocol (b) is preferably performed. On the other hand, when the composite oxide forms a heterogeneous composite oxide, it is preferable to use the protocol (a). In that case, the result of an element having the largest absolute value for the partial negative charge of oxygen among individual elements is used. In the composite oxide of the invention, an oxide of the metal element A and an oxide of the metal element B are phase-separated without forming any solid solution. Thus, the value of partial negative charge of oxygen in the composite oxide is preferably calculated by the protocol (a) described above.

The value of partial negative charge of oxygen in the composite oxide is preferably 0.35 or more and more preferably 0.40 or more. When the value of partial negative charge of oxygen in the composite oxide is 0.35 or more, the ammonia synthesis activity tends to increase.

<Removal of Carbonate and/or Hydroxide>

The metal elements L (alkali metal) and N (alkaline earth metal) have strong basicity even if they form an oxide, and easily react with carbon dioxide and/or water in the atmosphere to form a metal carbonate and/or a hydroxide. However, the metal carbonate and/or the hydroxide cause the composite oxide to have decreased basicity and are thus responsible for a decrease in the ammonia synthesis activity of the catalyst. For example, Ba becomes $BaCO_3$ or $Ba(OH)_2$ in the atmosphere, and this lowers the ammonia synthesis activity. Thus, the amount of metal carbonate and/or hydroxide contained in the ammonia synthesis catalyst is preferably as small as possible. In order to reduce the amount of the metal carbonate and/or hydroxide, it is preferable to perform reduction treatment under a heating condition as described later, whereby the metal carbonate and/or hydroxide contained in the catalyst are decomposed, and the decrease in basicity can be prevented. The amount of the carbonate contained in the metal-carrier material is not particularly limited as long as the ammonia synthesis activity is not inhibited, and is, for example, 10 mol % or less, preferably 1 mol % or less, more preferably 0.1 mol % or less, and still more preferably 0.01 mol % or less based on the metal element A.

Examples of the method for quantifying the amount of carbonate present as a metal carbonate include a method in which hydrocarbon such as methane generated by hydrogenation of carbonate species by heating a catalyst under hydrogen circulation is detected and calculated using, for instance, a mass spectrometer, a hydrogen flame ionization detector (FID), or a thermal conductivity detector (TCD).

It is also possible to use infrared absorption spectroscopy, which is highly sensitive to metal carbonates. The amount of carbonate contained in the catalyst can be quantified by irradiating the catalyst with infrared light and measuring the absorption intensity of the peak of each wavelength characteristically absorbed by the carbonate. For example, the positions of peaks that can be used for the quantification of Ba carbonate are, for instance, at or near 3000 $cm^{-1}$, 2450 $cm^{-1}$, 1750 $cm^{-1}$, 1480 $cm^{-1}$, and/or 1060 $cm^{-1}$.

The following table shows each melting point of, for instance, an oxide of Ba or Sr, which oxide has a large value of partial negative charge of oxygen, among Group 2 elements, or Cs or K, which is an alkali metal.

TABLE 2

| Element | Melting point | | | Partial negative charge Oxide ($-\delta_O$) |
|---|---|---|---|---|
| | Oxide | Hydroxide | Carbonate | |
| Ba | 1923° C. (BaO) | 408° C. (Ba(OH)$_2$) 78° C. (Ba (OH)$_2$ · 8 H$_2$0) | 811° C. (BaCO$_3$) | 0.67 |
| Cs | 490° C. (Cs$_2$0) | 272.3° C. (CsOH) | 610° C. (Cs$_2$CO$_3$, decomposition) | 0.96 |
| Sr | 2430° C. (SrO) | 710° C. (Sr(OH)$_2$) | 1497° C. (SrCO$_3$) | 0.62 |
| K | >490° C. (K$_2$0, decomposition) | 360° C. (KOH) | 891° C. (K$_2$CO$_3$) | 0.89 |

From the measurement results of H2-TPR described later, it is considered that the following reaction has occurred.

$$BaCO_3 + 4H_2 \rightarrow BaO + CH_4 + 2H_2O \qquad (5)$$

The oxide of Ba has a high melting point, but as described above, the oxide has undergone a hydroxide having a low melting point during heat treatment in a hydrogen atmosphere. Thus, fluidity is obtained by melting the hydroxide. At this time, both Ba and the metal element B exist as strongly basic compounds. Accordingly, the Ba compounds flow on the metal particles as a result of mutual repulsion or interfacial tension or for some other reasons. Then, a state in which Ba hydroxide is distributed like particles is generated on the surfaces of the metal particles. After the reaction, it becomes an oxide with its fluidity lost and its volume reduced. Therefore, high activity is considered to be expressed by immobilization while this state having voids remains. As used herein, a state where the metal surface further has particles is referred to as a "distributed" or "deposited" state.

As described above, the element has strong original basicity, and it is easy to lower the carbonate that inhibits the basicity. This can increase the ammonia synthesis activity. From this point, Ba is particularly preferable as the metal element A.

The oxide of the metal element B is a main component of the composite oxide, and exhibits weak basicity (also including very weak basicity; the same applies to the following description) in the invention. In $Ba_n La_{1-n} O_x$, which is a binary composite oxide described in the prior art documents, each value of partial negative charge in the oxide of Ba and La, which are two metal elements, is high (Ba is 0.67 and La is 0.56.), whereas in the invention, the value of partial negative charge in the oxide of the metal element B is as low as 0.35 or more and 0.55 or less.

<Deposition>

In the invention, the oxide of the metal element L and the oxide of the metal element N are phase-separated without forming any solid solution, and the oxide of the metal element L is deposited on surfaces of oxide particles of the metal element N and further deposited on surfaces of metal particles on which the oxide of the metal element L is supported. Thus, even if the oxide of the metal element N has weak basicity while the oxide of the metal element L has strong basicity, the ammonia synthesis activity is increased by the oxide of the metal element L. Because of this, even if the oxide of the metal element N has lower basicity than conventional ones, high ammonia synthesis activity is exhibited.

The oxide of the metal element N preferably has a larger specific surface area (SSA). This is because when the specific surface area of the oxide of the metal element N, which is the main component of the composite oxide, is large, fine nanoparticles such as Co can be firmly immobilized, and the number of active sites of these nanoparticles increases, and the ammonia synthesis activity becomes higher. Thus, from the viewpoint of the size of the specific surface area, Mg (magnesium) is particularly preferable as the metal element N. The metal element N is a main component of the composite oxide. The oxide of the metal element N plays a large role as a carrier when the metal element N is used in a transition metal-carrier material to form a catalyst.

From the above viewpoint, the composite oxide of formula (1) or formula (2) is preferably $Ba_n Mg_{1-n} O_x$ (where $0.001 \leq n \leq 0.300$).

Here, for $Ba_nMg_{1-n}O_x$, the composition ratio of Ba (that is, the value of n) is preferably within the range of $0.01 \leq n \leq 0.10$. As shown in Examples described later, when the range of 0.01 n 0.10 is satisfied, the ammonia synthesis activity (yield, product amount) tends to increase.

<Metal-Carrier Material>

The metal-carrier material in the invention has particles of a transition metal, except for a Group 4 metal, supported on the composite oxide of the invention. From the viewpoint of high catalytic activity, the transition metal is preferably at least one element selected from the group consisting of Ru, Fe, Co, Ni, Rh, Pd, Os, Ir, and Pt, and more preferably Ru, Co, or a mixture of Fe and Co. Among them, Co is particularly preferable from the viewpoint of high ammonia synthesis activity when combined with the composite oxide of the invention. The amount ratio between the transition metal and the composite oxide can be determined in consideration of the catalytic activity and the cost of the transition metal. For example, the percentage of the transition metal based on the whole metal-carrier material is preferably from 0.1 to 50 wt % and more preferably from 5.0 to 30 wt %.

The transition metal M in the invention and any of an oxide of the metal element L or an oxide of the metal element N form no solid solution. In particular, it is preferable that a structure in which oxide particles of the metal element L are deposited on and cover particles of the transition metal M is further deposited on surfaces of oxide particles of the metal element N as a main component. Specifically, it is preferable to have what is called a core/shell relationship in which the transition metal M is used as a core and the metal element N is used as a shell. The transition metal M is preferably entirely covered with the oxide particles of the metal element L, and supported on the oxide particles of the metal element N as a carrier via the oxide of the metal element L. Such a structure seems to be present because the oxide of the metal L having fluidity covers the transition metal M while the metal L is supported on the metal N, the transition metal M is supported, and the high temperature reduction treatment is then performed. If the amount of the metal L is too large relative to the amount of the metal element N as a carrier or too large relative to the amount of the transition metal, the layer becomes too thick, so that neither nitrogen nor hydrogen can reach the transition metal surface as an active point. This is not preferable. Further, when calcination is performed at a high temperature exceeding 700° C. or for a long time, the oxide particles of the metal L aggregate. This is also not preferable because neither nitrogen nor hydrogen can reach the transition metal surface as an active point.

An oxide of the metal element L and an oxide of the metal element N in a mixed state forms a composite oxide of the invention. Particularly preferred is a layered structure in which oxide particles of the metal element L are deposited on surfaces of oxide particles of the metal element N as a main component. Note that it is most preferable that both are in what is called a core/shell relationship. Further, the metal element L may be absent inside the catalyst carrier, and the metal element L is preferably present on the carrier surface. In particular, an oxide of the metal element A and an oxide of the metal element B in a mixed state forms a composite oxide of the invention. Particularly preferred is a layered structure in which oxide particles of the metal element A are deposited on surfaces of oxide particles of the metal element B as a main component. Note that it is most preferable that both are in what is called a core/shell relationship. Further, the metal element A may be absent inside the catalyst carrier, and the metal element A is preferably present on the carrier surface.

The oxide of the metal element L and the oxide of the metal element N form no solid solution and are in a mixed state (phase-separated). Thus, when the metal-carrier material (catalyst) described later is formed, the transition metal particles are in direct contact with the oxide of the metal element L on the surface of the composite oxide. Since the oxide of the metal element L (e.g., Ba) is strongly basic, it is presumed that the transition metal particles come into direct contact with these oxides to increase the number of active sites exhibiting high activity, thereby increasing the ammonia synthesis activity. Meanwhile, in the case of Co, the basicity of the cation is important, and the ammonia synthesis activity is higher when the oxide of the metal element A such as Ba has a larger partial negative charge of oxygen.

The particle diameter ratio A/M between the oxide particles of the metal element A and the metal particles M is usually 20% or less, preferably 10% or less, and more preferably 5% or less. In order to change the particle size, the ratio of the metal element A to the transition metal M is adjusted. When the particle diameter ratio is too large or too small, it tends to be difficult to obtain the expected catalytic activity.

In addition, the ratio between the value ($D_{ads}$) of Co dispersibility calculated by the $H_2$ pulse chemical adsorption method and the value ($D_{TEM}$) of Co dispersibility estimated from the average particle diameter of the Co particles as calculated from a TEM image is preferably $0 < D_{ads}/D_{TEM} < 1$. The Co dispersibility represents the ratio of the number of Co atoms exposed on the surface of the metal-carrier material to the number of all Co atoms contained in the metal-carrier material. The Co dispersibility may be determined from the hydrogen adsorption amount of the metal-carrier material having Co supported thereon.

Specifically, assuming that one Co atom adsorbs one H atom, the Co dispersibility is defined as the ratio (H/Co) of the number of hydrogen atoms H corresponding to the number of Co atoms exposed on the surface of the metal-carrier material to the total number of atoms Co supported on the metal-carrier material. As used herein, the Co dispersibility based on the hydrogen adsorption amount is expressed as $D_{ads}$. By comparing between metal-carrier materials carrying the same amount (the same number of atoms) of Co, it can be considered that the higher the Co dispersibility, the larger the number of catalytically active points.

In addition, assuming that the form of Co particles is a cube, it has been known that the value of the dispersibility of Co can be geometrically determined using the average particle diameter (d; unit: nm) of Co as determined by TEM observation (see the document "Dictionary of Catalysts"). The calculation method can be expressed by general formula (8). The average particle size of Co can be calculated by randomly extracting 100 to 150 Co particles from a TEM image, measuring the particle sizes of the Co particles, and averaging the particle sizes. As used herein, the value of the Co dispersibility obtained based on general formula (4) is expressed as $D_{TEM}$.

$$D_{TEM} = 0.732/d \qquad (8).$$

Hence, the fact that $D_{ads}/D_{TEM}$ is less than 1 means that part of the Co particles, mainly at or near the interface between the particles and the composite oxide (carrier), or the particle surface is coated with the oxide of the metal element B, and the adsorption of H atoms onto the Co particle surface is prevented.

The turnover frequency of catalyst (TOF) represents the number of reactions that have proceeded per unit time at one active point on the catalyst surface. The present application specifies the number of ammonia molecules generated during one second per atom of the surface Co as an active point.

The average particle diameter of Co supported on the composite oxide is preferably 100 nm or less, more preferably 50 nm or less, and still more preferably 20 nm or less. It is advantageous that the smaller the particle diameter of Co, the larger the number of active points in the case of being used as an ammonia synthesis catalyst. The lower limit of the average particle diameter of Co is not particularly limited, but is, for example, 0.5 nm or more or 1 nm or more.

The metal-carrier material in the invention is fine particles containing supported metal cobalt having an average particle diameter of 100 nm or less. This allows for a very high ammonia synthesis rate under mild ammonia synthesis conditions (at 300 to 500° C. and at 0.1 to 20 MPa).

Note that as used herein, in order to simplify the expression, a metal-carrier material represented by "$Ba_{0.01}Mg_{0.99}O_{1.00}$ having Co supported thereon" is represented by "$Co/Ba_{0.01}Mg_{0.99}O_1$", and a metal-carrier material subjected to reduction treatment is represented by "$Co/Ba_{0.01}Mg_{0.99}O_x$". The same expression will be used for other carrier materials. Here, x means that 1.00, which is the molar ratio of oxygen at the time of calcination, was reduced to x along with the reduction. Note that when simply herein described as $ABO_x$, it means that the amount ratio between A and B is not specified, and does not mean $A_{1.00}B_{1.00}O_x$.

Here, x in general formula (2) as representing the ratio of oxygen 0 in the composite oxide is the number of oxygen atoms required to keep the composite oxide electrically neutral. The x generally falls within the range of $0.5 < x \leq 2$, and particularly falls within the range of $0.9 < x \leq 1$, depending on the types of elements A and B.

<Effect of Reduction Temperature on Ammonia Synthesis Activity>

The catalyst in the invention is activated by hydrogen reduction pretreatment at a high temperature. This is because Co is reduced. At this time, a characteristic structure in which the oxide of the metal element A is deposited on surfaces of the Co particles is developed. In general, when the reduction pretreatment is performed at a high temperature, the specific surface area decreases and the metal particle diameter increases as the carrier is sintered. This can cause a decrease in the catalytic activity.

Figure 4:
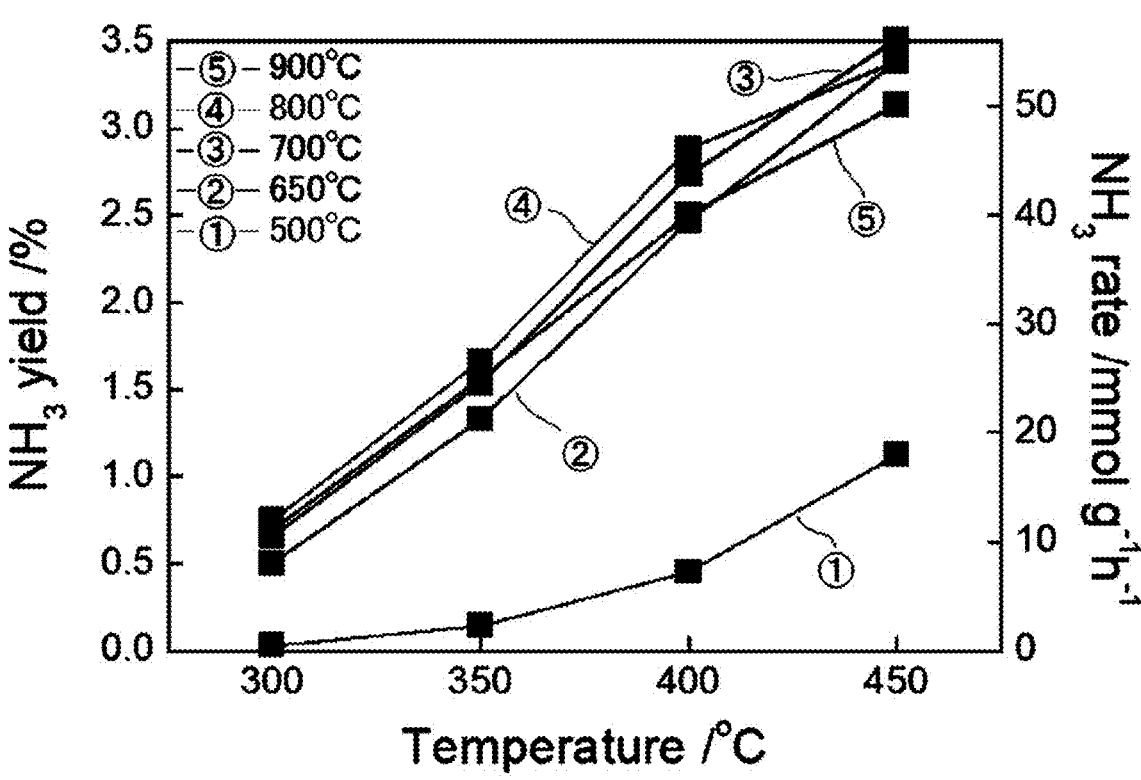
FIG. 4 is a graph showing ammonia synthesis activity measured using each $Co/BaMgO_x$ catalyst prepared by changing a reduction temperature of the $Co/BaMgO_x$ catalyst in Examples.
Figure 5:
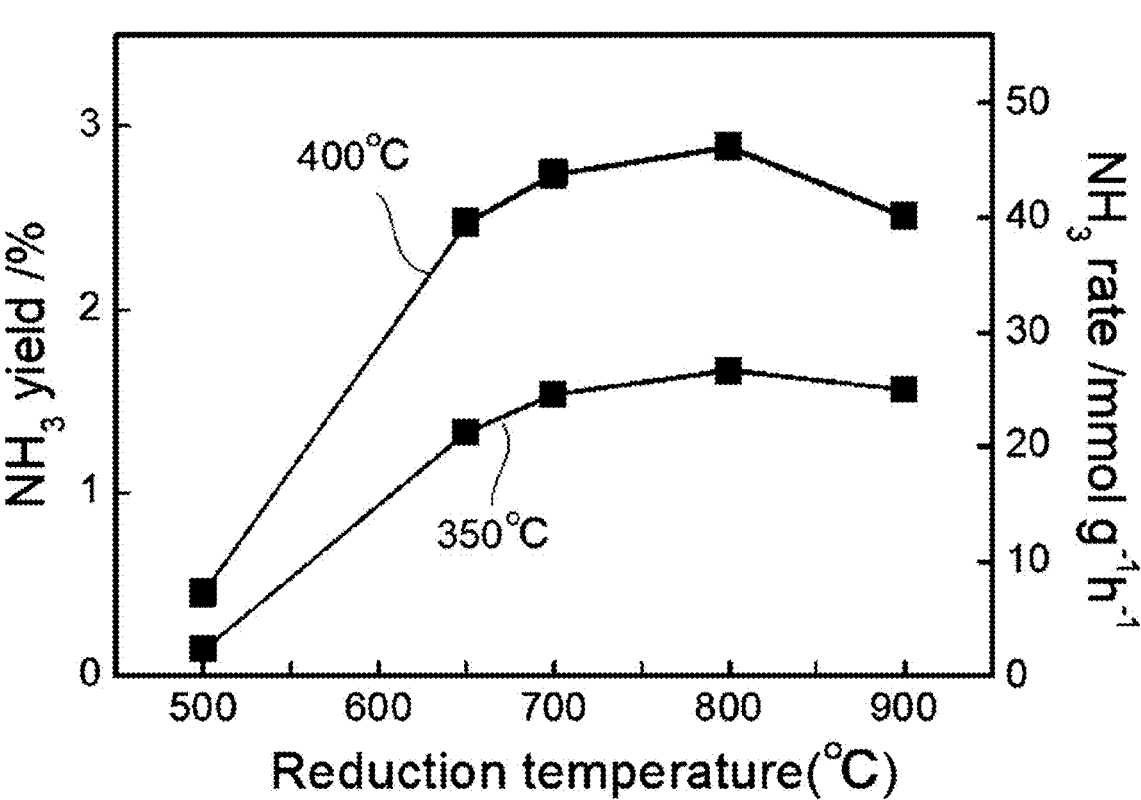
FIG. 5 is a graph showing ammonia synthesis activity measured using each $Co/BaMgO_x$ catalyst prepared by changing a reduction temperature of the $Co/BaMgO_x$ catalyst in Examples.

FIGS. 4 and 5 are graphs showing the ammonia synthesis activity of each catalyst produced at different reduction temperatures in Examples ($Co/BaMgO_x$) described later. From the graphs, it is found that the ammonia synthesis activity increases as the reduction temperature becomes higher, the rate of ammonia synthesis is the highest when the reduction is performed at 700° C. or 800° C., and the rate of ammonia production slightly decreases when the reduction is performed at 900° C. as compared with the case at 800° C.

Figure 6:
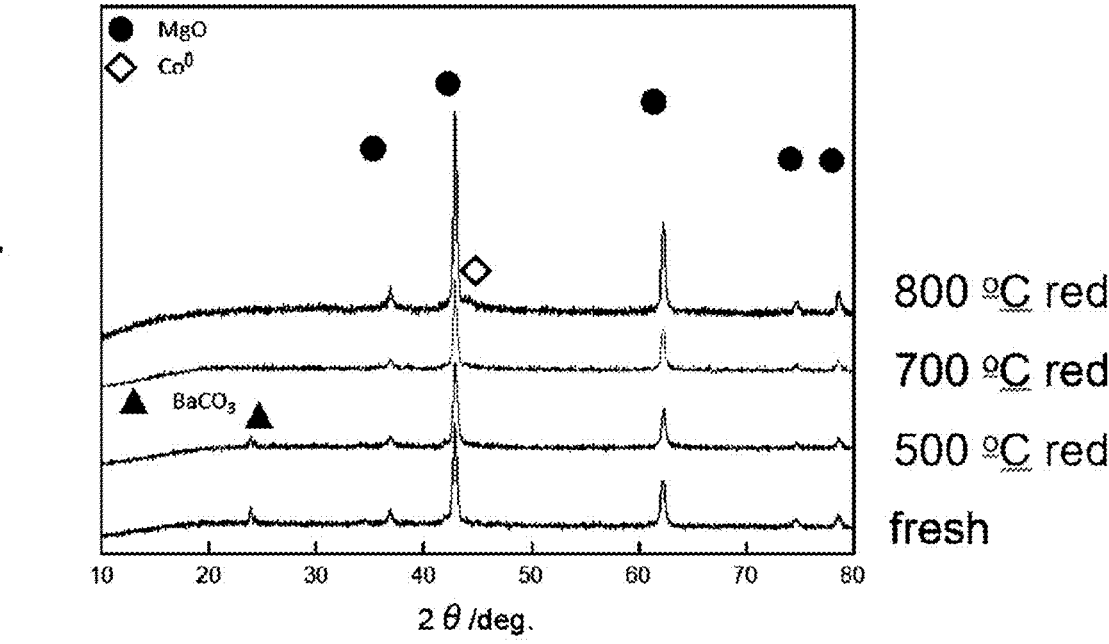
FIG. 6 is an XRD pattern measured using each $Co/BaMgO_x$ catalyst prepared by changing a reduction temperature of the $Co/BaMgO_x$ catalyst in Examples.

FIG. 6 shows an XRD pattern of $Co/BaMgO_x$ in Examples described later. As can be seen from this figure, a peak attributed to $BaCO_3$ was observed before reduction. It is found that when the reduction temperature is increased to 700° C. or higher, the peak of $BaCO_3$ disappears, so that $BaCO_3$ is decomposed. It is also found that the peak of Co increases as the reduction temperature becomes higher.

Figure 12:
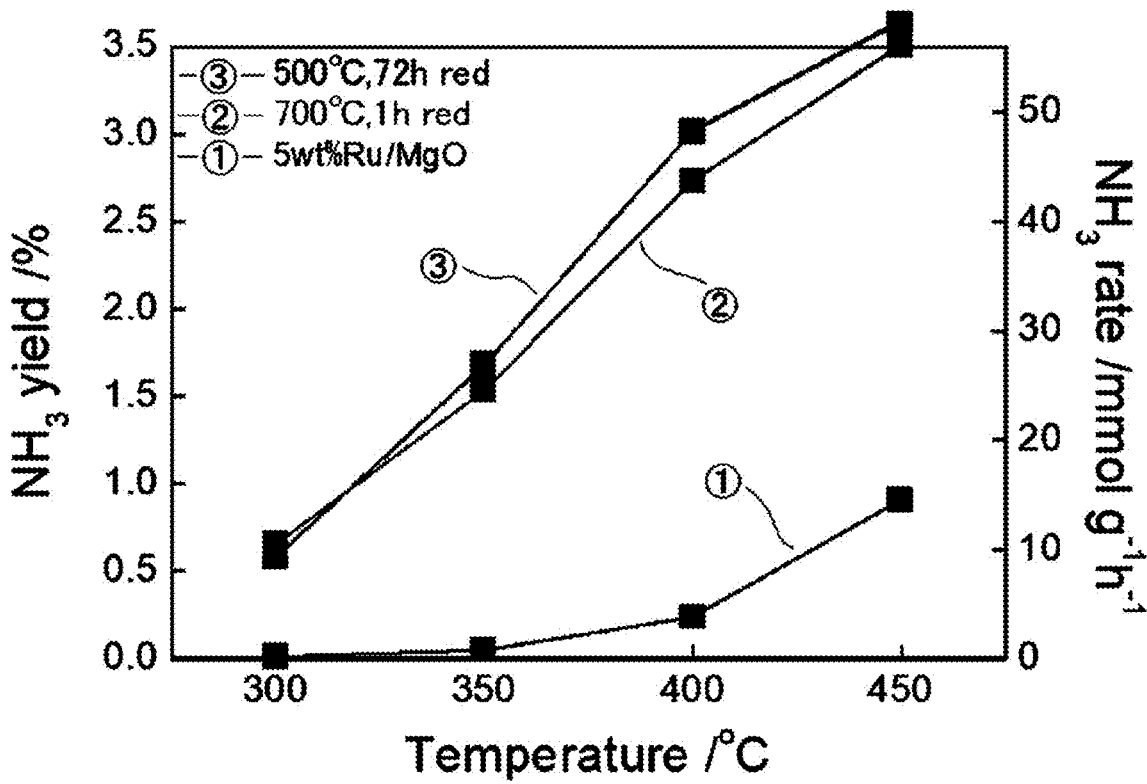
FIG. 12 is a graph showing ammonia synthesis activity measured using each $Co/BaMgO_x$ catalyst prepared by changing pretreatment conditions for the $Co/BaMgO_x$ catalyst in Examples.

As shown in FIG. 12, it was found that the catalyst reduced at 500° C. for 72 h exhibited performance comparable to that of the catalyst reduced at 700° C. for 1 h. This shows that the highly active catalyst in the invention can be obtained by reduction for a long time at a low temperature or for a short time at a high temperature.

As the reduction temperature becomes higher, the TOF (turnover frequency of catalyst) tends to increase.

That is, the ammonia production rate decreases when the reduction temperature becomes higher than 800° C. This seems to be because the specific surface area decreases due to the sintering-mediated enlargement of the carrier particles, so that the sintering of Co proceeds; and the surfaces of the Co particles are excessively covered with the oxide of the metal element A, so that the number of active sites decreases.

A metal-carrier material having Co supported as a catalyst may be used to produce ammonia by reacting nitrogen with hydrogen. The method for synthesizing ammonia itself is not particularly limited, but for example, ammonia can be produced by supplying a raw material gas composed of hydrogen gas and nitrogen gas into a reactor loaded with the catalyst. The reaction temperature is preferably from 300 to 550° C., more preferably from 300 to 500° C., and still more preferably from 300 to 450° C.

Figure 10:
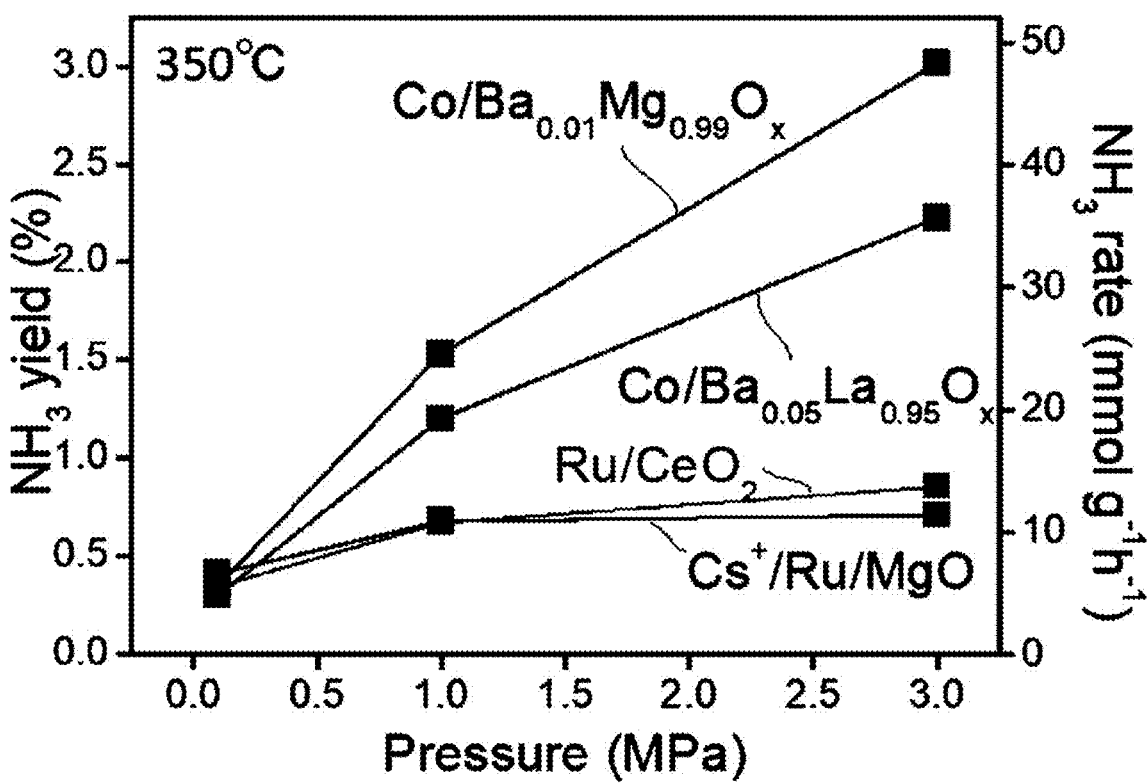
FIG. 10 is a graph showing ammonia synthesis activity measured by changing a reaction pressure for the $Co/BaMgO_x$ catalyst in Examples.
Figure 11:
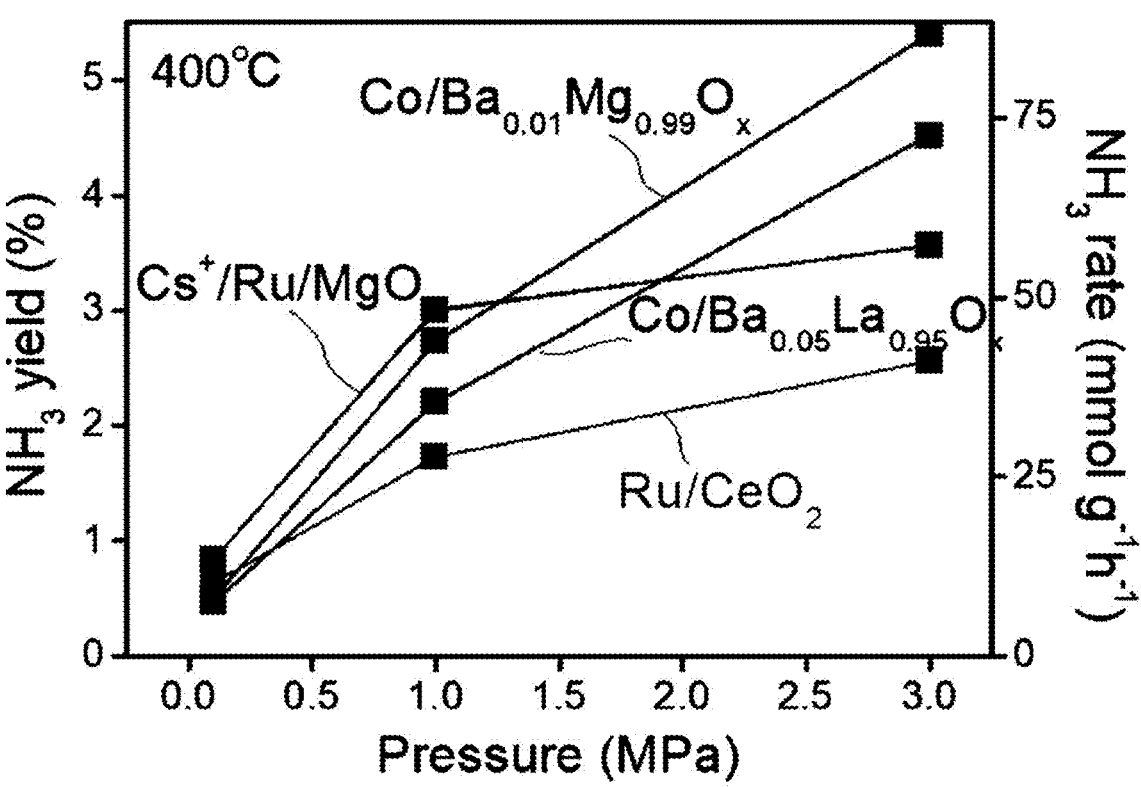
FIG. 11 is a graph showing ammonia synthesis activity measured by changing a reaction pressure for the $Co/BaMgO_x$ catalyst in Examples.

When ammonia is synthesized using the catalyst in the invention, the reaction pressure is preferably from 0.1 to 20 MPa, which is a low pressure, more preferably from 0.1 to 15 MPa, and still more preferably from 0.1 to 10 MPa. As shown in FIGS. 10 and 11, it is found that the activity of the catalyst having Co supported is higher even under a high pressure reaction condition than the activity of the catalyst having Ru supported. This is because Co is less susceptible to hydrogen poisoning than Ru, and the activity is thus less likely to decrease even under a high pressure. That is, regarding Ru, the interaction between Ru and the hydrogen atom adsorbed on the surface under a high pressure becomes strong, so that the desorption of the hydrogen atom hardly occurs, the active point on the Ru surface is blocked, and the ammonia synthesis reaction started by the adsorption of nitrogen molecules onto the active point is unlikely to occur. Since Co has a weaker interaction with hydrogen than Ru, such a phenomenon is less likely to occur, and the ammonia synthesis activity is less likely to decrease even at a high pressure. In the ammonia synthesis reaction, the ammonia yield generally tends to increase as the pressure increases due to thermodynamic equilibrium. Therefore, by using the ammonia synthesis catalyst according to the invention, a higher yield should be obtained under a high pressure condition of, for example, about 10 MPa. In addition, since Co has a crustal abundance 10,000 times or more than Ru, Co is more versatile than Ru and the cost can also be reduced.

When a metal-carrier material having Co supported is used as a catalyst, it is preferable that the composite oxide serving as a carrier contains Ba from the viewpoint of catalytic activity. This combination exploits sufficient ammonia synthesis activity even in the case of using Co, which is less expensive than Ru. Even when the reaction pressure is high, the catalyst is less susceptible to hydrogen poisoning than the Ru catalyst. Thus, the reaction pressure is most preferably from 1 to 10 MPa.

<Method of Producing Composite Oxide/Metal-Carrier Material>

Next, a method of producing a composite oxide or a metal-carrier material according to the invention will be described. The composite oxide of the invention may be produced by the following method comprising:

(a) an impregnation step of impregnating a metal element L-containing L precursor with a metal element N-containing N precursor;

(b) a composite oxide calcination step of calcinating the resulting mixture at a temperature of 500° C. or higher to obtain a carrier containing a composite oxide.

The metal-carrier material in the invention can be produced from the composite oxide obtained in the above (a) and (b) by the following method further comprising:

(c) a supporting step of impregnating the composite oxide with a metal particles M-containing compound precursor to obtain an impregnated carrier;

(d) a carrier material calcination step of calcinating the impregnated carrier at a temperature of 400° C. or higher.

Hereinafter, step (a) will be described. Step (a) corresponds to the method of producing a composite oxide of the invention. In this step, the composite oxide is produced by mixing and impregnating a metal element L-containing L precursor and a metal element N-containing N precursor to obtain a mixture (composite oxide precursor).

The composite oxide precursor may be prepared by various methods such as a precipitation method or a complex polymerization method. For example, it is possible to use a neutralization precipitation method for obtaining a hydroxide by reacting a precipitating agent (e.g., ammonia, sodium hydroxide, cesium hydroxide) with a nitrate, chloride, acetate, carbonate, or sulfate of A and/or B.

The precursor of the composite oxide may also be obtained by separately preparing and mixing those containing at least one element selected from the metal element L or the metal element N. In this way, a metal element L-containing compound and a metal element N-containing compound are mixed to obtain a mixture.

Next, step (b) will be described. This step is a step of calcinating the mixture obtained in step (a). In this step, the generated mixture (composite oxide precursor) is changed into a composite oxide having a high specific surface area by calcination.

The calcination is preferably performed at a low temperature of about 200 to 400° C. for about 1 to 10 h, at an intermediate temperature of about 400 to 600° C. for about 1 to 10 h, or at a high temperature of about 600 to 700° C. for about 1 to 10 h. The calcination temperature in the final step is most preferably 700° C. This calcination may be performed at any oxygen concentration as long as the atmosphere is in the air or contains oxygen, such as a mixed gas containing oxygen and inert gas.

Hereinafter, step (c) will be described. In step (c), the composite oxide obtained in step (b) is stirred together with a solvent in which a source for transition metal particles such as cobalt, iron, or nickel has been dissolved; in this way, the source for transition metal particles is impregnated with the composite oxide; the solvent is then removed by heating, followed by decomposition of the source for transition metal particles; and this results in a pre-reduction carrier material in which the transition metal particles in a fine particle form are supported on the composite oxide carrier.

As a source (cobalt source) for transition metal Co particles, various compounds containing Co may be used, and examples thereof include an organometallic compound such as cobalt (II) acetylacetonato. Among them, cobalt (II) acetylacetonato is particularly preferable from the viewpoint of high ammonia synthesis activity. It is also possible to use other cobalt sources capable of supporting cobalt on the composite oxide, such as cobalt nitrate, cobalt chloride, or cobalt nitrosyl nitrate.

When an organometallic compound such as cobalt (II) acetylacetonato is used as the cobalt source, it is advantageous to use an organic solvent as the solvent. Examples of the organic solvent include tetrahydrofuran (THF), methanol, ethanol, hexane, or toluene. These solvents may be used without particular pretreatment as long as they are common commercial products, but it is more preferable to use those having been subjected to, for instance, purification or dehydration. The solid content concentrations of the composite oxide and the cobalt source based on 1 L of the solvent are generally preferably about 1 to 30 g/L and about 0.1 to 3 g/L and more preferably about 10 to 30 g/L and about 0.1 to 0.3 g/L, respectively. The stirring may be performed at room temperature, and the stirring time is preferably from 1 to 24 h and more preferably from 6 to 12 h. The solvent may be removed by various types of heating, and for example, it is preferable to remove the solvent under reduced pressure and/or in a low-temperature atmosphere by using, for instance, an evaporator. The cobalt source is decomposed by heating in an inert atmosphere such as a helium, argon or nitrogen atmosphere. The decomposition may be implemented in a hydrogen-containing atmosphere. The heating is performed at a temperature of about 200 to 600° C. for about 1 to 12 h. A more preferable heating temperature is about 300 to 500° C., and a more preferable heating time is about 3 to 6 h.

As the ruthenium source, various compounds containing Ru may be used. Preferably, an organometallic compound such as triruthenium dodecacarbonyl or ruthenium acetylacetonato may be used. It is also possible to use other ruthenium sources capable of supporting ruthenium on the composite oxide, such as ruthenium chloride or ruthenium nitrosyl nitrate.

Hereinafter, step (d) will be described. Next, the thus-obtained pre-reduction carrier material (impregnated carrier) is subjected to reduction treatment. The reduction treatment is performed, for example, for the purpose of reduction of transition metal particles or reduction for destruction of a carbonate described later. The reduction temperature is 400° C. to 800° C. and preferably 600 to 700° C. When the reduction temperature is a high temperature exceeding 500° C., the reduction time is usually 10 min to 40 h, and preferably about 30 min to 5 h. When the reduction temperature is low, the reduction time is from 48 h to 120 h and preferably from 60 h to 100 h. The reduction treatment is performed in the presence of a reducing gas such as hydrogen gas.

In the case of containing strongly basic Ba, it is known that BaO reacts with, for instance, carbon dioxide in the air to easily form barium carbonate ($Ba(CO_3)$) or barium hydroxide ($Ba(OH)_2$)). When a carbonate or a hydroxide is formed in this way, the partial negative charge of oxygen in BaO is significantly lowered, and high basicity cannot be obtained. Therefore, in order to exhibit high ammonia synthesis activity, it is necessary to break down the carbonate and/or the hydroxide by some suitable treatment. For example, as a method of breaking down Ba carbonate into BaO, heat treatment (reduction treatment) under circulation of hydrogen gas is effective. This reaction is represented by the following formula:

$$BaCO_3 + 4H_2 \rightarrow BaO + CH_4 + 2H_2O \qquad (5)$$

When the catalyst is heated in a hydrogen atmosphere, hydrogen is dissociated on the surface of the supported metal species, and hydrogen species having strong reducing power are generated. The hydrogen species cause Ba carbonate to break down and change into BaO.

Examples of the method of breaking down Ba carbonate include retaining the catalyst under hydrogen circulation at a temperature of 550° C. or higher for about 1 h. Preferable conditions are at about 600° C. to 800° C.

In addition, it is also possible to break down Ba carbonate by keeping the catalyst under hydrogen circulation at a low temperature for a long time. Preferable conditions are at 500° C. for about 48 h, at 450° C. for about 72 h, or at 400° C. for 120 h or longer.

Such a method may be used to break down Ba carbonate. In order to exploit the basicity of Ba, it is desirable to decrease the proportion of Ba present as a carbonate as much as possible. The proportion of Ba present as a carbonate in the catalyst is preferably 10 mol % or less, more preferably 1 mol % or less, still more preferably 0.1 mol % or less, and particularly preferably 0.01 mol % or less based on the total amount of Ba contained in the catalyst.

The calcination temperature in step (d) is most preferably 700 to 800° C. If the calcination temperature in this step is too high, excessive sintering of the carrier and the active metal proceeds during the reduction treatment. As the particle diameter increases, the number of active points decreases and the catalyst performance thus decreases.

On the other hand, if the calcination temperature in this step is too high, the specific surface area of the carrier becomes smaller. As a result, the dispersion state of the active metal is poor and the particle diameter is increased. This causes a decrease in the number of active points, thereby lowering the catalyst performance.

Regarding the relationship between the calcination temperature and the reduction temperature, as described above, from the viewpoint of ammonia synthesis activity, it is preferable to fire the carrier at a temperature substantially equal to or higher than the reduction treatment temperature.

Figure 35:
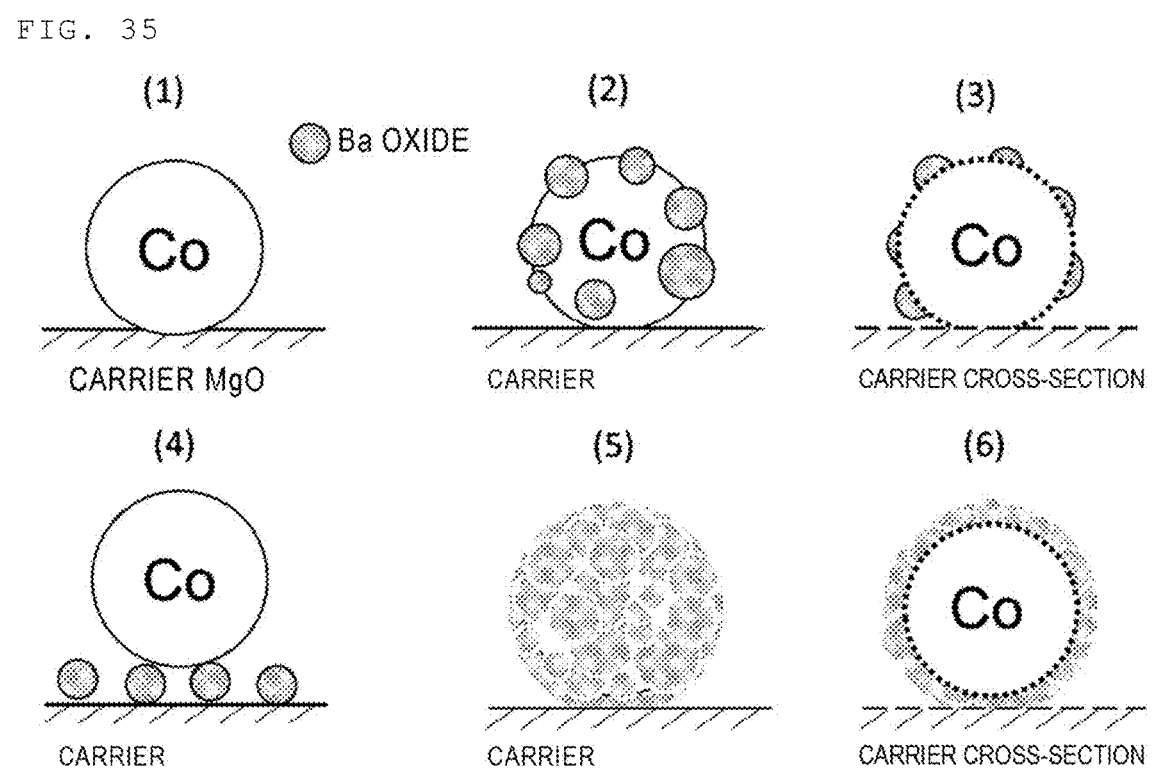

FIG. 35 illustrates the above circumstances. FIG. 35 illustrates the difference due to the difference in the method of producing the metal-carrier material Co/BaMgOx. Although the inventors have disclosed Ba/Ru/MgO in a prior work (see Examples 80 and 81 in WO 2019/059190), the production method at this time is implemented herein as follows. Specifically, Co is supported on MgQ to form a compound (1) of FIG. 35; barium is further supported to form a compound (2); and reduction is then performed at a high temperature of, for example, 700° C. to produce a structure (2). That is, a transition metal Co is deposited on MgO as a carrier, and barium oxide is deposited thereon, but Co and MgO are in direct contact with each other in view of the cross section (3).

On the other hand, a metal-carrier material is produced by the method of the invention as follows. Specifically, since BaO is supported on MgO and Co is then supported, (4) is obtained and thereafter, when (4) is reduced at, for example, 700° C., (5) is generated. This is because the Ba compound supported during the high-temperature reduction treatment obtains fluidity and migrates so as to cover Co. Thus, when the cross section (6) is observed, MgO and Co are not in direct contact with each other, and Co is disposed over MgO via the Ba compound. Since barium oxide covers Co at an appropriate density, nitrogen and hydrogen can reach Co, which is an active point.

The thus-obtained metal-carrier material in the invention is better in handleability and stability during reaction than conventional metal-carrier materials that have been used as ammonia synthesis catalysts.

Note that if Ba, for example, is contained in a composite oxide and the catalyst is in an oxide state at the time of production, the composite oxide, when exposed to the air, easily absorbs $CO_2$ to form a carbonate. For this reason, it is preferable to handle the composite oxide so as not to be exposed to $CO_2$ until use of the catalyst after Ba carbonate is decomposed by the above-described reduction treatment. For example, it is preferable to store the catalyst by sealing it in a container filled with, for instance, inert gas. However, even if part of the carrier becomes a carbonate, it is possible to decompose and lower the carbonate by hydrogenation to restore the ammonia synthesis activity.

It is unavoidable to periodically replace the metal-carrier material that is charged into a synthesis reactor and used as a catalyst. It is also planned to be used for a long period of time. This necessitates a metal-carrier material that is easy to handle and has excellent stability. The metal-carrier material in the invention is advantageous in this point Examples Next, the invention will be further described with reference to Examples. Of course, the invention is not limited to these Examples.

<To Measure Ammonia Synthesis Activity>

The ammonia synthesis activity of each metal-carrier material was measured in a fixed bed flow type reactor. The metal-carrier material pretreated by a procedure described in Examples and Comparative Examples was allowed to cool to 300° C. while Ar was circulated. While the temperature of the metal-carrier material layer was maintained at 300° C., the pressure was increased to 1.0 MPa or 3.0 MPa by using a back pressure valve at the outlet of a reaction tube while Ar was supplied. The charge of Ar was stopped, and $H_2$ and $N_2$ were circulated at 90 mL $min^{-1}$ and 30 mL $min^{-1}$ (space velocity 72 L $h^{-1}$ $g^{-1}$), respectively, while the pressure was maintained, and transferred to the reaction atmosphere. Here, 200 mL of 1 to 100 mM (1, 5, 10, 25, or 100 mM) sulfuric acid aqueous solution according to the level of $NH_3$ synthesis activity was added to a three-necked flask connected with an electric conductivity meter. A mixed gas containing hydrogen (purity: 99.995%, manufactured by FUKUOKA OXYGEN CO., LTD.), nitrogen (purity: 99.995%, manufactured by FUKUOKA OXYGEN CO., LTD.), and $NH_3$ flowing out from the outlet of the reaction tube was bubbled into the sulfuric acid aqueous solution. When impurities such as moisture and oxygen were removed, a gas purifier (gas purification filter MC50-904F, manufactured by SAES Inc.) was used to adjust the purity to 99.99999999 or higher. At this time, the amount of ammonia that was produced and contained in the outlet gas was quantified by measuring a change in electric conductivity as caused by the reaction of $NH_3$ with sulfuric acid. Next, the temperature of the metal-carrier material was raised to 350° C., 400° C., or 450° C. When the temperature of the metal-carrier material layer was stabilized at 350° C., 400° C., or 450° C., the metal-carrier material layer was left for 10 min. The amount of ammonia produced was then quantified by the same procedure as described above.

<Powder X-Ray Diffraction>

The powder X-ray diffraction pattern of each metal-carrier material (catalyst) was measured with a SmartLab X-ray diffractometer (Rigaku).

<To Measure Specific Surface Area (SSA)>

The specific surface area of each metal-carrier material was determined from the nitrogen adsorption amount at 77 K by a BET method using a BEL-sorp mini (BEL Japan, Inc.). Before the measurement, vacuum heating at 300° C. was performed for 2 h as pretreatment.

1. To Compare Between $Co/Ba_{0.01}Mg_{0.99}O_x$_Reduced at 700° C. and $Co/Ba_{0.05}La_{0.95}O_x$ Reduced at 700° C.

Example 1

<$Co/Ba_{0.01}Mg_{0.95}O_x$_Reduced at 700° C.>
<To Prepare Composite Oxide>

The $Ba_{0.01}Mg_{0.99}O_x$ composite oxide was synthesized as follows. $Ba(OH)_2$ (Wako Pure Chemical Industries, Ltd.) was dissolved in purified water to prepare a $Ba(OH)_2$ aqueous solution. In this way, 200 mL of a precursor solution containing 0.000625 mol of Ba was prepared. To this was added 2.5 g of MgO (Ube Materials Co., Ltd.), and stirring was continued at room temperature for 1 h while stirring with a magnetic stirrer at 320 rpm. The suspension was evaporated to dryness by using a rotary evaporator, and the resulting powder was then dried overnight using an oven set at 80° C. The dried powder was pulverized in a mortar, and the obtained powder was heated at 700° C. for 5 h in an air atmosphere by using an electric furnace to give $Ba_{0.01}Mg_{0.99}O_x$.

<To Support Co>

Co was supported on the carrier $Ba_{0.01}Mg_{0.99}O_x$ by an impregnation method. A tetrahydrofuran (THF) (Wako Pure Chemical Industries, Ltd.) solution in which cobalt (II) acetylacetonato (Wako Pure Chemical Industries, Ltd.) as a Co precursor had been dissolved was prepared in a 200-mL recovery flask. Next, 1 g of the carrier was added thereto, and the mixture was stirred at room temperature for 18 h or longer. Note that the amounts of the cobalt (II) acetylaceto-nato and the carrier to be used were suitably adjusted so that the amount of Co contained in the catalyst after heating under an argon atmosphere described below was 20 wt %. The stirred suspension was evaporated to dryness under reduced pressure at 35° C. and 0.3 atm by using a rotary evaporator, and then dried at 80° C. for 18 h in an oven. The resulting powder was heated at 500° C. for 5 h in a flow of argon at 80 mL min$^{-1}$ by using a tubular electric furnace to remove an acetylacetonato ligand in the precursor. The above procedure was used to produce a $Co/Ba_{0.01}Mg_{0.99}O_x$ metal-carrier material.
<Hydrogen Reduction Pretreatment>

The $Co/Ba_{0.01}Mg_{0.99}O_x$ obtained above was subjected to hydrogen reduction pretreatment (also simply referred to as "pretreatment") by the following procedure. The powdered metal-carrier material was pressed at 20 MPa for 5 min to prepare a disk, and this disk was then pulverized in a mortar and classified with a sieve to prepare each pellet. The size of the pellet was adjusted to 250 to 500 μm in diameter. A catalyst reaction tube made of Inconel (trademark) having a diameter of 7 mm was filled with 100 mg of the pellet, and the proximal and distal ends of the catalyst layer were immobilized with quartz wool. This reaction tube was placed in a fixed bed flow type reaction apparatus for ammonia synthesis activity measurement. Then, 60 mL min$^{-1}$ of $H_2$ was made to pass through the reaction tube filled with the pellet, and heated at 700° C. for 1 h to give $Co/Ba_{0.01}Mg_{0.99}O_x$_reduced at 700° C.

Comparative Example 1

<$Co/Ba_{0.05}La_{0.95}O_x$ reduced at 700° C.>

$Co/Ba_{0.05}La_{0.99}O_x$_reduced at 700° C. of Example 101 of WO 2019/216304 was used as a comparative example. The procedure described in this literature was used to produce $Co/Ba_{0.05}La_{0.95}O_x$ reduced at 700° C.

By using the metal-carrier material of Example 1 or Comparative Example 1, ammonia was synthesized at various temperatures (300° C., 350° C., 400° C., or 450° C.) and at a reaction pressure of 1 MPa, and the ammonia synthesis activity was measured by the procedure described above. The table below shows the results.

TABLE 3

| | Metal-carrier material | Firing temperature (° C.) | Reduction temperature (° C.) | Reaction temperature (° C.) | Ammonia yield (%) | Ammonia production rate (mmol g$^{-1}$h$^{-1}$) |
|---|---|---|---|---|---|---|
| Example 1 | $Co/Ba_{0.01}Mg_{0.99}O_x$ | 700 | 700 | 300 | 0.656 | 10.542 |
| | | | | 350 | 1.531 | 24.597 |
| | | | | 400 | 2.731 | 43.88 |
| | | | | 450 | 3.505 | 56.314 |
| Comparative Example 1 | $Co/Ba_{0.05}La_{0.95}O_x$ | 700 | 700 | 300 | 0.437 | 7.028 |
| | | | | 350 | 1.201 | 19.29 |
| | | | | 400 | 2.203 | 35.401 |
| | | | | 450 | 3.129 | 50.28 |

In addition, FIG. 1 also shows the results. In this graph, the ordinate on the right side represents the ammonia synthesis rate, the ordinate on the left side represents the ammonia yield, and the abscissa represents the reaction temperature. From this graph, it is found that at any reaction temperature, the metal-carrier material of Example 1 has a higher ammonia synthesis rate and a higher yield than the metal-carrier material of Comparative Example 1. It is also found that the higher the reaction temperature for ammonia synthesis, the higher the ammonia synthesis activity (synthesis rate, yield).

2. Study on Amount of Ba Added (Examples 1 to 6, Comparative Example 2)

Each metal-carrier material was produced by variously changing the ratio of the number of Ba moles to the total number of Ba and Mg moles (0 mol % (Comparative Example 2), 0.5 mol % (Example 2), 1 mol % (Example 1), 2 mol % (Example 3), 3 mol % (Example 4), 5 mol % (Example 5), 10 mol % (Example 6)) in Example 1.

By using the metal-carrier material of each of Examples 1 to 6 or Comparative Example 2, ammonia was synthesized at various temperatures (300° C., 350° C., 400° C., or 450° C.) and at a reaction pressure of 1 MPa, and the ammonia synthesis activity was measured by the procedure described above. The table below shows the results.

TABLE 4

| | Metal-carrier material | Reduction temperature (° C.) | Reaction temperature (° C.) | Ammonia yield (%) | Ammonia production rate (mmol g$^{-1}$h$^{-1}$) |
|---|---|---|---|---|---|
| Example 2 | Co/Ba$_{0.005}$Mg$_{0.995}$O$_x$ | 700 | 300 | 0.437 | 7.028 |
| | | | 350 | 1.158 | 18.603 |
| | | | 400 | 2.388 | 38.368 |
| | | | 450 | — | — |
| Example 1 | Co/Ba$_{0.01}$ Mg$_{0.99}$O$_x$ | 700 | 300 | 0.656 | 10.542 |
| | | | 350 | 1.531 | 24.597 |
| | | | 400 | 2.731 | 43.88 |
| | | | 450 | 3.505 | 56.314 |
| Example 3 | Co/Ba$_{0.02}$Mg$_{0.98}$O$_x$ | 700 | 300 | 0.54 | 8.681 |
| | | | 350 | 1.293 | 20.774 |
| | | | 400 | 2.151 | 34.553 |
| | | | 450 | 3.129 | 50.28 |
| Example 4 | Co/Ba$_{0.03}$ Mg$_{0.97}$O$_x$ | 700 | 300 | 0.489 | 7.855 |
| | | | 350 | 1.132 | 18.19 |
| | | | 400 | 2.019 | 32.433 |
| | | | 450 | 2.879 | 46.258 |
| Example 5 | Co/Ba$_{0.05}$Mg$_{0.95}$O$_x$ | 700 | 300 | 0.244 | 3.927 |
| | | | 350 | 0.72 | 11.575 |
| | | | 400 | 1.438 | 23.106 |
| | | | 450 | 2.253 | 36.202 |
| Example 6 | Co/Ba$_{0.1}$Mg$_{0.9}$O$_x$ | 700 | 300 | 0.27 | 4.341 |
| | | | 350 | 0.759 | 12.195 |
| | | | 400 | 1.478 | 23.742 |
| | | | 450 | 2.253 | 36.202 |
| Comparative Example 2 | Co/MgO$_x$ | 700 | 300 | 0.006 | 0.101 |
| | | | 350 | 0.02 | 0.318 |
| | | | 400 | 0.069 | 1.106 |
| | | | 450 | 0.205 | 3.301 |

Figure 2:
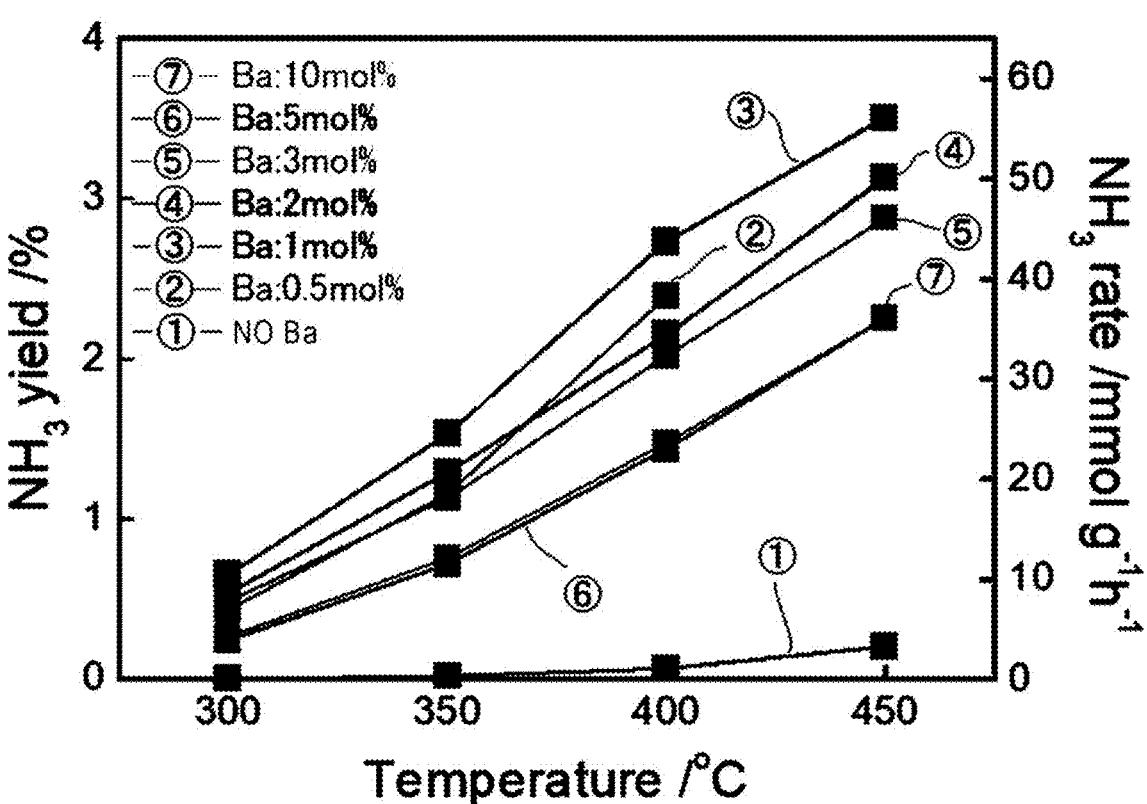
FIG. 2 is a graph showing ammonia synthesis activity measured using each catalyst $Co/BaMgO_x$ prepared by changing the amount of Ba added to a carrier of the $Co/BaMgO_x$ catalyst in Examples.
Figure 3:
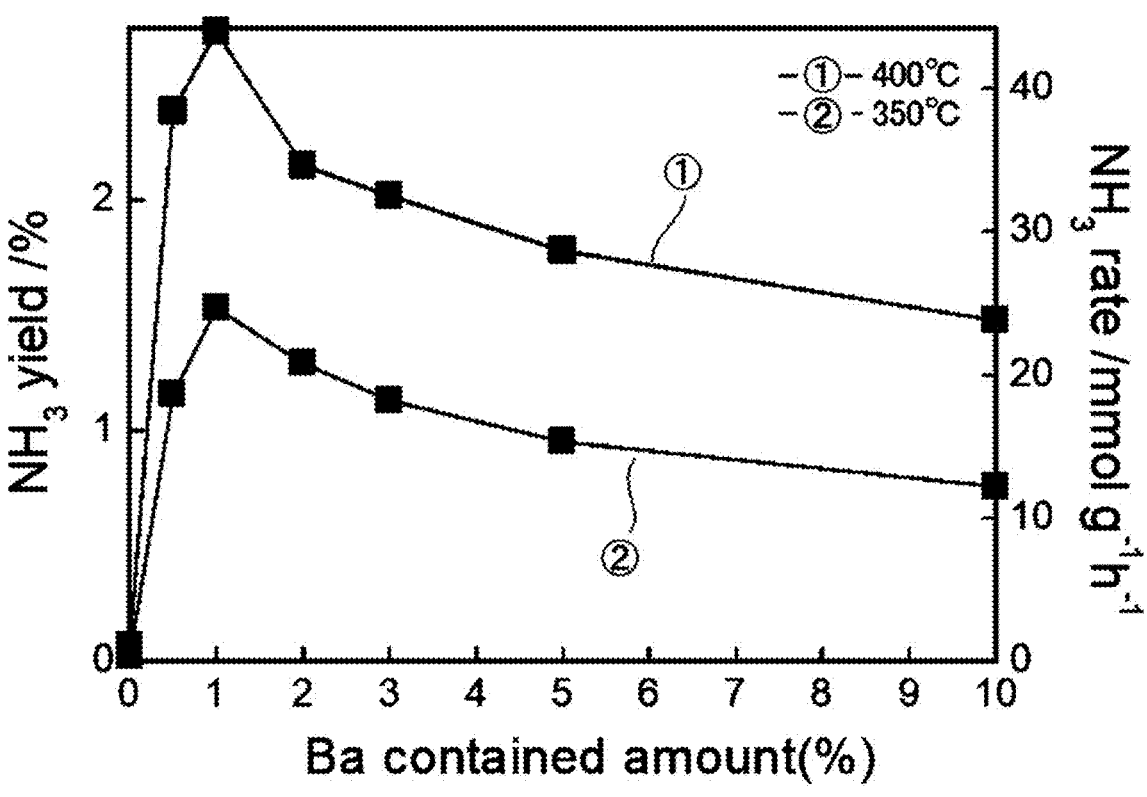
FIG. 3 is a graph showing ammonia synthesis activity measured using each $Co/BaMgO_x$ catalyst by changing the amount of Ba added to a carrier of the $Co/BaMgO_x$ catalyst in Examples.

In addition, FIGS. 2 and 3 also show the results. These graphs have indicated that the ammonia synthesis activity was improved as the amount of Ba added was increased; when the amount added was 1 mol %, the ammonia synthesis activity was maximized; and when the amount added was further increased, the ammonia synthesis activity gradually decreased. In addition, FIG. 3 has demonstrated that the Ba amount, at which the ammonia synthesis activity is high, is in the range of 0.5 to 3 mol %.

3. Study on Reduction Temperature (Examples 7 to 11)

While the amount of Co supported was set to 20 wt % in Example 1, each metal-carrier material was produced by variously changing the reduction temperature (500° C. (Example 7), 650° C. (Example 8), 700° C. (Example 9), 800° C. (Example 10), 900° C. (Example 11)).

By using the metal-carrier material of each of Examples 7 to 11, ammonia was synthesized at various temperatures (300° C., 350° C., 400° C., or 450° C.) and at a reaction pressure of 1 MPa, and the ammonia synthesis activity was measured by the procedure described above. The table below shows the results.

TABLE 5

| | Metal-carrier material | Reduction temperature (° C.) | Reaction temperature (° C.) | Ammonia yield (%) | Ammonia production rate (mmol g$^{-1}$h$^{-1}$) |
|---|---|---|---|---|---|
| Example 7 | 20 wt % Co/Ba$_{0.01}$Mg$_{0.99}$O$_x$ | 500 | 300 | 0.027 | 0.436 |
| | | | 350 | 0.142 | 2.274 |
| | | | 400 | 0.45 | 7.235 |
| | | | 450 | 1.119 | 17.983 |

TABLE 5-continued

| Metal-carrier material | | Reduction temperature (° C.) | Reaction temperature (° C.) | Ammonia yield (%) | Ammonia production rate (mmol g⁻¹h⁻¹) |
|---|---|---|---|---|---|
| Example 8 | 20 wt % Co/Ba$_{0.01}$Mg$_{0.99}$O$_x$ | 650 | 300 | 0.502 | 8.061 |
| | | | 350 | 1.325 | 21.29 |
| | | | 400 | 2.467 | 39.64 |
| | | | 450 | 3.38 | 54.302 |
| Example 9 | 20 wt % Co/Ba$_{0.01}$Mg$_{0.99}$O$_x$ | 700 | 300 | 0.656 | 10.542 |
| | | | 350 | 1.531 | 24.597 |
| | | | 400 | 2.731 | 43.88 |
| | | | 450 | 3.505 | 56.314 |
| Example 10 | 20 wt % Co/Ba$_{0.01}$Mg$_{0.99}$O$_x$ | 800 | 300 | 0.746 | 11.989 |
| | | | 350 | 1.662 | 26.709 |
| | | | 400 | 2.879 | 46.258 |
| | | | 450 | 3.38 | 54.302 |
| Example 11 | 20 wt % Co/Ba$_{0.01}$Mg$_{0.99}$O$_x$ | 900 | 300 | 0.695 | 11.162 |
| | | | 350 | 1.557 | 25.014 |
| | | | 400 | 2.503 | 40.224 |
| | | | 450 | 3.129 | 50.28 |

In addition, FIGS. 4 and 5 also show the results. These graphs have indicated that when the reduction temperature was 500° C., the ammonia synthesis activity was relatively low, but when the reduction temperature was 650° C. or higher, the ammonia synthesis activity was high.

FIG. 6 shows the XRD pattern of each metal-carrier material in Example 7 (reduction temperature 500° C.), Example 9 (reduction temperature 700° C.), or Example 10 (reduction temperature 800° C.). In the chart, the "fresh" denotes a sample before reduction treatment. This chart has indicated that BaCO$_3$ was decomposed by the reduction treatment, and when the reduction temperature was increased to about 700° C., no peak of BaCO$_3$ was observed, so that BaCO$_3$ was found to be decomposed. It is also found that when the reduction temperature was increased to 800° C., a peak of metal Co, which peak had not been observed until then, was detected. This seems to be because the peak of metal Co that was not observed due to highly dispersed Co particles was aggregated with the Co particles somewhat dispersed by the high-temperature reduction treatment.

The following table shows various parameters of each metal-carrier material in Example 7 (reduction temperature 500° C.), Example 9 (reduction temperature 700° C.), Example 10 (reduction temperature 800° C.), or Comparative Example 2 (no Ba, reduction temperature 700° C.) at a reaction temperature of 350° C. From this table, it is found that the specific surface area (SSA) decreases as the reduction temperature increases, but the ammonia synthesis activity is improved.

TABLE 6

Study on Co/BaMgOx catalyst reduction temperature
Parameters at each reduction temperature (350° C.)

| Catalyst | NH$_3$/mmol g⁻¹h⁻¹ | SSA/m²g⁻¹ | Disp$_{H/Co}$ | TOF (s⁻¹) |
|---|---|---|---|---|
| 500° C. red. | 2.3 | 61.9 | — | — |
| 700° C. red. | 24.6 | 42.0 | — | — |
| 800° C. red. | 26.7 | 33.9 | — | — |
| In absence of Ba 700° C. red. | 1.1 | 47.6 | — | — |

4. Study on Amount of Co Supported (Example 12, Example 1, Example 15)

Each metal-carrier material was produced by variously changing the amount of Co supported (5 wt % (Example 12), 10 wt % (Example 13), 20 wt % (Example 1), or 30 wt % (Example 15)) in Example 1

By using the metal-carrier material of Example 12, 1, or 15, ammonia was synthesized at various temperatures (300° C., 350° C., 400° C., or 450° C.) and at a reaction pressure of 1 MPa, and the ammonia synthesis activity was measured by the procedure described above. The table below shows the results.

TABLE 7

| Metal-carrier material | | Reduction temperature (° C.) | Reaction temperature (° C.) | Ammonia yield (%) | Ammonia production rate (mmol g⁻¹h⁻¹) |
|---|---|---|---|---|---|
| Example 12 | 5 wt % Co/Ba$_{0.01}$Mg$_{0.99}$O$_x$ | 700 | 300 | 0.296 | 4.754 |
| | | | 350 | 0.785 | 12.609 |
| | | | 400 | 1.504 | 24.166 |
| | | | 450 | 2.153 | 34.593 |
| Example 13 | 10 wt % Co/Ba$_{0.01}$Mg$_{0.99}$O$_x$ | 700 | 300 | 0.373 | 5.994 |
| | | | 350 | 0.991 | 15.916 |
| | | | 400 | 1.887 | 30.313 |
| | | | 450 | 2.754 | 44.246 |

TABLE 7-continued

| | Metal-carrier material | Reduction temperature ($^\circ$ C.) | Reaction temperature ($^\circ$ C.) | Ammonia yield (%) | Ammonia production rate (mmol g$^{-1}$h$^{-1}$) |
|---|---|---|---|---|---|
| Example 1 | 20 wt % Co/Ba$_{0.01}$Mg$_{0.99}$O$_x$ | 700 | 300 | 0.656 | 10.542 |
| | | | 350 | 1.531 | 24.597 |
| | | | 400 | 2.731 | 43.88 |
| | | | 450 | 3.505 | 56.314 |
| Example 15 | 30 wt % Co/Ba$_{0.01}$Mg$_{0.99}$O$_x$ | 700 | 300 | 0.605 | 9.715 |
| | | | 350 | 1.467 | 23.564 |
| | | | 400 | 2.731 | 43.88 |
| | | | 450 | 3.38 | 54.302 |

Figure 7:
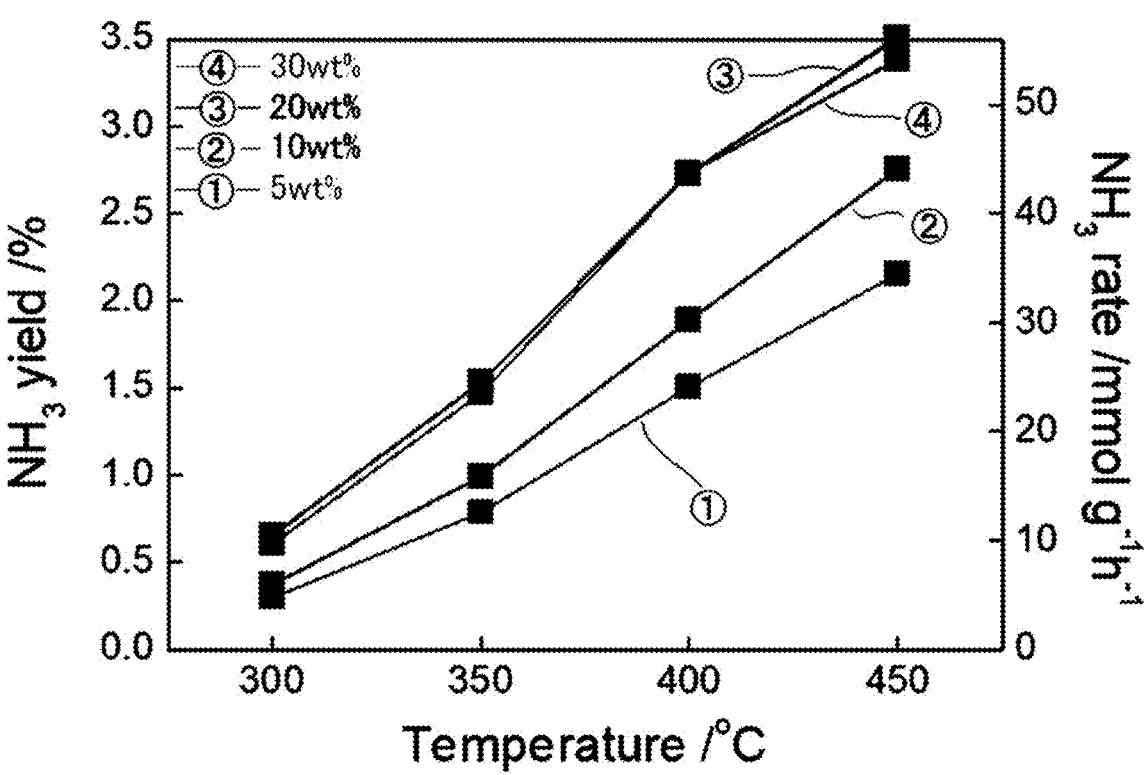
FIG. 7 is a graph showing ammonia synthesis activity measured using each $Co/BaMgO_x$ catalyst prepared by changing the amount of Co supported on the $Co/BaMgO_x$ catalyst in Examples.
Figure 8:
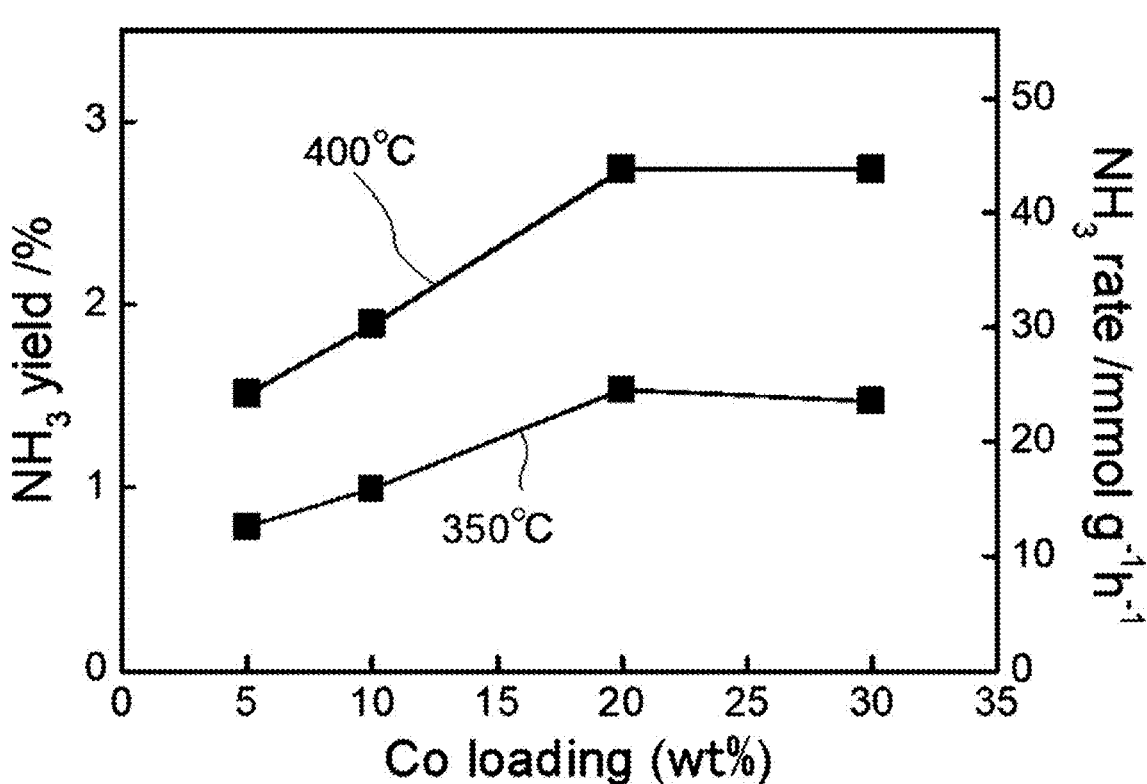
FIG. 8 is a graph showing ammonia synthesis activity measured using each $Co/BaMgO_x$ catalyst prepared by changing the amount of Co supported on the $Co/BaMgO_x$ catalyst in Examples.
Figure 9:
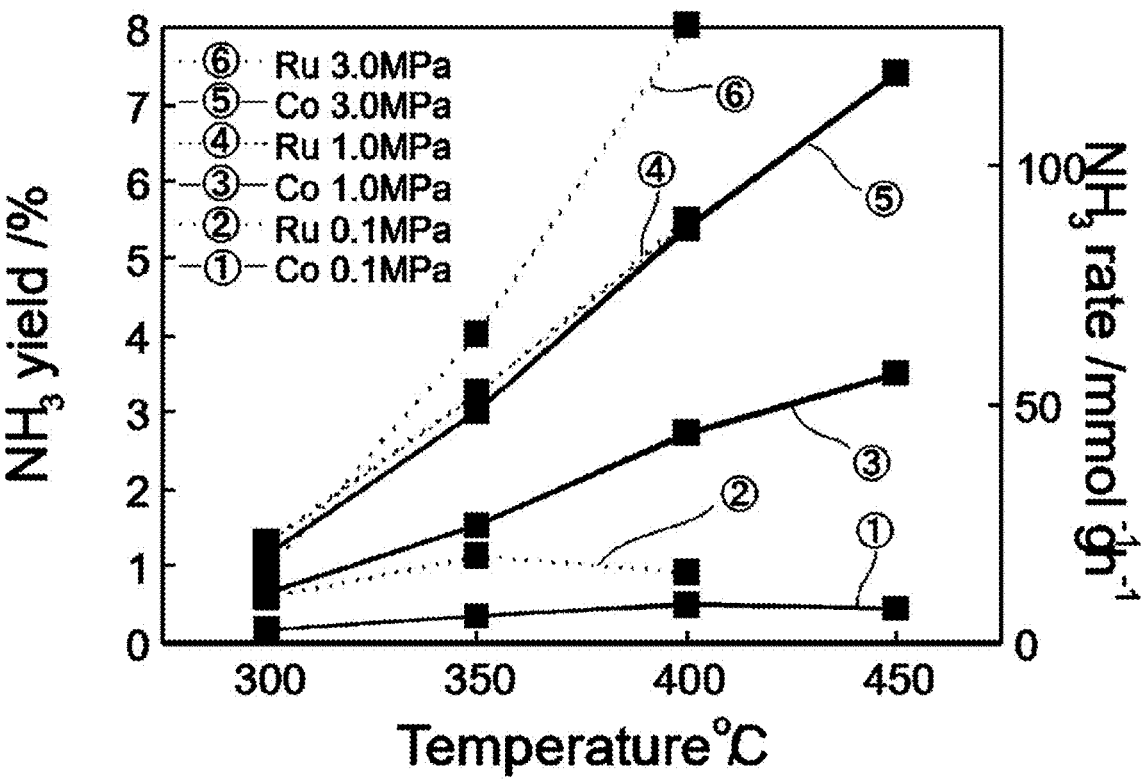
FIG. 9 is a graph showing ammonia synthesis activity measured by changing a reaction pressure for the $Co/BaMgO_x$ catalyst in Examples.

In addition, FIGS. 7 and 8 also show the results. These graphs have demonstrated that the ammonia synthesis activity increases as the amount of Co supported increases, and the ammonia synthesis activity is almost maximized at 20 wt %.

Comparative Example 1, 4, or 5

As comparative examples, Co/Ba$_{0.05}$La$_{0.95}$O$_x$ (Comparative Example 1), Ru/CeO$_x$ (Comparative Example 4), and Cs$^+$/Ru/MgO$_x$ (Comparative Example 5) were prepared.

Ru/CeO$_x$ (Comparative Example 4) was prepared by the following procedure. Ru was supported on CeO$_2$ by an impregnation method. A tetrahydrofuran (THF) (Wako Pure Chemical Industries, Ltd.) solution in which Ru$_3$(CO)$_{12}$ (FURUYA METAL Co., Ltd.) as a Ru precursor had been dissolved was prepared in a 200-mL recovery flask. Next, 5 g of CeO$_2$ (DAIICHI KIGENSO KAGAKU KOGYO CO., LTD.) was added thereto, and the mixture was stirred at room temperature for 18 h or longer. Note that the amounts pressure at 35$^\circ$ C. and 0.3 atm by using a rotary evaporator, and then dried at 80$^\circ$ C. for 18 h in an oven. The resulting powder was heated at 500$^\circ$ C. for 5 h in a flow of argon at 80 mL min$^{-1}$ by using a tubular electric furnace to remove a carbonyl ligand in the precursor. The above operation was conducted to give Ru/CeO$_2$. The reduction treatment was performed at 400$^\circ$ C.

Cs$^+$/Ru/MgO$_x$ (Comparative Example 5) was prepared by the procedure described in a Non Patent Literature (F. Rosowski, A. Hornung, O. Hinrichsen, D. Herein, M. Muhler and G. Ertl, Appl. Catal., A, 1997, 151, 443-460.). Note that the amount of Ru supported was 5 wt %, and Cs/Ru was 1/1 (mol/mol). The reduction treatment was performed at 500$^\circ$ C.

By using the metal-carrier material of each of Comparative Examples 3 to 5, ammonia was synthesized at various temperatures (300$^\circ$ C., 350$^\circ$ C., 400$^\circ$ C., or 450$^\circ$ C.) and at a reaction pressure (0.1 MPa, 1.0 MPa, or 3.0 MPa), and the ammonia synthesis activity was measured by the procedure described above. The table below shows the results.

TABLE 8

| | Metal-carrier material | Reduction temperature ($^\circ$ C.) | Reaction temperature ($^\circ$ C.) | Reaction pressure (MPa) | Ammonia yield (%) | Ammonia production rate (mmol g$^{-1}$h$^{-1}$) |
|---|---|---|---|---|---|---|
| Example 1 | Co/Ba$_{0.01}$Mg$_{0.99}$O$_x$ | 700 | 350 | 0.1 | 0.347 | 5.581 |
| | | | | 1.0 | 1.531 | 24.597 |
| | | | | 3.0 | 3.014 | 48.422 |
| Comparative Example 1 | Co/Ba$_{0.05}$La$_{0.95}$O$_x$ | 700 | 350 | 0.1 | 0.296 | 4.754 |
| | | | | 1.0 | 1.201 | 19.29 |
| | | | | 3.0 | 2.223 | 35.718 |
| Comparative Example 4 | Ru/CeO$_x$ | 400 | 350 | 0.1 | 0.343 | 5.516 |
| | | | | 1.0 | 0.669 | 10.748 |
| | | | | 3.0 | 0.853 | 13.703 |
| Comparative Example 5 | Cs$^+$/Ru/MgO$_x$ | 500 | 350 | 0.1 | 0.41 | 6.595 |
| | | | | 1.0 | 0.678 | 10.814 |
| | | | | 3.0 | 0.708 | 11.37 |
| Example 1 | Co/Ba$_{0.01}$Mg$_{0.99}$O$_x$ | 700 | 400 | 0.1 | 0.502 | 8.061 |
| | | | | 1.0 | 2.731 | 43.88 |
| | | | | 3.0 | 5.4 | 86.757 |
| Comparative Example 1 | Co/Ba$_{0.05}$La$_{0.95}$O$_x$ | 700 | 400 | 0.1 | 0.463 | 7.441 |
| | | | | 1.0 | 2.203 | 35.401 |
| | | | | 3.0 | 4.521 | 72.634 |
| Comparative Example 4 | Ru/CeO$_x$ | 400 | 400 | 0.1 | 0.634 | 10.183 |
| | | | | 1.0 | 1.728 | 27.769 |
| | | | | 3.0 | 2.559 | 41.109 |
| Comparative Example 5 | Cs$^+$/Ru/MgO$_x$ | 500 | 400 | 0.1 | 0.834 | 13.401 |
| | | | | 1.0 | 3.012 | 48.052 |
| | | | | 3.0 | 3.565 | 57.283 | of the Ru$_3$(CO)$_{12}$ and the carrier to be used were suitably adjusted so that the amount of Ru contained in the catalyst after heating under an argon atmosphere was 5 wt %. The stirred suspension was evaporated to dryness under reduced In addition, the results are shown in FIG. 10 (reaction temperature 350$^\circ$ C.) and FIG. 11 (reaction temperature 400$^\circ$ C.). The results of Example 3 (Co/Ba$_{0.01}$Mg$_{0.99}$O$_x$) are also shown in the figures. The graphs indicate that the metal-carrier material of the Example has higher ammonia synthesis activity than each metal-carrier material of Comparative Example 1, 4, or 5.

6. Effect of Pretreatment Conditions (Reduction Conditions) (Example 1, Example 17, or Comparative Example 6)

A metal-carrier material was prepared by changing the temperature and time of the hydrogen reduction pretreatment to 500° C. and 72 h in Example 1 (Example 17). As a Comparative Example, 5 wt % Ru/MgO (Comparative Example 6) was prepared by the same procedure as in Comparative Example 4 except that MgO (Ube Material Industries, Ltd.) was used as the carrier.

By using the metal-carrier material of each of Example 1 or 17 or Comparative Example 6, ammonia was synthesized at various temperatures (300° C., 350° C., 400° C., or 450° C.) and at a reaction pressure of 1 MPa, and the ammonia synthesis activity was measured by the procedure described above. The table below shows the results.

TABLE 9

| | Metal-carrier material | Reduction temperature (° C.) | Reduction time (h) | Reaction temperature (° C.) | Ammonia yield (%) | Ammonia production rate (mmol g$^{-1}$h$^{-1}$) |
|---|---|---|---|---|---|---|
| Example 1 | Co/Ba$_{0.01}$Mg$_{0.99}$O$_x$ | 700 | 1 | 300 | 0.656 | 10.542 |
| | | | | 350 | 1.531 | 24.597 |
| | | | | 400 | 2.731 | 43.88 |
| | | | | 450 | 3.505 | 56.314 |
| Example 17 | Co/Ba$_{0.01}$Mg$_{0.99}$O$_x$ | 500 | 72 | 300 | 0.581 | 9.34 |
| | | | | 350 | 1.678 | 26.957 |
| | | | | 400 | 3.014 | 48.422 |
| | | | | 450 | 3.642 | 58.51 |
| Comparative Example 6 | 5 wt % Ru/MgO | 500– | 1 | 300 | 0.01 | 0.154 |
| | | | | 350 | 0.049 | 0.788 |
| | | | | 400 | 0.239 | 3.829 |
| | | | | 450 | 0.908 | 14.551 |

In addition, FIG. 12 also shows the results. This graph has demonstrated that the ammonia synthesis activity can be improved by long-time reduction even when the reduction conditions are at a low pressure.

7. Effect of Co Precursor (Example 1, Example 18)

A metal-carrier material (Example 18) was prepared in the same manner as in Example 1, except that Co(NO$_3$)$_2$·6H$_2$O (Wako Pure Chemical Industries, Ltd.) was used in place of Co (II) acetylacetonato (Co(acac)) as a Co precursor, purified water was used in place of THF, and the atmosphere during calcination was the air in Example 1.

By using the metal-carrier material of Example 1 or 18, ammonia was synthesized at various temperatures (300° C., 350° C., 400° C., or 450° C.) and at a reaction pressure of 1 MPa, and the ammonia synthesis activity was measured by the procedure described above. The table below shows the results.

TABLE 10

| | Metal-carrier material | Co precursor | Reduction temperature (° C.) | Reaction temperature (° C.) | Ammonia yield (%) | Ammonia production rate (mmol g$^{-1}$h$^{-1}$) |
|---|---|---|---|---|---|---|
| Example 1 | Co/Ba$_{0.01}$Mg$_{0.99}$O$_x$ | Co (acac) | 700 | 300 | 0.656 | 10.542 |
| | | | | 350 | 1.531 | 24.597 |
| | | | | 400 | 2.731 | 43.88 |
| | | | | 450 | 3.505 | 56.314 |
| Example 18 | Co/Ba$_{0.01}$Mg$_{0.99}$O$_x$ | Co nitrate | 700 | 300 | 0.334 | 5.374 |
| | | | | 350 | 0.849 | 13.642 |
| | | | | 400 | 1.834 | 29.465 |
| | | | | 450 | 2.665 | 42.82 |

Figure 13:
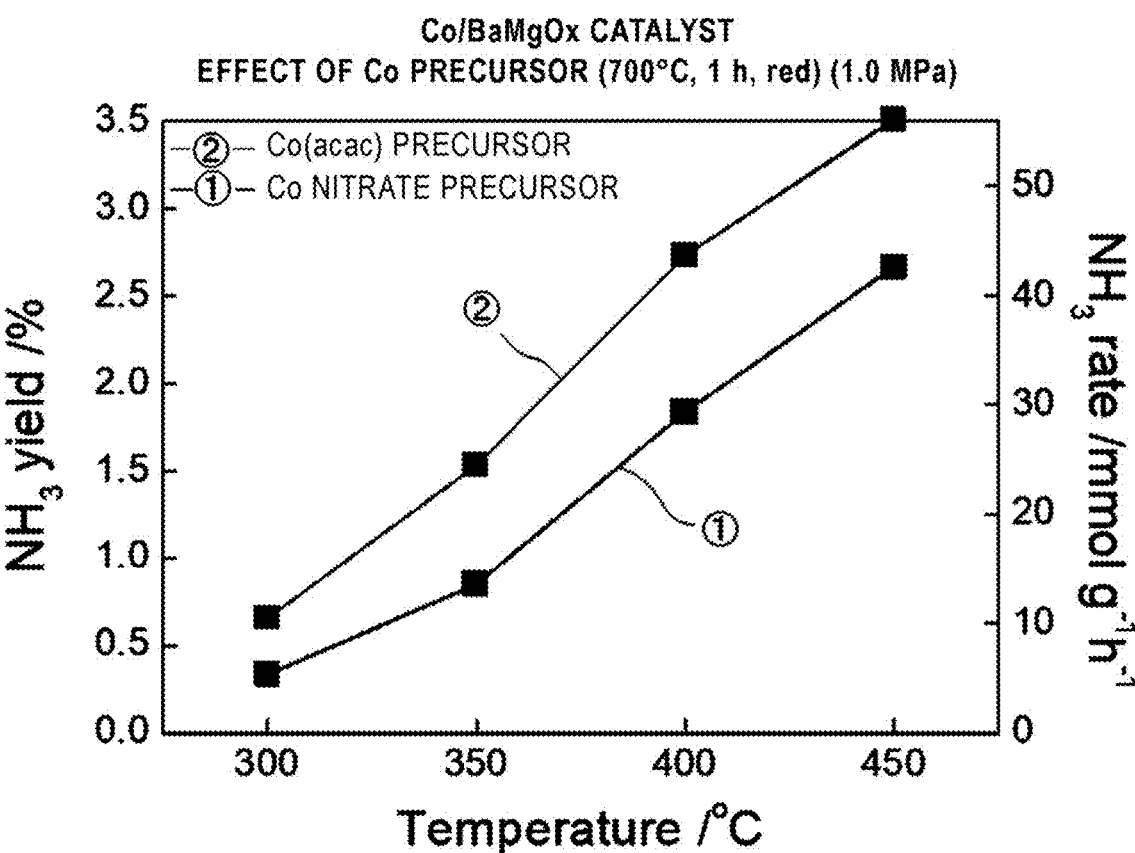
FIG. 13 is a graph showing ammonia synthesis activity measured using each $Co/BaMgO_x$ catalyst prepared by changing a Co precursor for the $Co/BaMgO_x$ catalyst in Examples.

In addition, FIG. 13 also shows the results. This graph has demonstrated that the ammonia synthesis activity in the case of the Co precursor is improved more in the case of Co(acac) than in the case of Co nitrate.

Figure 14:
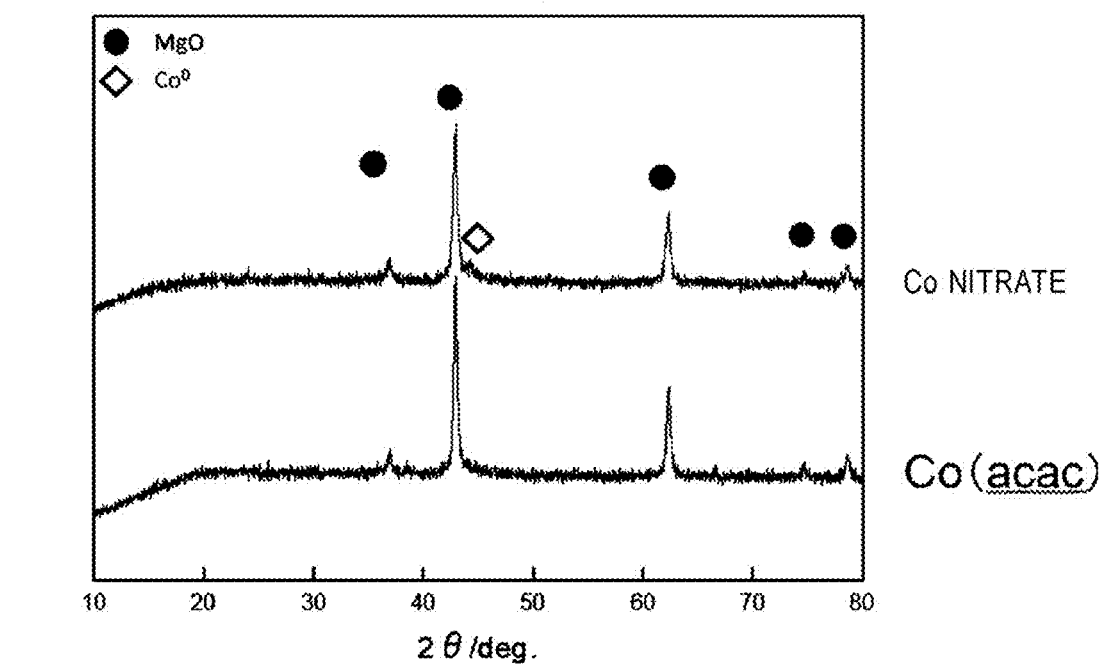
FIG. 14 is an XRD pattern measured using each $Co/BaMgO_x$ catalyst prepared by changing a Co precursor for the $Co/BaMgO_x$ catalyst in Examples.

FIG. 14 shows the XRD of each metal-carrier material in Example 1 (Co(acac)) or Example 17 (Co nitrate). As can be seen from this chart, any peak derived from metal Co was not observed in the metal-carrier material using Co(acac) as a precursor, but a peak derived from metal Co was observed in the metal-carrier material using nitrate as a precursor. From this, it is presumed that Co is more highly dispersed in the metal-carrier material using Co(acac) as a precursor than in the metal-carrier material using Co nitrate as a precursor, and as a result, the ammonia synthesis activity is improved.

8. Study on SV (Example 1)

A metal-carrier material (Example 18) was prepare while $Co(NO_3)_2 \cdot 6H_2O$ (Wako Pure Chemical Industries, Ltd.) was used in place of Co (II) acetylacetonato (Co(acac)) as a Co precursor in Example 1.

By using the metal-carrier material of Example 1, ammonia was synthesized at a reaction pressure of 1 MPa and at various temperatures (300° C., 350° C., 400° C., or 450° C.) and various SV (18 $L/h^{-1}g^{-1}$, 36 $L/h^{-1}g^{-1}$, or 72 $L/h^{-1}g^{-1}$), and the ammonia synthesis activity was measured by the procedure described above. The table below shows the results.

(KANTO KAGAKU) was dissolved in purified water to prepare an aqueous $Ce(NO_3)_3$ solution. $Ba(NO_3)_2 \cdot 6H_2O$ (Wako Pure Chemical Industries, Ltd.) was dissolved in purified water to prepare an aqueous $Ba(NO_3)_2$ solution. The aqueous $La(NO_3)_3$ solution, the aqueous $Ce(NO_3)_3$ solution, and the aqueous $Ba(NO_3)_2$ solution were mixed to prepare 250 mL of carrier precursor solution containing La, Ce, and Ba in the total of 0.0625 mol. Next, 250 mL of 28% aqueous $NH_3$ solution (Wako Pure Chemical Industries, Ltd.) was added to a 1000-mL beaker, and the carrier precursor solution was added at once while stirring with a magnetic stirrer at 320 rpm. The mixture was then stirred for 1 h. Thereafter, the mixture was allowed to stand for 12 h, and a precipitate (1) was separated by suction filtration. The separated filtrate was collected in a 2-L beaker. Then, 350 mL of ion-exchanged water was added to the separated precipitate (1), the mixture was stirred for 30 min to wash the precipitate, and the precipitate (1) was separated by suction filtration. This washing operation was performed three times. All the ion-exchanged water used for washing was recovered, and the filtrate and the washing liquid were added to the 2-L beaker and mixed. The mixed solution was left for 12 h to generate a white precipitate (2), and the generated precipitate (2) was collected by suction filtration. The precipitate (1) and the precipitate (2) were mixed and dried at 80° C. for 15 h in an oven. The dried precipitates were pulverized in a mortar, and the obtained powder was heated at 700° C. for 5 h in an air atmosphere by using an electric furnace to give $Ba_{0.1}La_{0.45}Ce_{0.45}O_x$.

TABLE 11

| Metal-carrier material | | Reduction temperature (° C.) | Reaction temperature (° C.) | SV ($L/h^{-1}g^{-1}$) | Ammonia yield (%) | Ammonia production rate (mmol $g^{-1}h^{-1}$) |
|---|---|---|---|---|---|---|
| Example 1 | $Co/Ba_{0.01}Mg_{0.99}O_x$ | 700 | 300 | 18 | 1.544 | 6.201 |
| | | | 350 | | 3.114 | 12.507 |
| | | | 400 | | 4.539 | 18.23 |
| | | | 450 | | 4.116 | 16.534 |
| | | | 300 | 36 | 1.055 | 8.475 |
| | | | 350 | | 2.136 | 17.156 |
| | | | 400 | | 3.509 | 28.193 |
| | | | 450 | | 3.505 | 28.157 |
| | | | 300 | 72 | 0.656 | 10.542 |
| | | | 350 | | 1.531 | 24.597 |
| | | | 400 | | 2.731 | 43.88 |
| | | | 450 | | 3.505 | 56.314 |

Figure 15:
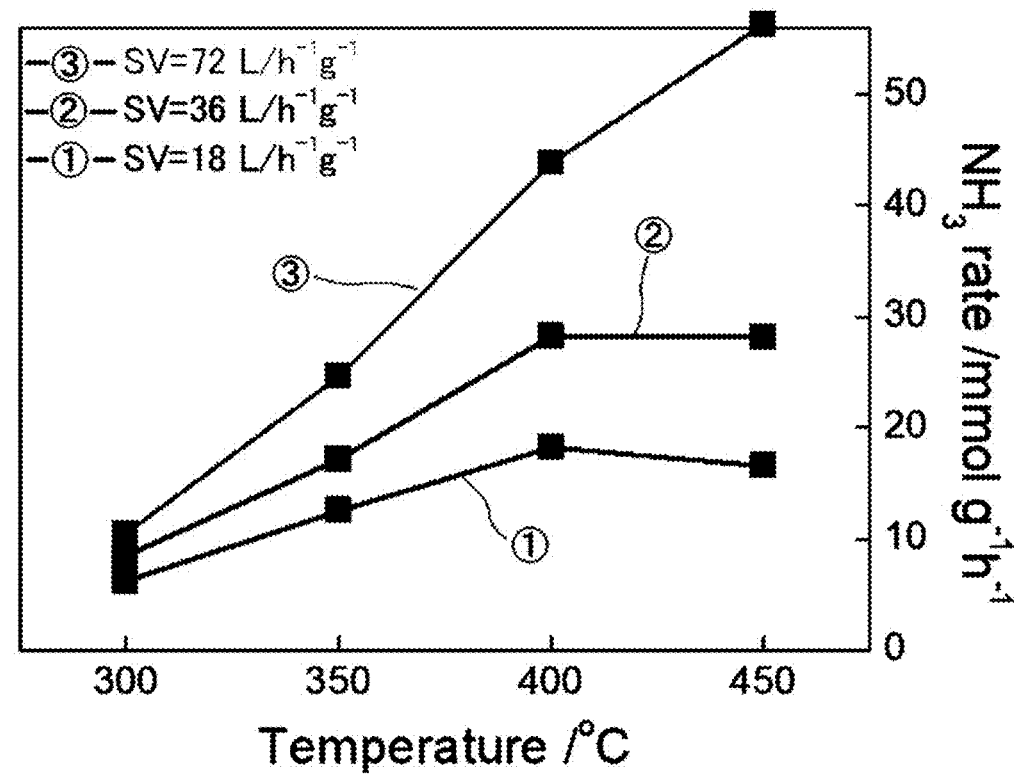
FIG. 15 is a graph showing ammonia synthesis activity measured by changing SV for the $Co/BaMgO_x$ catalyst in Examples.
Figure 16:
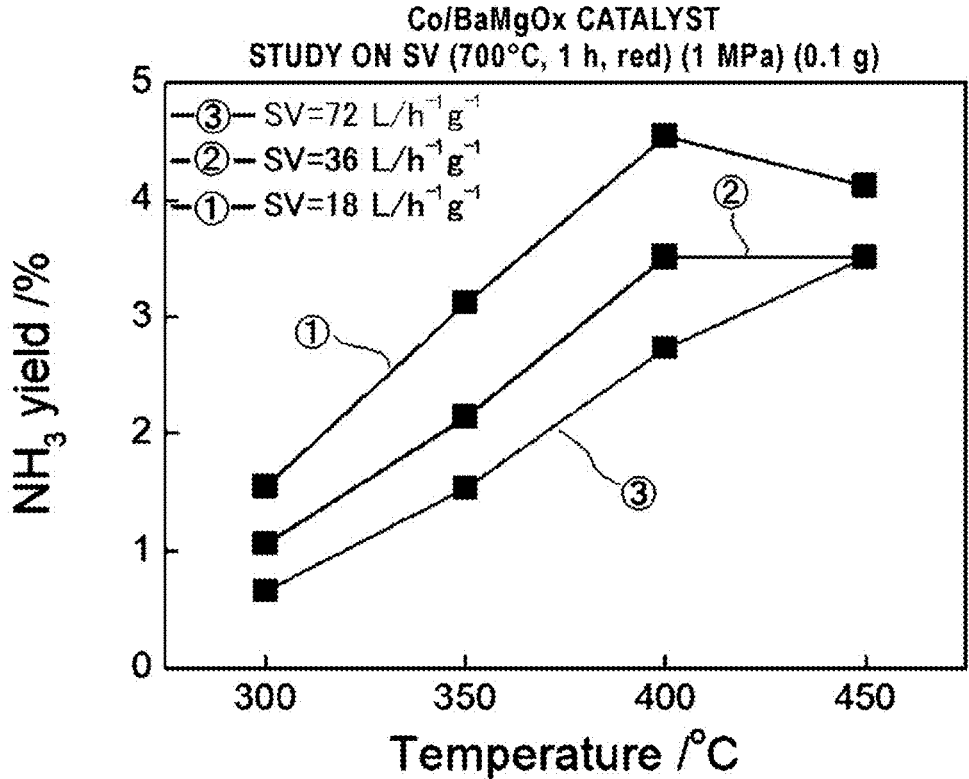
FIG. 16 is a graph showing ammonia synthesis activity measured by changing SV for the $Co/BaMgO_x$ catalyst in Examples.

In addition, FIGS. 15 and 16 also show the results. These graphs have demonstrated that as the value of SV becomes larger, the ammonia synthesis rate increases (FIG. 15), but the ammonia yield decreases (FIG. 16).

9. Study on Carrier Characteristics (Example 1, Comparative Example 7, Comparative Example 1)

5 wt % $Ru/Ba_{0.1}La_{0.45}Ce_{0.45}O_x$: Comparative Example 7

Here, 5 wt % $Ru/Ba_{0.1}La_{0.45}Ce_{0.45}O_x$ (Comparative Example 7) was produced while $Ba_{0.1}La_{0.45}Ce_{0.45}$ was used in place of $CeO_2$ and the Ru content was suitably adjusted in Comparative Example 1. Note that the carrier was synthesized by the procedure described in Example 6 of WO 2019/216304 while using a reverse homogeneous precipitation method as follows. $La(NO_3)_{3-6}H_2O$ (Wako Pure Chemical Industries, Ltd.) was dissolved in purified water to prepare an aqueous $La(NO_3)_3$ solution. $Ce(NO_3)_3 \cdot 6H_2O$ By using the metal-carrier material of Example 1, Comparative Example 1, or Comparative Example 7, ammonia was synthesized at a reaction pressure of 1 MPa and a reaction temperature of 350° C., and the ammonia synthesis activity was measured by the procedure described above. The table below shows the results.

TABLE 12

| Study on Co/BaMgOx catalyst reduction temperature (700° C., 1 h, red.) (1.0 MPa) | | | | |
|---|---|---|---|---|
| | $NH_3$/mmol | | | TOF |
| Catalyst | $g^{-1}h^{-1}$ | SSA/$m^2g^{-1}$ | $Disp_{H/Co}$ | ($s^{-1}$) |
| 5 wt %/Ru/BaLaCeOx | 52.3 | 21 | 0.118 | 0.248 |
| 20 wt % Co/BaLaOx | 19.3 | 25 | 0.0124 | 0.0127 |
| 20 wt % Co/BaMgOx | 24.6 | 42 | — | — |

From this table, it is presumed that 20 wt % $Co/Ba_{0.01}Mg_{0.99}O_x$ of Example 1 has a large specific surface area (SSA), which contributes to improvement in the ammonia synthesis activity.

10. Activity at Low Temperatures (Example 1, Comparative Example 9, Comparative Example 10)

As a Comparative Example, $Ru/Ba_{0.1}La_{0.45}Ce_{0.45}O_x$ (700° C., 1 h, red) (Comparative Example 9) was produced by the procedure described in Example 6 of WO 2019/216304. In addition, $Ru/La_{0.5}Ce_{0.5}O_x$ (650° C., 1 h, red) (Comparative Example 10) was produced by the procedure described in Example 1 of Patent Literature 6 (WO 2019/216304 A).

By using the metal-carrier material of Example 1, ammonia was synthesized at various temperatures (150° C., 200° C., or 250° C.) and at various pressures (0.1 MPa, 1.0 MPa, or 3.0 MPa), and the ammonia synthesis activity was measured by the procedure described above. In addition, by using the metal-carrier material of Comparative Example 9 or 10, ammonia was synthesized at various temperatures (150° C., 200° C., or 250° C.) (and at a pressure of 1.0 MPa), and the ammonia synthesis activity was measured by the procedure described above. The table below shows the results.

11. Study on Ru-Supported Catalyst (Example 21, Comparative Examples 11 to 14)

Example 21

<$Ru/Ba_{0.01}Mg_{0.99}O_x$_Reduced at 700° C.>
The same operation as in Example 1 was repeated except that Co (II) acetylacetonato was changed to $Ru_3(CO)_{12}$ (FURUYA METAL Co., Ltd.) as a Ru precursor in Example 1 to give $Ru/Ba_{0.05}Mg_{0.95}O_x$_reduced at 700° C.

11. Study on Fe-Supported Catalyst (Example 22, Comparative Example 15, Comparative Example 16)

Example 22

<$Fe/Ba_{0.01}Mg_{0.99}O_x$_Reduced at 700° C.>
The same operation as in Example 1 was repeated except that Co (II) acetylacetonato was changed to iron (III) acetylacetonato (DOJINDO LABORATORIES) as a Fe precursor in Example 1 to give $Fe/Ba_{0.01}Mg_{0.99}O_x$_reduced at 700° C.

Comparative Example 15, Comparative Example 16

As a Comparative Example, 20 wt % $Fe/Ba_{0.1}La_{0.45}CeO_x$ (reduced at 700° C. for 1 h) (Comparative Example 15) was produced by the same procedure as in Comparative Example 9 except that Ru was replaced with Fe and the amount of Ba was changed. In addition, 5 wt % Ru/MgO (Comparative Example 16) was produced by the same procedure as in Comparative Example 6.

TABLE 13

| | Metal-carrier material | Reduction temperature (° C.) | Reaction temperature (° C.) | Reaction pressure (MPa) | Ammonia yield (%) | Ammonia production rate (mmol g$^{-1}$h$^{-1}$) |
|---|---|---|---|---|---|---|
| Example 1 | $Co/Ba_{0.01}Mg_{0.99}O_x$ | 700 | 150 | 0.1 | 0.003 | 0.05 |
| | | | 200 | | 0.004 | 0.067 |
| | | | 250 | | 0.057 | 0.922 |
| | | | 150 | 1.0 | 0.003 | 0.05 |
| | | | 200 | | 0.039 | 0.62 |
| | | | 250 | | 0.193 | 3.1 |
| | | | 150 | 3.0 | 0.003 | 0.05 |
| | | | 200 | | 0.06 | 0.972 |
| | | | 250 | | 0.332 | 5.329 |
| Comparative Example 9 | $Ru/Ba_{0.1}La_{0.45}Ce_{0.45}O_x$ | 700 | 150 | 1.0 | 0.003 | 0.05 |
| | | | 200 | | 0.013 | 0.201 |
| | | | 250 | | 0.15 | 2.413 |
| Comparative Example 10 | $Ru/La_{0.5}Ce_{0.5}O_x$ | 700 | 150 | 1.0 | 0.003 | 0.05 |
| | | | 200 | | 0.016 | 0.251 |
| | | | 250 | | 0.15 | 2.413 |

Figure 17:
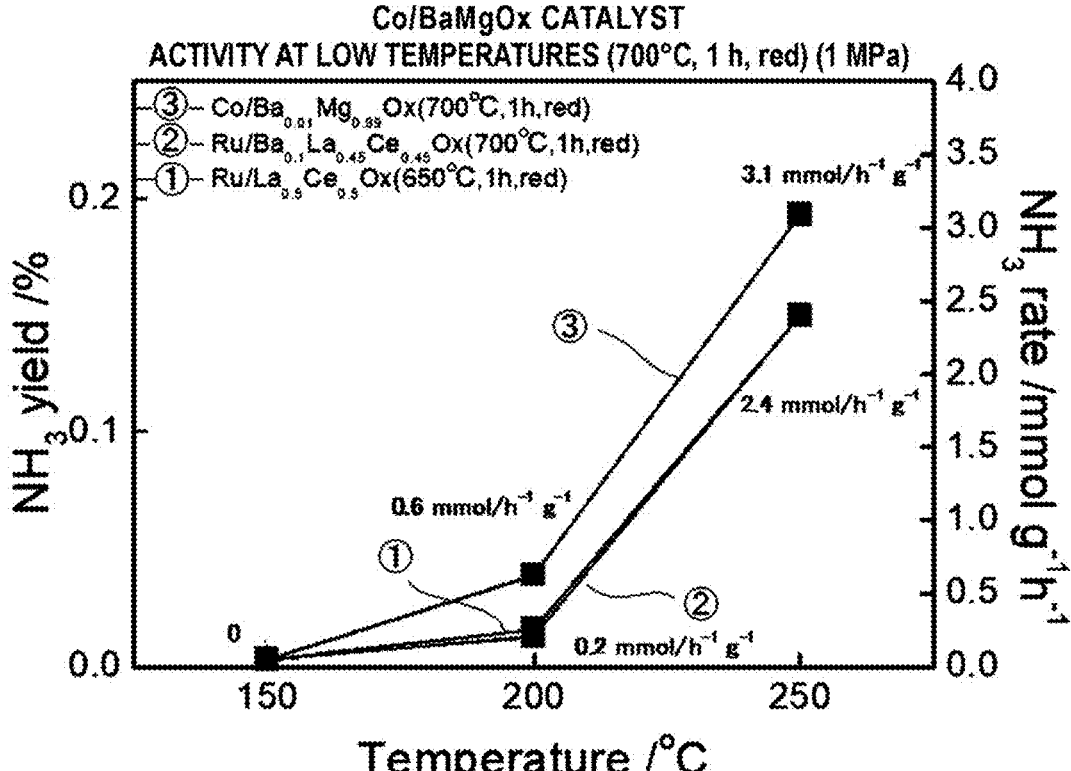
FIG. 17 is a graph showing ammonia synthesis activity measured by setting a reaction temperature to low temperatures for the $Co/BaMgO_x$ catalyst in Examples.
Figure 18:
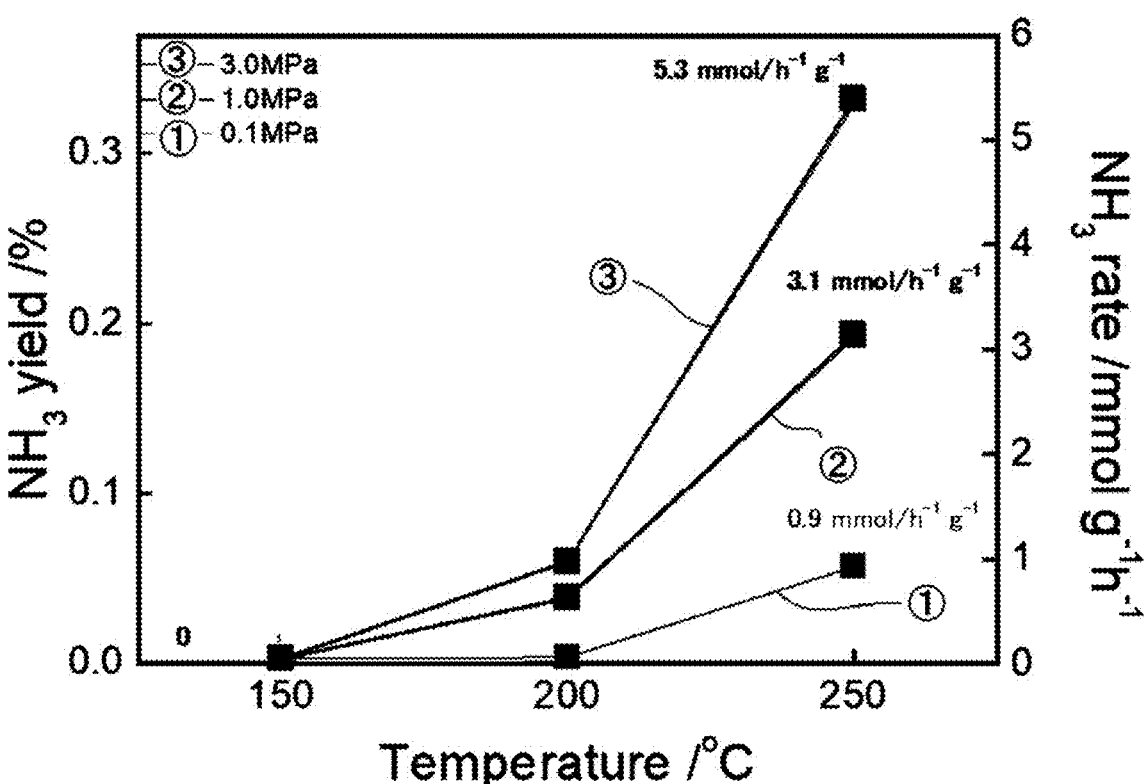
FIG. 18 is a graph showing ammonia synthesis activity measured by setting a reaction temperature to low temperatures for the $Co/BaMgO_x$ catalyst in Examples.
Figure 19:
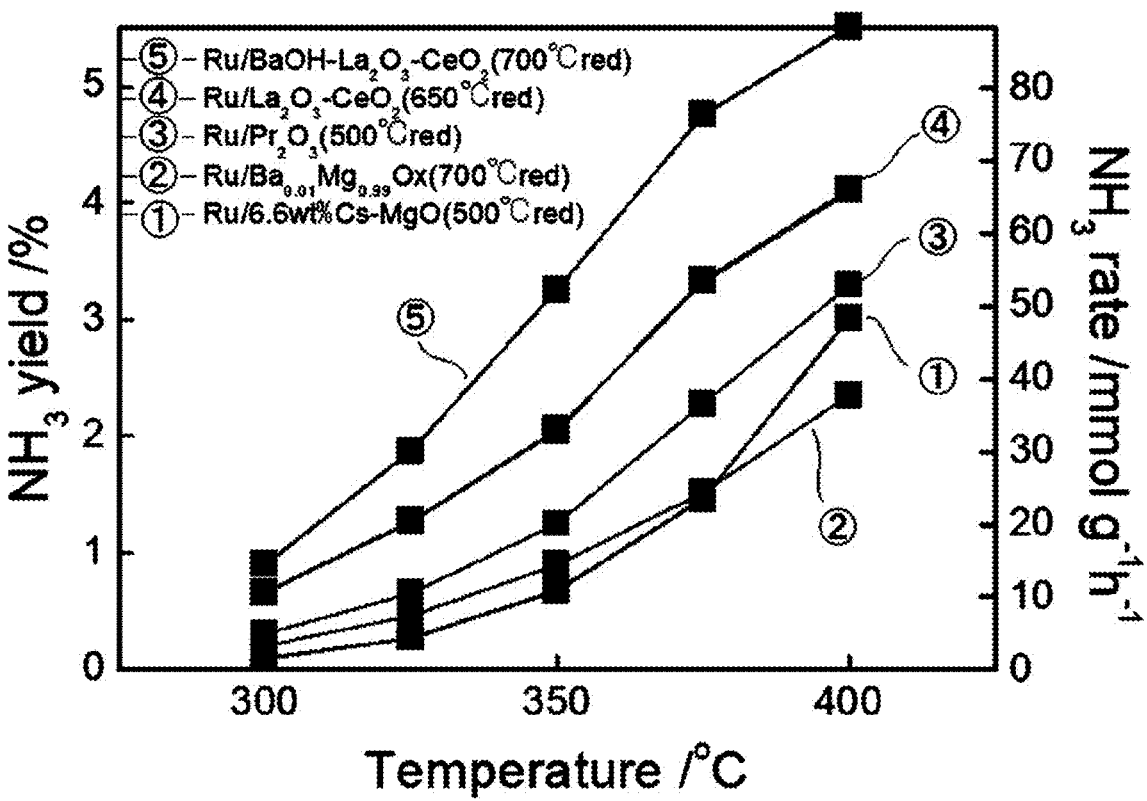
FIG. 19 is a graph showing ammonia synthesis activity of $Ru/BaMgO_x$ in Examples.

In addition, FIGS. 17 and 18 also show the results. FIG. 17 has demonstrated that the Co-supported catalyst exhibits higher activity than the Ru-supported catalyst under low temperature conditions. In addition, FIG. 18 has revealed that the ammonia synthesis activity can be improved with an increase in pressure even under low temperature conditions.

By using the metal-carrier material of each of Example 22 or Comparative Example 15 or 16, ammonia was synthesized at various temperatures (300° C., 350° C., 400° C., or 450° C.) and at a reaction pressure of 1 MPa, and the ammonia synthesis activity was measured by the procedure described above. The table below shows the results.

TABLE 14

|  | Metal-carrier material | Reduction temperature (° C.) | Reaction temperature (° C.) | Reaction pressure (MPa) | Ammonia yield (%) | Ammonia production rate (mmol $g^{-1}h^{-1}$) |
|---|---|---|---|---|---|---|
| Example 22 | 20 wt % $Fe/Ba_{0.01}Mg_{0.99}O_x$ | 700 | 300 | 1.0 | 0.34 | 5.463 |
|  |  |  | 350 |  | 0.673 | 10.811 |
|  |  |  | 400 |  | 1.095 | 17.594 |
|  |  |  | 450 |  | 1.662 | 26.709 |
| Comparative Example 15 | 20 wt % $Fe/Ba_{0.1}La_{0.45}Ce_{0.45}O_x$ | 700 | 300 | 1.0 | 0.17 | 2.732 |
|  |  |  | 350 |  | 0.369 | 5.924 |
|  |  |  | 400 |  | 0.605 | 9.715 |
|  |  |  | 450 |  | 0.876 | 14.078 |
| Comparative Example 16 | 5 wt % $Ru/MgO_x$ | 700 | 300 | 1.0 | 0.01 | 0.154 |
|  |  |  | 350 |  | 0.049 | 0.788 |
|  |  |  | 400 |  | 0.239 | 3.829 |
|  |  |  | 450 |  | 0.908 | 14.551 |

Figure 20:
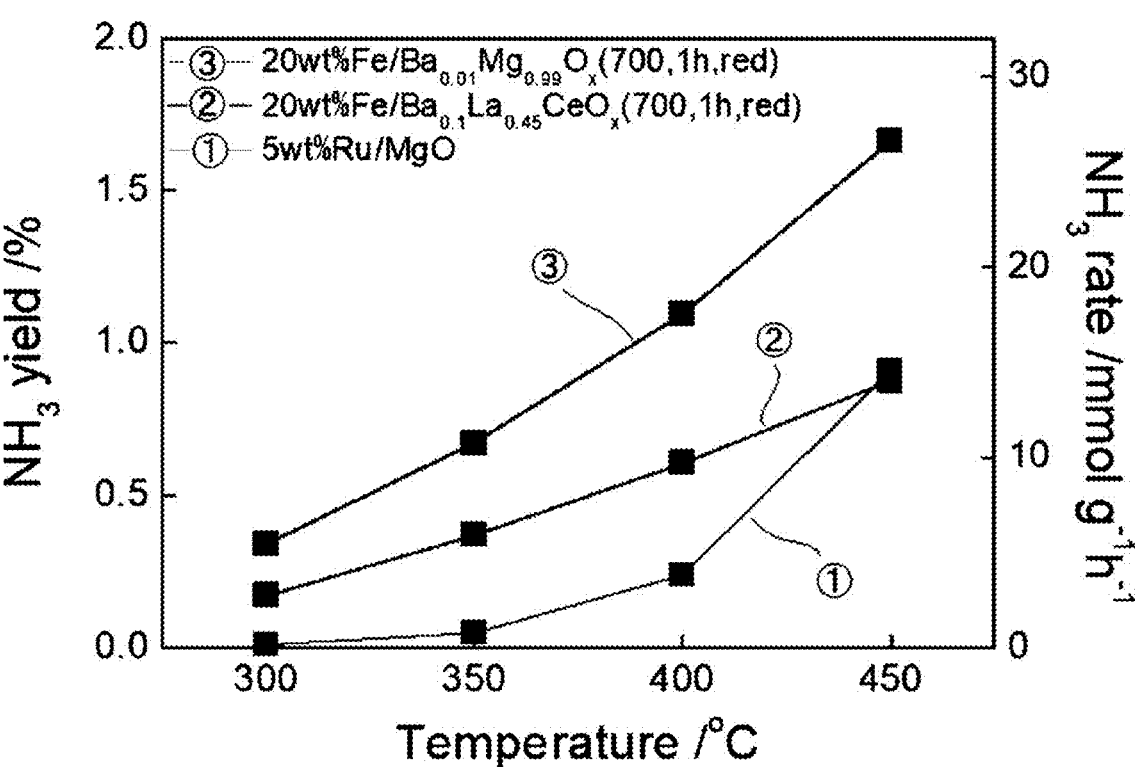
FIG. 20 is a graph showing ammonia synthesis activity of a catalyst $Fe/Ba_{0.01}Mg_{0.99}O_x$_reduced at 700° C. (catalyst prepared by performing reduction at 700° C. after Co is supported thereon) in Examples.

In addition, FIG. 20 also shows the results. This graph shows that the Fe-supported metal-carrier material has higher ammonia synthesis activity than 5 wt % Ru/MgO or 20 wt % $Fe/Ba_{0.1}La_{0.45}CeO_x$ (reduced at 700° C. for 1 h).

12. Study on Pretreatment Conditions: Fe-Supported Catalyst (Example 23, Example 24, Comparative Example 16)

Each metal-carrier material was produced by variously changing pretreatment conditions ($H_2+N_2$, reduced at 500° C. for 72 h (Example 23); $H_2$ only, reduced at 700° C. for 1 h (Example 24)) in Example 22.

By using the metal-carrier material of each of Example 23 or 24 or Comparative Example 16, ammonia was synthesized at various temperatures (300° C., 350° C., 400° C., or 450° C.) and at a reaction pressure of 1 MPa, and the ammonia synthesis activity was measured by the procedure described above. The table below shows the results.

TABLE 15

|  | Metal-carrier material | Reduction temperature (° C.) | Reduction time (h) | Reducing gas | Reaction temperature (° C.) | Ammonia yield (%) | Ammonia production rate (mmol $g^{-1}h^{-1}$) |
|---|---|---|---|---|---|---|---|
| Example 23 | $Fe/Ba_{0.01}Mg_{0.99}O_x$ | 500 | 72 | $H_2 + N_2$ | 300 | 0.347 | 5.581 |
|  |  |  |  |  | 350 | 0.733 | 11.782 |
|  |  |  |  |  | 400 | 1.293 | 20.774 |
|  |  |  |  |  | 450 | 2.003 | 32.179 |
| Example 24 | $Fe/Ba_{0.01}Mg_{0.99}O_x$ | 700 | 1 | $H_2$ | 300 | 0.34 | 5.463 |
|  |  |  |  |  | 350 | 0.673 | 10.811 |
|  |  |  |  |  | 400 | 1.095 | 17.594 |
|  |  |  |  |  | 450 | 1.662 | 26.709 |
| Comparative Example 16 | 5 wt % Ru/MgO | — | — | — | 300 | 0.01 | 5.463 |
|  |  |  |  |  | 350 | 0.049 | 10.811 |
|  |  |  |  |  | 400 | 0.239 | 17.594 |
|  |  |  |  |  | 450 | 0.908 | 26.709 |

Figure 21:
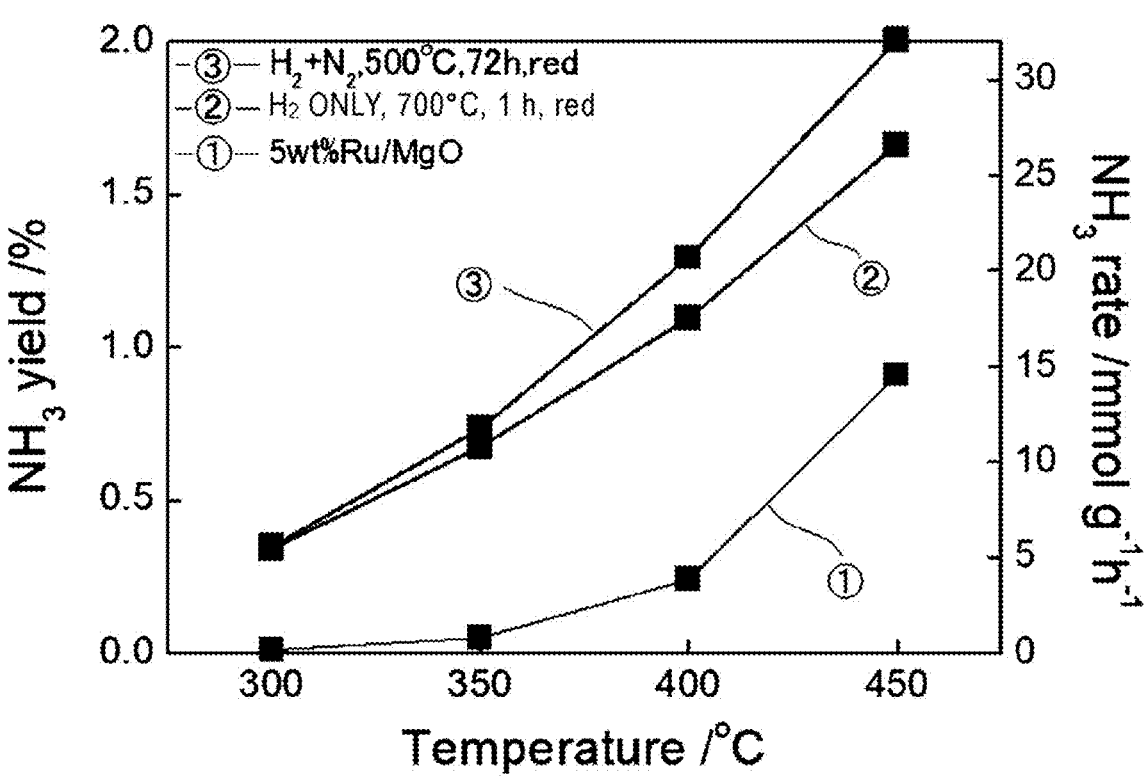
FIG. 21 is a graph showing ammonia synthesis activity measured using each $Fe/BaMgO_x$ catalyst prepared by changing pretreatment conditions for the $Co/BaMgO_x$ catalyst in Examples.

In addition, FIG. 21 also shows the results. This graph has revealed that the ammonia synthesis activity can be greatly improved depending on the pretreatment conditions.

13. Study on Co—Fe Catalyst (Examples 25 to 27)

A metal-carrier material (Example 25) was produced by adjusting the blending ratio by adding the Fe precursor of Example 22 to the Co precursor in Example 7 (20 wt % $Co/Ba_{0.05}Mg_{0.95}O_x$).

By using the metal-carrier material of Example 7, 22, or 25, ammonia was synthesized at various temperatures (300° C., 350° C., 400° C., or 450° C.), and the ammonia synthesis activity was measured by the procedure described above. The table below shows the results.

TABLE 16

| | Metal-carrier material | Reduction temperature (° C.) | Reaction temperature (° C.) | Reaction pressure (MPa) | Ammonia yield (%) | Ammonia production rate (mmol g$^{-1}$h$^{-1}$) |
|---|---|---|---|---|---|---|
| Example 7 | 20 wt % Co/Ba$_{0.01}$Mg$_{0.99}$O$_x$ | 700 | 1 | 300 | 0.656 | 10.542 |
| | | | | 350 | 1.531 | 24.597 |
| | | | | 400 | 2.731 | 43.88 |
| | | | | 450 | 3.505 | 56.314 |
| Example 22 | 20 wt % Fe/Ba$_{0.01}$Mg$_{0.99}$O$_x$ | 700 | 1 | 300 | 0.34 | 5.463 |
| | | | | 350 | 0.673 | 10.811 |
| | | | | 400 | 1.095 | 17.594 |
| | | | | 450 | 1.662 | 26.709 |
| Example 25 | 10 wt % Fe + 10 wt % Co/Ba$_{0.05}$Mg$_{0.95}$O$_x$ | — | — | 300 | 0.296 | 4.754 |
| | | | | 350 | 0.682 | 10.955 |
| | | | | 400 | 1.28 | 20.562 |
| | | | | 450 | 1.913 | 30.737 |

Figure 22:
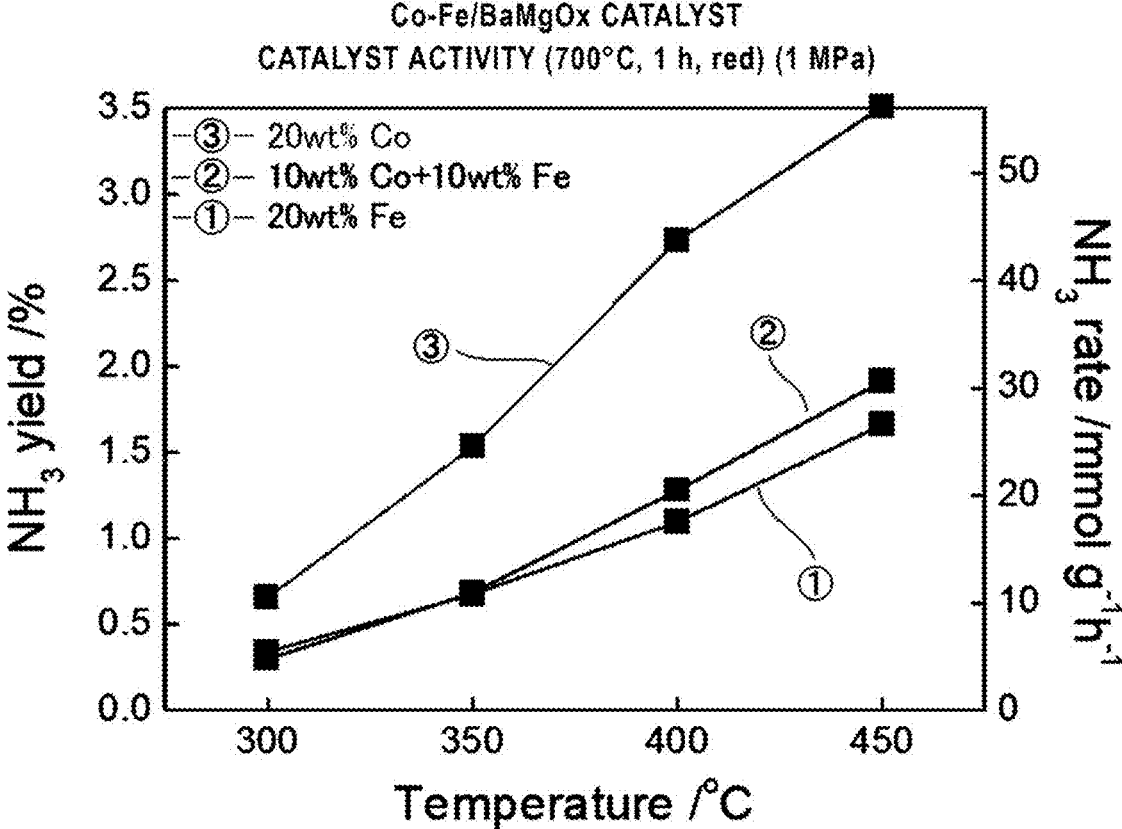
FIG. 22 is a graph showing ammonia synthesis activity measured using a Co—Fe catalyst on the $Co/BaMgO_x$ catalyst in Examples.

In addition, FIG. 22 also shows the results. This graph has demonstrated that the ammonia synthesis activity of Co alone is higher than that of Fe alone or the Fe—Co blended catalyst.

14. H2-TPR Measurement Results (Example 1, Comparative Example 2)

Figure 23:
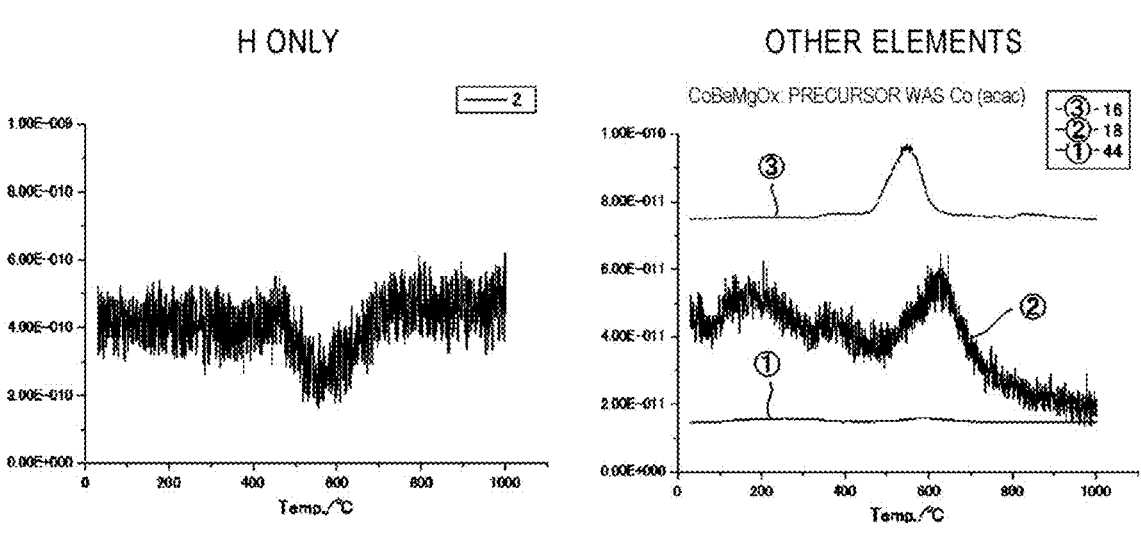
FIG. 23 shows the results of measuring H2-TPR of the Co/BaMgOx catalyst in Example 1.
Figures 24, 25:
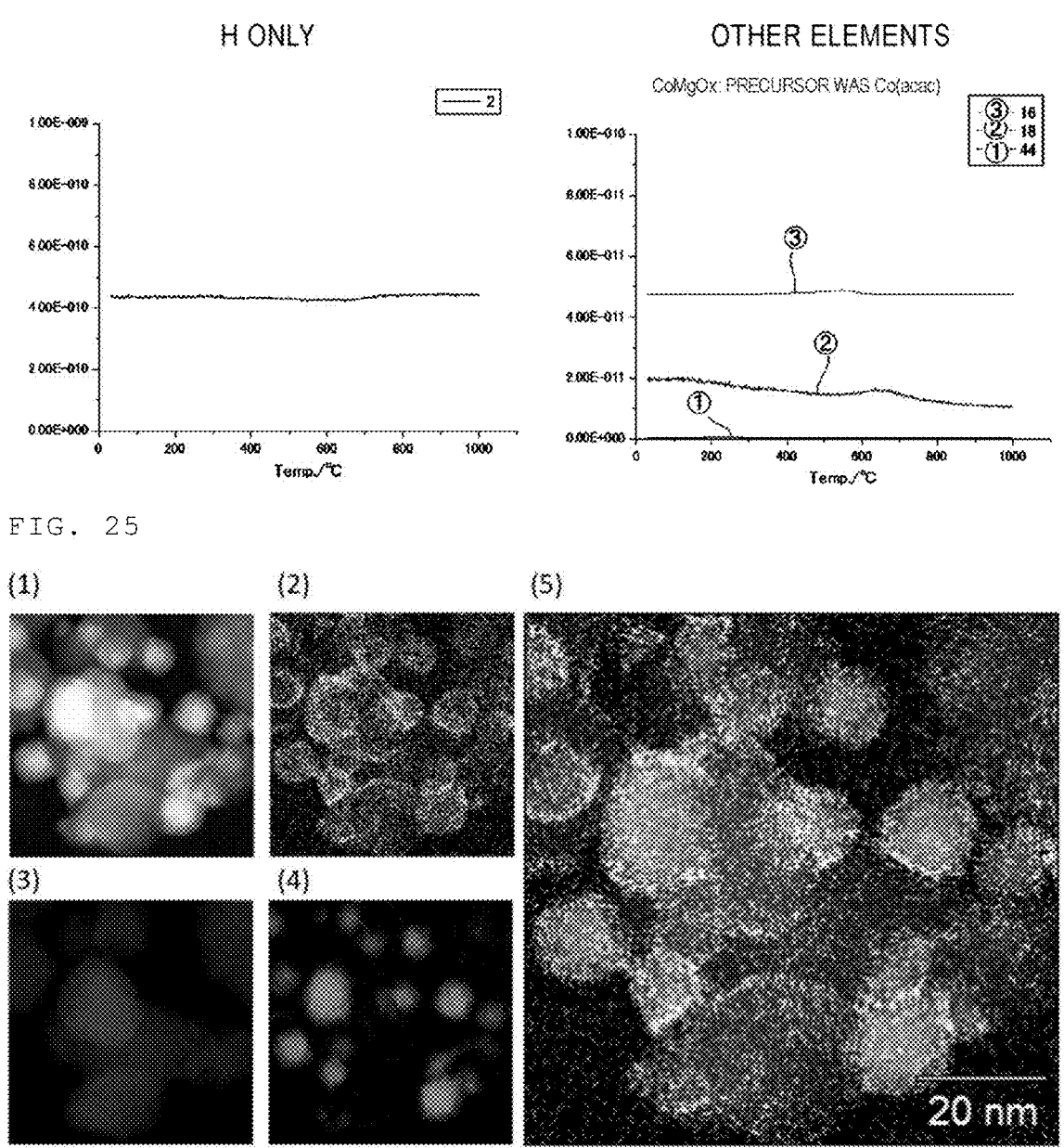
FIG. 24 shows the results of measuring H2-TPR of the Co/MgOx catalyst in Comparative Example 2.
FIG. 25 is images showing, by TEM, element mapping for the Co/BaMgOx catalyst in Example 1. Each image represents (1) HAADF-STEM image, (2) elemental mapping of Ba, (3) elemental mapping of Mg, (4) elemental mapping of Co, or (5) an image obtained by superimposing Ba, Co, and Mg elemental maps.

For Example 1 (Co/Ba$_{0.05}$Mg$_{0.95}$O$_x$_reduced at 700° C.) and Comparative Example 2 (Co/MgO$_x$), H2-TPR (H-Temperature Programmed Reduction) measurement was performed. In the H2-TPR, the temperature of a solid is continuously increased at a constant rate under a flow of hydrogen gas (H2) diluted with an inert gas (e.g., argon) and the consumption rate of hydrogen gas and the production rate of a reaction product are measured while a mass spectrometer is used as a detector. FIGS. 23 and 24 show results.

From FIG. 23, it is found that Co/BaMgO$_x$ of Example 1 absorbs hydrogen having a molecular weight of 2 at a temperature slightly higher than 500° C. and releases methane having a molecular weight of 16. In addition, it is found that water having a molecular weight of 18 is released at slightly higher than 600° C. On the other hand, it is found from FIG. 24 that Co/MgO$_x$ of Comparative Example 2 has no such absorption and release. The data indicates that in Example 1, a reduction reaction of the following formula (5) occurs with respect to Ba.

$$BaCO_3 + 4H_2 \rightarrow BaO + CH_4 + 2H_2O \qquad (5)$$

This result suggests that although BaCO$_3$ and Ba(OH)$_2$ are generated on the surface of the Co/BaMgO$_x$ catalyst, H$_2$ and BaCO$_3$ react with each other by the heat treatment under the hydrogen flow to decompose into Ba(OH)$_2$ and CH$_4$ at slightly higher than 500° C., and Ba(OH)$_2$ is decomposed into BaO and H$_2$O at slightly higher than 600° C. That is, it is considered that BaCO$_3$ and Ba(OH)$_2$ generated on the surface become BaO after the heat treatment is carried out under the hydrogen flow, so that the catalytic activity is improved.

FIG. 25 is an electron micrograph of the catalyst in Example 1. Panel (1) is a HAADF-STEM image. The following can be speculated from the element mapping images (2) to (5). In the image (1), the portion shining white most is Co, and the portion shining light gray next is the portion where magnesium oxide is present. As can be seen from the image (5), barium oxide particles are uniformly distributed on Co/MgO in the form of particles smaller than Co particles. The particle diameters of the barium oxide particles are at most about 10% of the particle diameters of the Co particles. The catalyst can be produced as follows. Barium hydroxide is supported on a magnesium oxide carrier, and cobalt is further supported thereon. Accordingly, particles of barium oxide migrate onto the cobalt particles under the catalyst production conditions. The barium compound has already been uniformly distributed on the surface of the magnesium oxide before cobalt is supported. Therefore, it is considered that Ba is also present at or near the interface between the magnesium oxide and the cobalt. The superimposed image (5) shows that Ba exists as a nano-order core (Co particles)/shell (barium oxide) structure so as to cover the Co periphery. Note that in this catalyst, electrons are strongly donated to surface cobalt atoms located close to barium oxide, and high ammonia synthesis activity is thus exhibited. This supports the above speculation.

Figure 34:
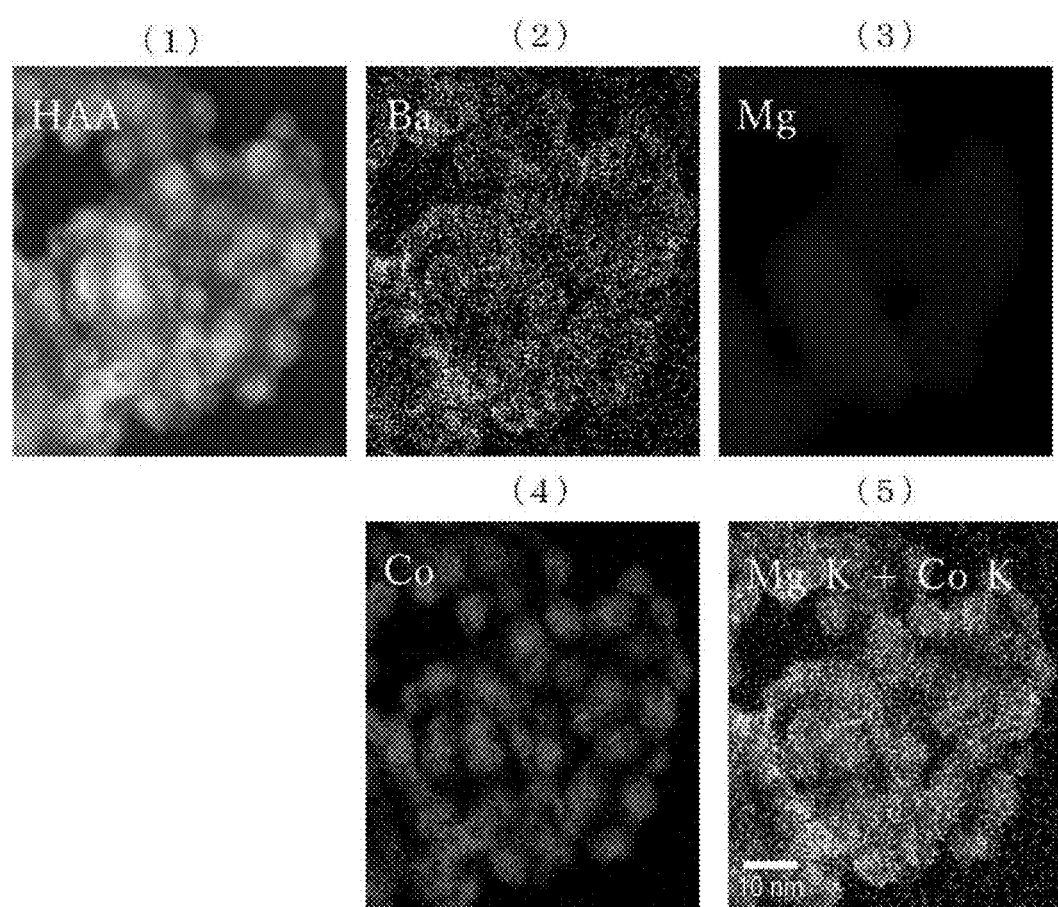
FIG. 34 is images showing, by TEM, element mapping for the Co/BaMgOx catalyst in Example 17. Each image represents (1) HAADF-STEM image, (2) elemental mapping of Ba, (3) elemental mapping of Mg, (4) elemental mapping of Co, or (5) an image obtained by superimposing Ba, Co, and Mg elemental maps.

FIG. 34 is an electron micrograph of the catalyst in Example 17. Panel (1) is a HAADF-STEM image. The following can be speculated from the element mapping images (2) to (5) when compared to those of FIG. 25. During the reduction at 500° C. for 72 h (FIG. 34), the reduction temperature is lower than that during the reduction at 700° C. for 1 h (FIG. 25), so that a nano-order core (Co particles)/shell (barium oxide) structure is observed. However, the particle diameter of barium oxide is small, and the mobility of barium oxide onto cobalt particles is somewhat low. Here, it is considered that the carbonate and hydroxide of barium are decomposed more than in the case of the reduction at 500° C. for 1 h (Example 7) by the amount caused by the reduction treatment performed over a long period of time. On the other hand, since the reduction temperature is low, the cobalt particle diameter is small. In addition, the degree of reduction of cobalt is higher than that in the case of reduction at 500° C. for 1 h (Example 7) by the amount caused by the reduction treatment performed over a long period of time. The number of surface cobalt atoms in a metal state contributing to ammonia synthesis thus increases. Therefore, the catalyst of Example 17 shows ammonia synthesis activity comparable to that of the catalyst of Example 1.

As in Examples 33 and 34 described later, in the case of the double addition of Group 1+Group 2 elements, the ammonia synthesis activity was much higher than that of Example 17. This is because the group 1 element, which is a more strongly basic element than the oxide of the group 2 element, was incorporated into the shell structure of barium oxide, and electrons are very strongly donated to surface cobalt atoms at or near the shell.

15. Ammonia Synthesis Activity of Catalyst in Which Ba Was Changed to Another Group 2 Element (Sr, Ca) (Examples 26 to 27)

Here, 20 wt % Co/Sr$_{0.01}$Mg$_{0.99}$O$_x$ (Example 26) and 20 wt % $Co/Ca_{0.01}Mg_{0.99}O_x$ (Example 27) were each prepared by using $Sr(OH)_2$ and $Ca(OH)_2$, respectively, in place of $Ba(OH)_2$ as a raw material in Example 1. By using each metal-carrier material, ammonia was synthesized at various temperatures (300° C., 350° C., 400° C., or 450° C.), and the ammonia synthesis activity was measured by the procedure described above. As ammonia synthesis conditions, the reaction pressure was set to 1.0 MPa, the reaction gas was provided at $H_2/N_2$=90/30 cc/min (total flow rate was 120 cc/min), and the catalyst amount was set to 0.1 g ($SV$=72 L $h^{-1}g^{-1}$). The table below shows the results.

TABLE 17

| | Metal-carrier material | Reduction temperature (° C.) | Reduction time (h) | Reaction temperature (° C.) | Ammonia yield (%) | Ammonia production rate (mmol $g^{-1}h^{-1}$) |
|---|---|---|---|---|---|---|
| Example 26 | 20 wt % $Co/Sr_{0.01}Mg_{0.99}O_x$ | 700 | 1.0 | 300 | 0.09 | 1.4 |
| | | | | 350 | 0.28 | 4.5 |
| | | | | 400 | 0.87 | 14.0 |
| | | | | 450 | 1.63 | 26.1 |
| Example 27 | 20 wt % $Co/Ca_{0.01}Mg_{0.99}O_x$ | 700 | 1.0 | 300 | 0.05 | 0.7 |
| | | | | 350 | 0.17 | 2.7 |
| | | | | 400 | 0.45 | 7.2 |
| | | | | 450 | 0.96 | 15.5 |

Figure 26:
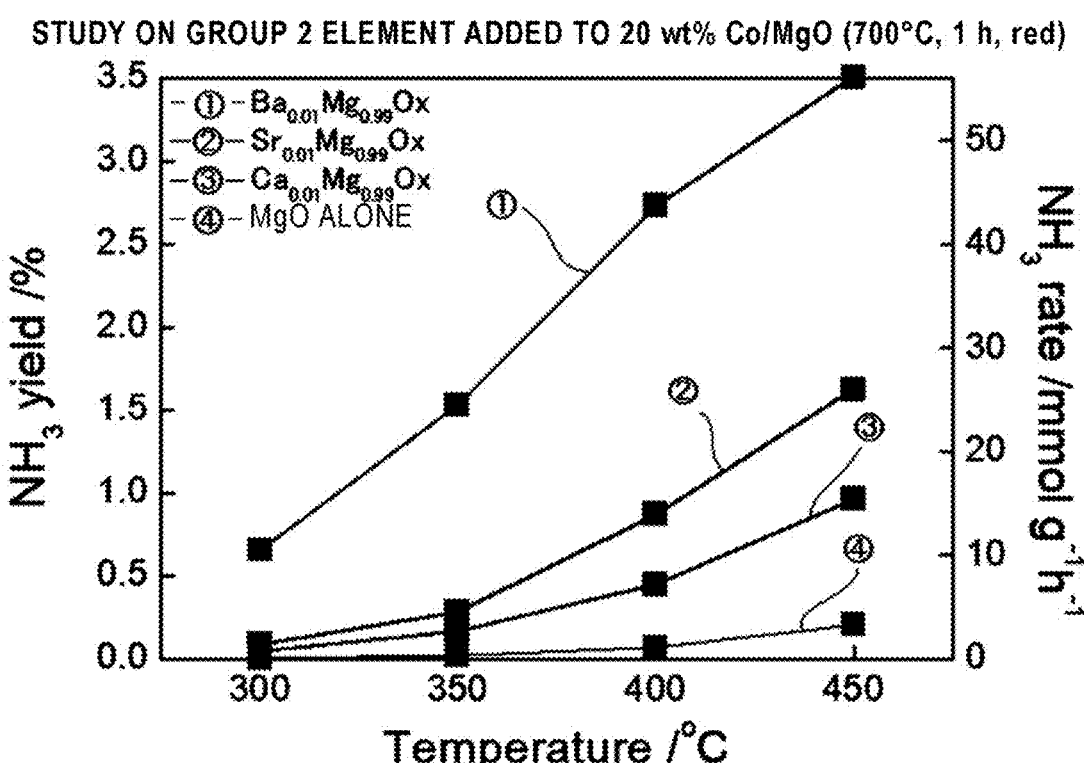
FIG. 26 is a graph showing ammonia synthesis activity measured using each catalyst in which Ba of a Co/BaMgOx catalyst in Examples was replaced by another Group 2 element.

In addition, FIG. 26 also shows the results. This graph has indicated that the Group 2 elements (Sr, Ca) other than Ba caused higher activity than MgO alone, and the effect of the addition on improving the ammonia synthesis activity was observed.

16. Group 1 Element Added in Place of Group 2 Element (Examples 28 to 31)

Composite oxides were produced at various reduction temperatures using $KNO_3$, KOH, $LiNO_3$, or LiOH in place of the raw material $Ba(OH)_2$ in Example 1, including 20 wt % $Co/K_{0.03}Mg_{0.97}O_x$ (Example 28), 20 wt % $Co/K_{0.03}Mg_{0.97}O_x$ (Example 29), 20 wt % added using KOH, the effect of improving the ammonia activity was somewhat observed, but the ammonia synthesis activity was not significantly higher than that in the case of the Group 2 element.

17. Group 1 Element+Group 2 Element Double Addition (Examples 32 to 34)

Composite oxides were produced using CsOH, RbOH, or KOH in place of the raw material $Ba(OH)_2$ in Example 1, and were each subjected to pretreatment under reduction conditions at 700° C. for 1 h to produce 20 wt % $Co/Cs_{0.01}Ba_{0.01}Mg_{0.95}O_x$_reduced at 700° C. for 1 h (Example 32), 20 wt % $Co/Rb_{0.01}Ba_{0.01}Mg_{0.95}O_x$_reduced at 700° C. for 1 h (Example 33), or 20 wt % $Co/K_{0.01}Ba_{0.01}Mg_{0.95}O_x$_reduced at 700° C. for 1 h (Example 34), respectively. By using each metal-carrier material, ammonia was synthesized at various temperatures (300° C., 350° C., 400° C., or 450° C.), and the ammonia synthesis activity was measured by the procedure described above. The table below shows the results.

TABLE 18

| | Metal-carrier material | Reduction temperature (° C.) | Reduction time (h) | Reaction temperature (° C.) | Ammonia yield (%) | Ammonia production rate (mmol $g^{-1}h^{-1}$) |
|---|---|---|---|---|---|---|
| Example 32 | 20 wt % $Co/Cs_{0.01}Ba_{0.01}Mg_{0.98}O_x$—reduced at 700° C. for 1 h | 700 | 1.0 | 300 | 0.57 | 9.1 |
| | | | | 350 | 1.46 | 23.9 |
| | | | | 400 | 2.43 | 39.0 |
| | | | | 450 | 3.03 | 48.7 |
| Example 33 | 20 wt % $Co/Rb_{0.01}Ba_{0.01}Mg_{0.98}O_x$—reduced at 700° C. for 1 h | 700 | 1.0 | 300 | 0.62 | 9.9 |
| | | | | 350 | 1.59 | 25.5 |
| | | | | 400 | 2.67 | 42.2 |
| | | | | 450 | 3.28 | 52.6 |
| Example 34 | 20 wt % $Co/K_{0.01}Ba_{0.01}Mg_{0.98}O_x$—reduced at 700° C. for 1 h | 700 | 1.0 | 300 | 0.67 | 10.7 |
| | | | | 350 | 1.57 | 25.2 |
| | | | | 400 | 2.63 | 42.2 |
| | | | | 450 | 3.26 | 52.6 |

Figure 27:
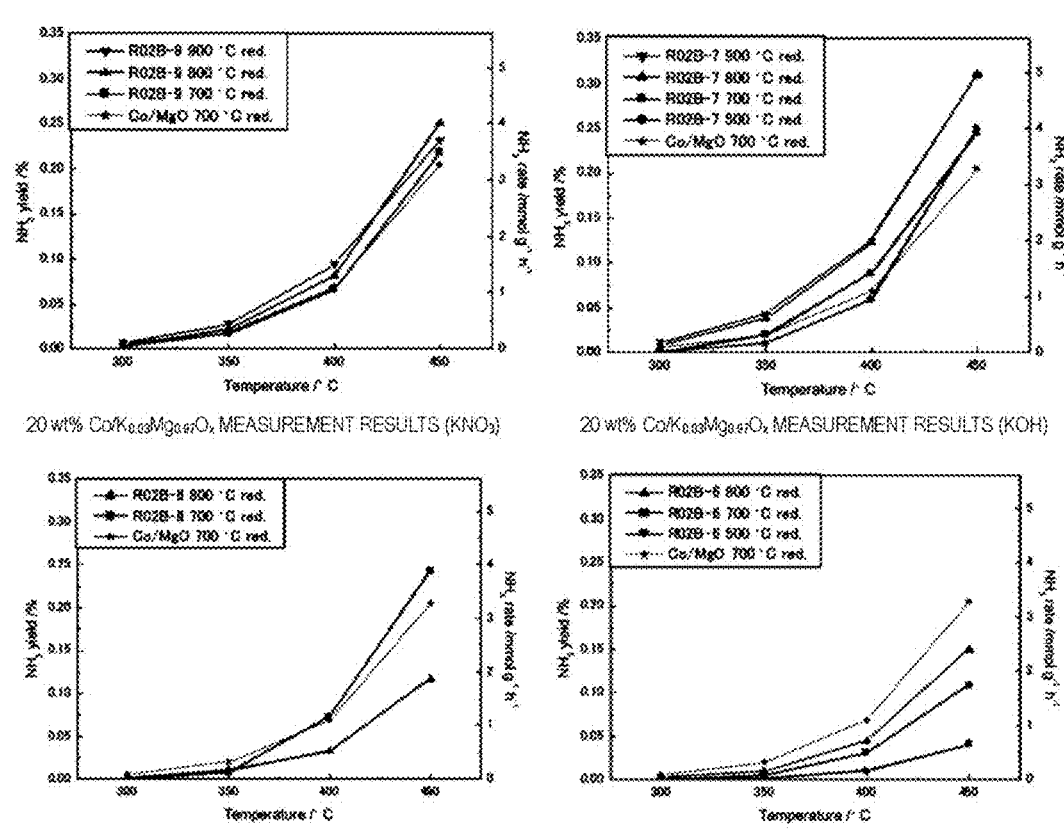
FIG. 27 is graphs showing ammonia synthesis activity measured using each catalyst prepared using a Group 1 element in place of a Group 2 element.
Figure 28:
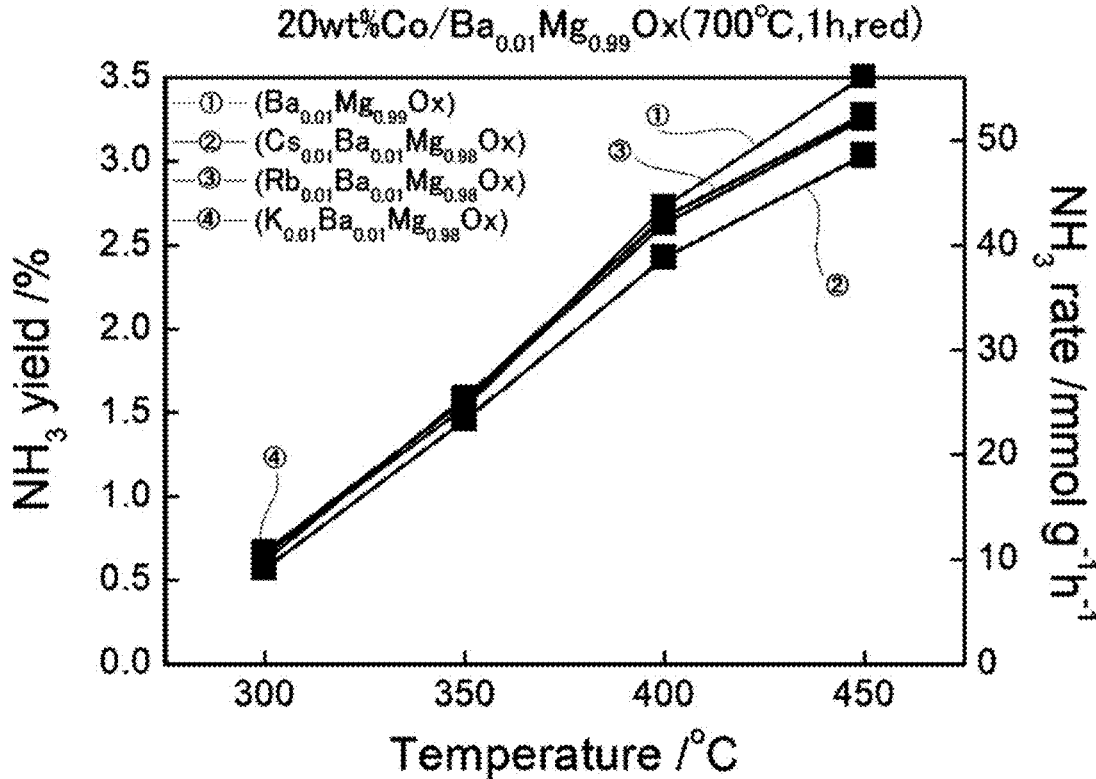
FIG. 28 is a graph showing ammonia synthesis activity of each catalyst using a carrier prepared by adding both a Group 2 element and a Group 1 element.

$Co/Li_{0.03}Mg_{0.97}O_x$ (Example 30), or 20 wt % $Co/Li_{0.03}Mg_{0.97}O_x$ (Example 31), respectively. By using each metal-carrier material, ammonia was synthesized at various temperatures (300° C., 350° C., 400° C., or 450° C.), and the ammonia synthesis activity was measured by the procedure described above. FIG. 27 shows the results. These graphs have revealed that in the system in which K was In addition, FIG. 28 also shows the results. This graph has demonstrated that the case where the group 1 element was added in an amount of 1 mol % and the pretreatment conditions were fixed at 700° C. for 1 h had somewhat lower activity than the case (only Ba) without adding any of the Group 1 elements, and had ammonia synthesis activity comparable to that of the case with only Ba. However, since the ammonia synthesis activity was the highest in the case of only Ba, the improvement in the ammonia synthesis activity by adding (double adding) each Group 1 element was not observed.

18. Group 1 Element+Group 2 Element Double Addition (Study 1 on Reduction Conditions) (Examples 35 to 36)

The amount of KOH as a raw material was increased and the reduction conditions were changed in Example 30 to produce 20 wt % $Co/K_{0.03}Ba_{0.01}Mg_{0.96}O_x$_reduced at 500° C. for 72 h (Example 35) or 20 wt % $Co/K_{0.03}Ba_{0.01}Mg_{0.96}O_x$_reduced at 700° C. for 1 h (Example 36). By using each metal-carrier material, ammonia was synthesized at various temperatures (300° C., 350° C., 400° C., or 450° C.), and the ammonia synthesis activity was measured by the procedure described above. The table below shows the results.

TABLE 19

| | Metal-carrier material | Reduction temperature (° C.) | Reduction time (h) | Reaction temperature (° C.) | Ammonia yield (%) | Ammonia production rate (mmol g$^{-l}$h$^{-1}$) |
|---|---|---|---|---|---|---|
| Example 35 | 20 wt % $Co/K_{0.03}Ba_{0.01}Mg_{0.96}O_x$_reduced at 500° C. for 72 h | 500 | 72.0 | 300 | 0.40 | 6.3 |
| | | | | 350 | 1.12 | 18.0 |
| | | | | 400 | 2.18 | 35.1 |
| | | | | 450 | 2.91 | 46.8 |
| Example 36 | 20 wt % $Co/K_{0.03}Ba_{0.01}Mg_{0.96}O_x$_reduced at 700° C. for 1 h | 700 | 1.0 | 300 | 0.49 | 7.9 |
| | | | | 350 | 1.29 | 20.8 |
| | | | | 400 | 2.18 | 35.1 |
| | | | | 450 | 2.79 | 44.8 |

Figure 29:
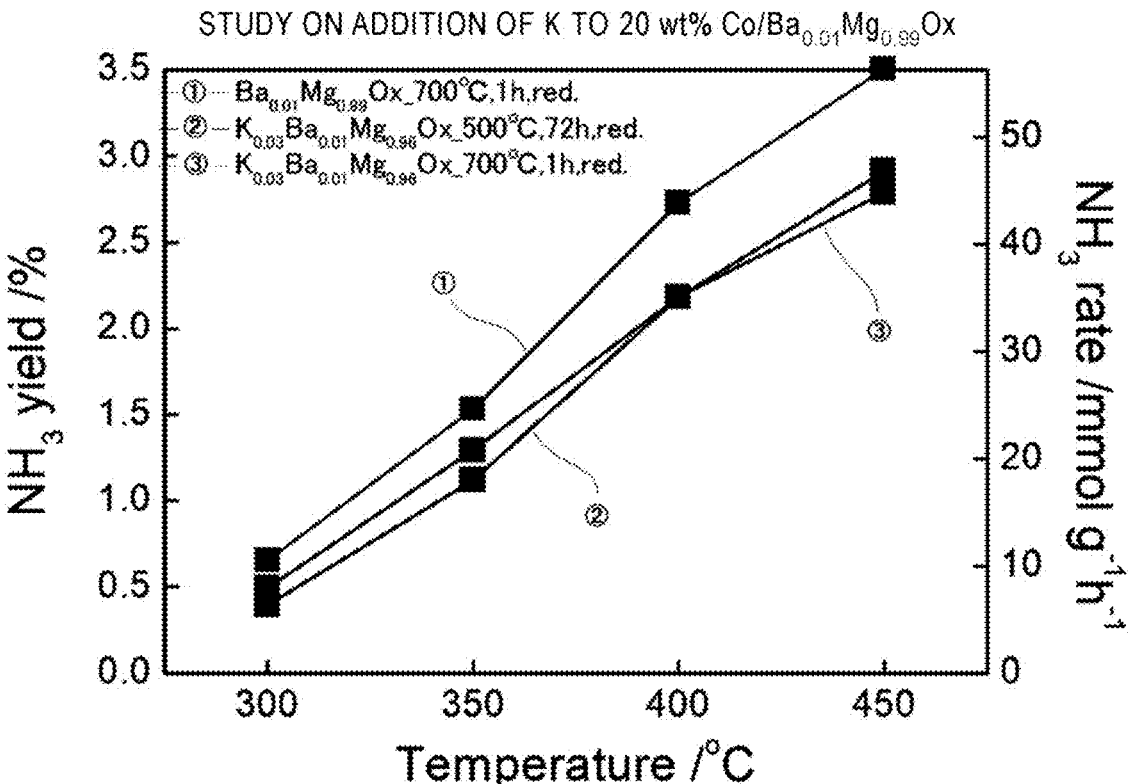
FIG. 29 is a graph showing ammonia synthesis activity of each catalyst using a carrier prepared by adding both a Group 2 element and a Group 1 element.

In addition, FIG. 29 also shows the results. This graph shows that in the case of 3 mol % K+1 mol % Ba, the effect of improving the ammonia synthesis activity was not observed even when the reduction was performed at a low temperature for a long time.

19. Group 1 Element+Group 2 Element Double Addition (Study 2 on Reduction Conditions) (Example 37)

The amount of the raw material KOH was not changed but the reduction conditions were changed in Example 30 to produce 20 wt % $Co/K_{0.01}Ba_{0.01}Mg_{0.95}O_x$_reduced at 500° C. for 72 h (Example 37). By using each metal-carrier material, ammonia was synthesized at various temperatures (300° C., 350° C., 400° C., or 450° C.), and the ammonia synthesis activity was measured by the procedure described above. The table below shows the results.

TABLE 20

| | Metal-carrier material | Reduction temperature (° C.) | Reduction time (h) | Reaction temperature (° C.) | Ammonia yield (%) | Ammonia production rate (mmol g$^{-l}$h$^{-1}$) |
|---|---|---|---|---|---|---|
| Example 37 | 20 wt % $Co/K_{0.01}Ba_{0.01}Mg_{0.98}O_x$_reduced at 500° C. for 72 h | 500 | 72.0 | 300 | 0.68 | 11.0 |
| | | | | 350 | 2.00 | 32.2 |
| | | | | 400 | 3.13 | 50.3 |
| | | | | 450 | 3.51 | 56.3 |

Figure 30:
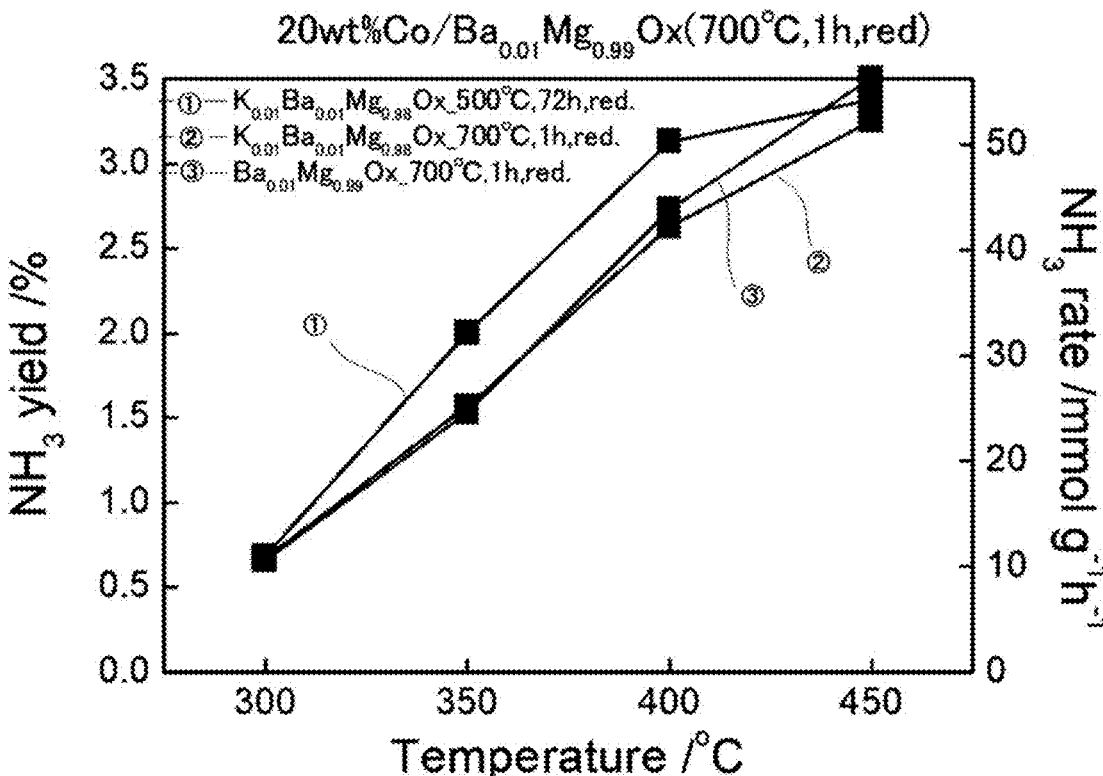
FIG. 30 is a graph showing ammonia synthesis activity of each catalyst using a carrier prepared by adding both a Group 2 element and a Group 1 element.

In addition, FIG. 30 also shows the results. This graph has revealed that in the case of 1 mol % K+1 mol % Ba, the activity was improved when the reduction was performed at a low temperature for a long time. Note that in the graph, the activity at the reaction temperature around 450° C. is affected by equilibrium, and it is presumed that all the cases have substantially the same degree of ammonia synthesis activity.

20. Group 1 Element+Group 2 Element Double Addition (Study 3 on Reduction Conditions) (Example 38)

The reduction conditions were changed in Example 29 to produce 20 wt % $Co/Rb_{0.01}Ba_{0.01}Mg_{0.95}O_x$_reduced at 500° C. for 72 h (Example 38). By using each metal-carrier material, ammonia was synthesized at various temperatures (300° C., 350° C., 400° C., or 450° C.), and the ammonia synthesis activity was measured by the procedure described above. The table below shows the results.

TABLE 21

| | Metal-carrier material | Reduction temperature (° C.) | Reduction time (h) | Reaction temperature (° C.) | Ammonia yield (%) | Ammonia production rate (mmol g$^{-1}$h$^{-1}$) |
|---|---|---|---|---|---|---|
| Example 38 | 20 wt % $Co/Rb_{0.01}Ba_{0.01}Mg_{0.98}O_x$_reduced at 500° C. for 72 h | 500 | 72.0 | 300 | 0.80 | 12.8 |
| | | | | 350 | 1.91 | 30.7 |
| | | | | 400 | 3.13 | 50.3 |
| | | | | 450 | 3.51 | 56.3 |

Figure 31:
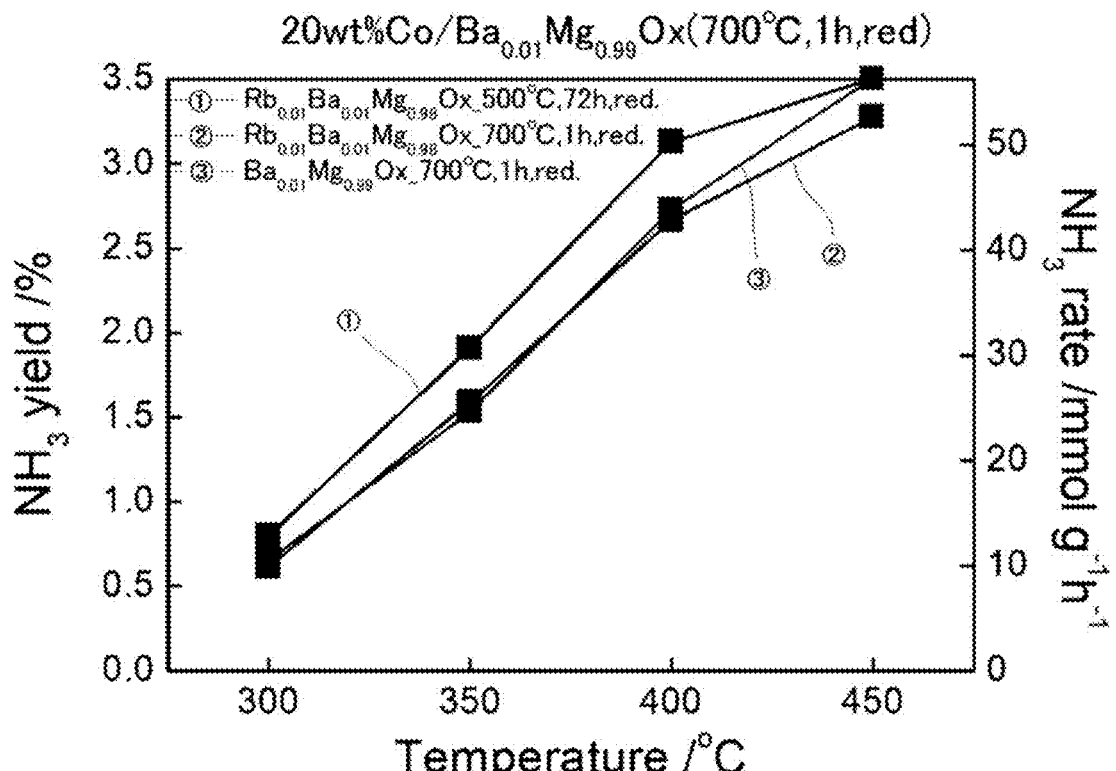
FIG. 31 is a graph showing ammonia synthesis activity of each catalyst using a carrier prepared by adding both a Group 2 element and a Group 1 element.

In addition, FIG. 31 also shows the results. This graph has revealed that in the case of 1 mol % Rb+1 mol % Ba, the activity was improved when the reduction was performed at a low temperature for a long time. Note that in the graph, the activity at the reaction temperature around 450° C. is affected by equilibrium, and it is presumed that all the cases have substantially the same degree of ammonia synthesis activity.

21. Ni in Place of Co (Study 1 on Reaction Pressure) (Example 39)

The same operation as in Example 1 was repeated except that Co (II) acetylacetonato was changed to nickel (II) acetylacetonato (Kishida Chemical Co., Ltd.) as an Ni precursor in Example 1 to give $Ni/Ba_{0.01}Mg_{0.99}O_x$_reduced at 700° C. for 1 h (Example 35). By using the metal-carrier material (Example 39) or each metal-carrier material of Example 1 or 22, ammonia was synthesized at various temperatures (300° C., 350° C., 400° C., or 450° C.) and at 1.0 MPa, and the ammonia synthesis activity was measured by the procedure described above. The table below shows the results.

TABLE 22

| | Metal-carrier material | Reduction temperature (° C.) | Reduction time (h) | Reaction temperature (° C.) | Ammonia yield (%) | Ammonia production rate (mmol g$^{-1}$h$^{-1}$) |
|---|---|---|---|---|---|---|
| Example 39 | $Ni/Ba_{0.01}Mg_{0.99}O_x$_reduced at 700° C. for 1 h | 700 | 1.0 | 300 | 0.00 | 0.00 |
| | | | | 350 | 0.08 | 1.3 |
| | | | | 400 | 0.48 | 7.6 |
| | | | | 450 | 1.89 | 30.3 |

Figure 32:
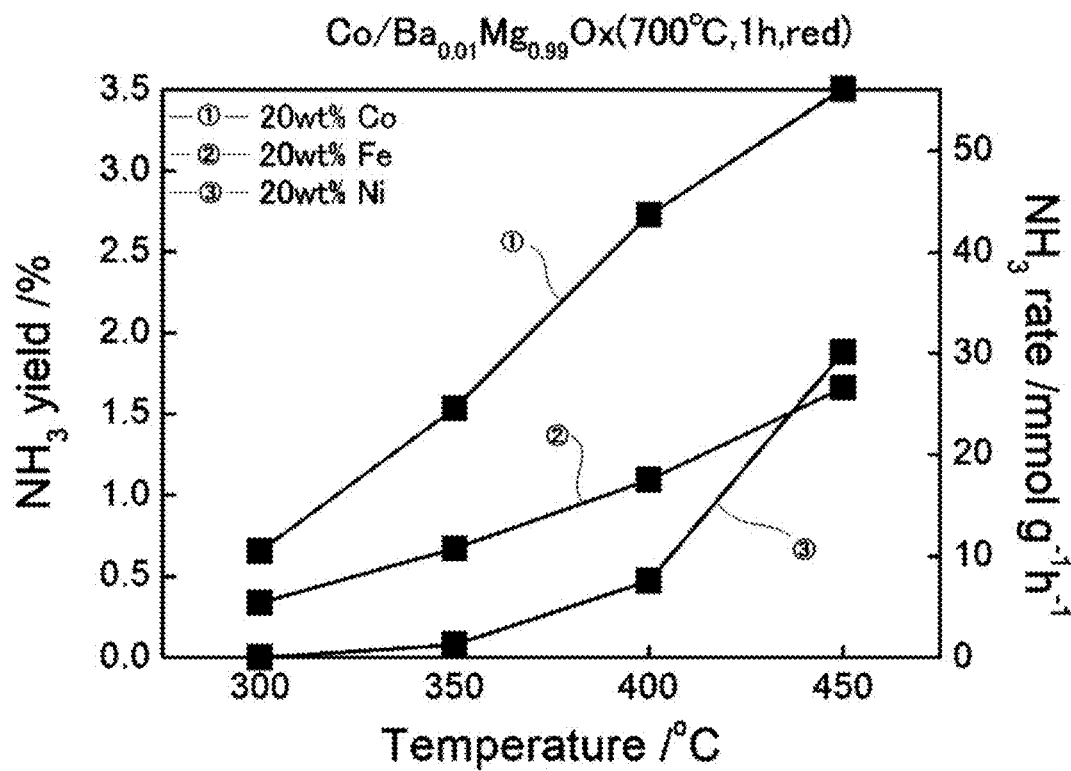
FIG. 32 is a graph showing ammonia synthesis activity of each catalyst using a carrier prepared by adding each transition metal element.

In addition, FIG. 32 also shows the results. This graph has revealed that the Ni-supported catalyst had higher ammonia synthesis activity than the Fe-supported catalyst at 450° C.

22. Ni in Place of Co (Study 2 on Reaction Pressure) (Example 40)

By using each metal-carrier material of Example 1, 22, or 40, ammonia was synthesized under conditions at 3.0 MPa, and the ammonia synthesis activity was measured by the procedure described above. The table below shows the results.

TABLE 23

| | Metal-carrier material | Reduction temperature (° C.) | Reduction time (h) | Reaction temperature (° C.) | Ammonia yield (%) | Ammonia production rate (mmol $g^{-1}h^{-1}$) |
|---|---|---|---|---|---|---|
| Example 40 | $Ni/Ba_{0.01}Mg_{0.99}O_x$ reduced at 700° C. for 3 h | 700 | 3.0 | 300 | 0.00 | 0.1 |
| | | | | 350 | 0.03 | 0.4 |
| | | | | 400 | 0.33 | 5.4 |
| | | | | 450 | 2.01 | 32.3 |

Figure 33:
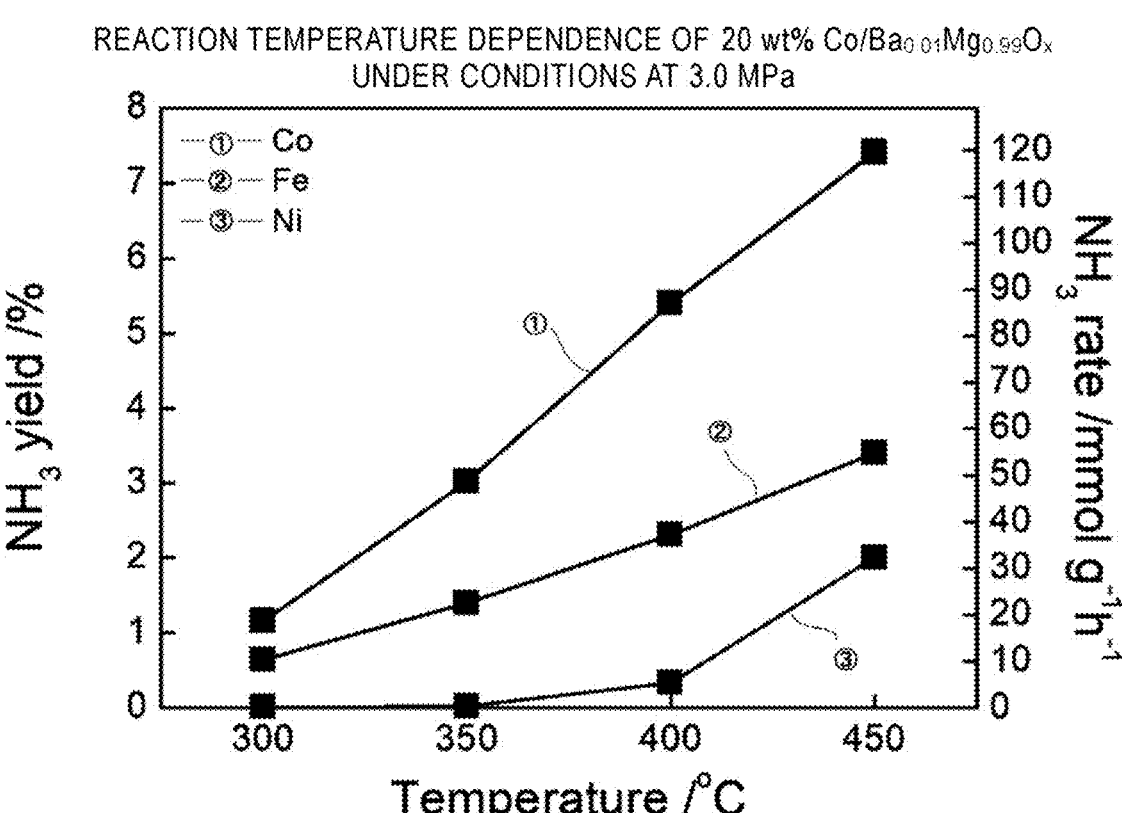
FIG. 33 is a graph showing ammonia synthesis activity of each catalyst using a carrier prepared by adding each transition metal element.

In addition, FIG. 33 also shows the results. From this graph, it was found that both the Ni-supported catalyst and the Fe-supported catalyst exhibited relatively high activity even at 3 MPa. However, the Ni-supported catalyst seems to be slightly affected by poisoning.

23. Degree of Co Reduction

In order to compare the effect of the hydrogen reduction treatment on the reduction state of Co in the catalyst, the X-ray absorption near edge structure (XANES) spectrum of the Co K absorption edge of $Co/BaMgO_x$ was measured.

For each catalyst before the reduction treatment or each reference sample to be compared, each sample for XANES spectrum measurement was prepared by the following procedure. The catalyst before the reduction treatment or the reference sample were ground and mixed with boron nitride powder in the air, and the mixed powder was pressed into a disk shape having a diameter of 10 mm and then molded. At this time, the ratio between each catalyst or the reference sample and boron nitride and the thickness of the disk were suitably adjusted so that the concentration of Co in the analyte was optimized with respect to the absorbance of the X-ray transmitted at the time of spectrum measurement.

For each catalyst after the reduction treatment, each sample for XANES spectrum measurement was prepared by the following procedure. The catalyst was charged in a sample tube and connected to a fixed bed flow type reactor, and the reduction treatment was performed by heating at a predetermined temperature for 1 h while flowing hydrogen. The catalyst after the reduction treatment was allowed to cool to room temperature while inert gas (Ar) was supplied to the sample tube. The sample tube of this reactor was provided with cocks on the gas inlet and outlet sides. By closing the cocks after the cooling, the catalyst was able to be held without being brought into contact with the atmosphere even when the cocks were removed from the reactor. This sample tube was used to transfer the catalyst after the reduction to a glove box filled with inert gas. The reduced catalyst and the boron nitride powder were then ground and mixed in the glove box. Thereafter, the mixed powdery material was pressure-molded into a disk shape having a diameter of 10 mm. At this time, the ratio between each catalyst and boron nitride and the thickness of the disk were suitably adjusted so that the concentration of Co in the analyte was optimized with respect to the absorbance of the X-ray transmitted at the time of spectrum measurement.

The molded disc was sealed in triplicate in an oxygen-blocking resin bag in a glove box. As a result, even when the resin bag is taken out of the glove box into the atmosphere, the spectrum can be measured without the catalyst being affected by the reoxidation by oxygen.

The XANES spectrum of each prepared sample for measurement was measured at BL01B1 of the large synchrotron radiation facility (SPirng-8). An ion chamber was used for a detector, and a spectrum measured by a transmission method was analyzed using X-ray absorption spectrum analysis software (Athena, Demeter 0.9.26).

Figure 36:
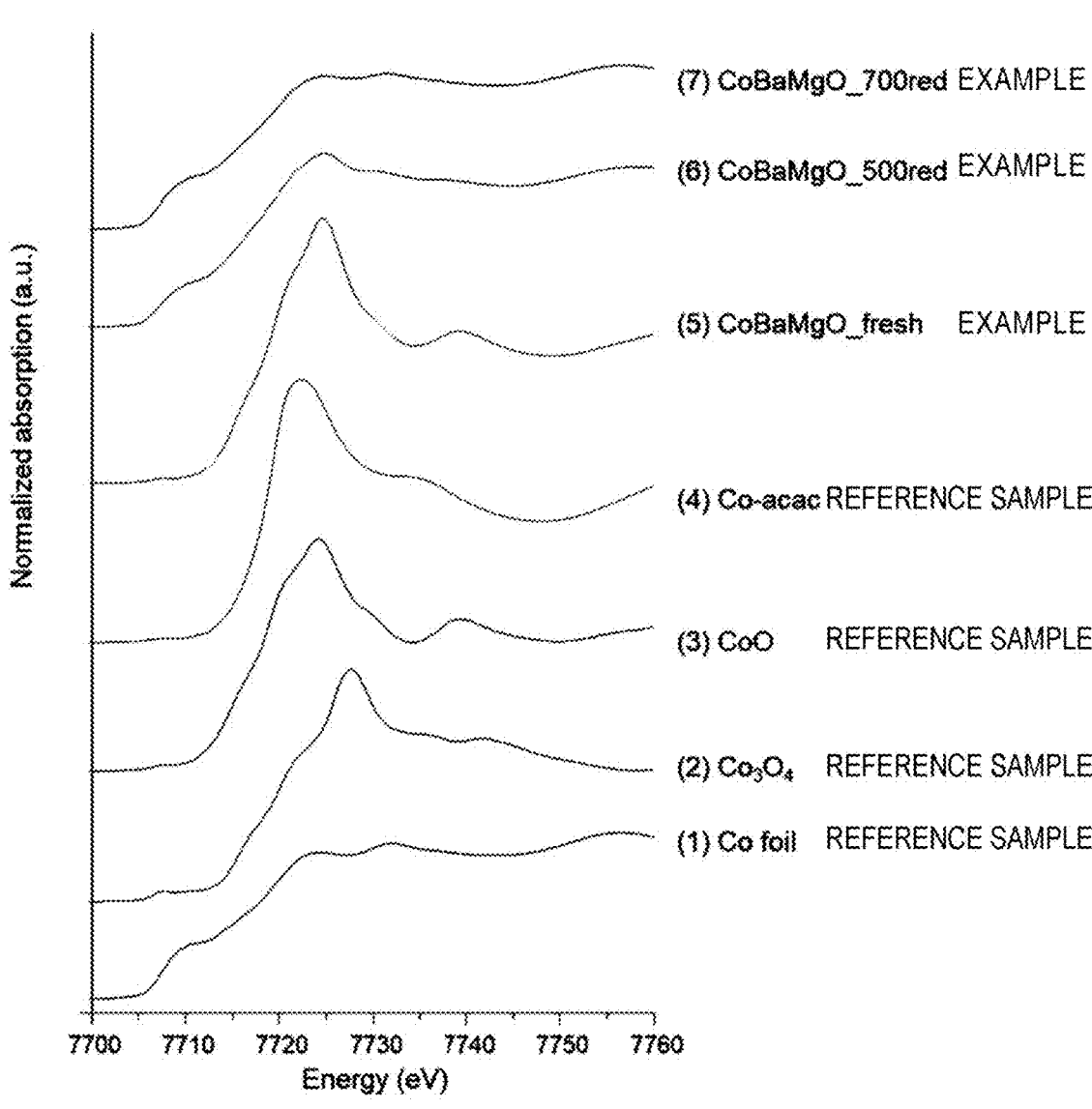
FIG. 36 is normalized XANES spectra of catalysts or reference samples.

FIG. 36 shows normalized XANES spectra of the catalysts or reference samples. The spectral shapes were compared between the unreduced catalyst and each reference sample. The energy position and shape of the XANES spectrum of the unreduced catalyst were in good agreement with those of the oxide (II) (CoO) in both the case with Ba and the case without Ba. This has suggested that Co existed as CoO in the unreduced catalyst. In addition, the reduction treatment caused the shape of the XANES spectrum to become closer to that of the Co foil. This means that Co in the catalyst was changed to a metal state by the reduction treatment.

Then, linear combination fitting based on the spectra of the metal Co foil and the Co oxide (II) of the reference samples was performed on the normalized XANES spectrum of each catalyst after the reduction treatment, and the ratio (degree of reduction) of metallic Co contained in the catalyst was estimated. The results have demonstrated that the $Co/BaMgO_x$ catalyst had a degree of Co reduction of 71% after reduced at 500° C. for 1 h, and a degree of Co reduction of 93% after reduced at 700° C. for 1 h (in the case of the catalyst of Example 1).

This has revealed that as the reduction treatment temperature increases, the percentage of Co oxide inactive in ammonia synthesis decreases, whereas the percentage of metallic Co active in ammonia synthesis increases.

The invention claimed is:

1. A metal-carrier material comprising a composite oxide comprising an oxide of a metal element L and an oxide of a metal element N, the composite oxide represented by a composition of general formula (1):

$$L_nN_{1-n} \tag{1}$$

the composite oxide having the following characteristics (a) to (d):
  (a) the metal element L being an oxide of any element(s) selected from the group consisting of Ba and Sr,
  (b) the metal element N comprising a Group 1 or Group 2 element other than the metal element L,
  (c) n of 0.001 or more and 0.300 or less, and (d) the oxide of the metal element L and the oxide of the metal element N forming no solid solution, and oxide particles of the metal element L being deposited on surfaces of oxide particles of the metal element N, the composite oxide having, supported thereon, particles of at least one metal M selected from the group consisting of Ru, Fe, Co, Ni, Rh, Pd, Os, Ir, and Pt, wherein the metal particles M are supported on the oxide of the metal element L and oxide of the metal element L are deposited on surfaces of the metal particles M, and wherein the metal particles M are not in direct contact with the oxide of the metal element N.

2. A metal-carrier material comprising a composite oxide comprising an oxide of a metal element L and an oxide of a metal element N, the composite oxide represented by a composition of general formula (1):

$$L_nN_{1-n} \qquad (1)$$

the composite oxide having the following characteristics (a) to (d):

(a) the metal element L being an oxide of any element(s) selected from the group consisting of:

(i) a Group 1 element, (ii) a Group 2 element, or (iii) a Group 1 element and a Group 2 element, (b) the metal element N comprising a Group 1 or Group 2 element other than the metal element L, (c) n of 0.001 or more and 0.300 or less, and (d) the oxide of the metal element L and the oxide of the metal element N forming no solid solution, and oxide particles of the metal element L being deposited on surfaces of oxide particles of the metal element N, wherein the composite oxide has, supported thereon, particles of cobalt.

3. An ammonia synthesis catalyst comprising the metal-carrier material according to claim 1.

4. A method of producing the metal-carrier material according to claim 1, comprising the steps of (a) to (d):

(a) impregnating a metal element N-containing N precursor with a metal element L-containing L precursor;

(b) calcinating the resulting mixture at a temperature of 500° C. or higher to obtain a carrier including a composite oxide;

(c) impregnating the composite oxide with metal particles M-containing compound precursor to obtain an impregnated carrier; and (d) calcinating the impregnated carrier at a temperature of 400° C. or higher.

5. The method of producing a metal-carrier material according to claim 4, further comprising step (e):

(e) calcinating the resulting metal-carrier material obtained in (d) at 500° C. or higher in a presence of hydrogen.

6. A method of producing ammonia, comprising bringing hydrogen and nitrogen into contact with a catalyst, the catalyst being the ammonia synthesis catalyst according to claim 3.

7. The metal carrier material according to claim 1, wherein the metal element N represents a metal element that is a weakly basic element having a value of partial negative charge ($-\delta_{OB}$) of oxygen in an oxide state of 0.35 or more and 0.55 or less.

8. The metal carrier material according to claim 1, wherein the composite oxide is a binary composite oxide consisting of a metal element A contained in the metal element L and a metal element B contained in the metal element N, wherein the general formula (1) is represented by a composition of general formula (2):

$$A_nB_{1-n} \qquad (2)$$

the composite oxide having the following characteristics (a) to (c);

(a) the metal element B representing a Group 2 element that is a weakly basic element having a value of partial negative charge ($-\delta_{OB}$) of oxygen in an oxide state of 0.35 or more and 0.55 or less, (b) n of 0.001 or more and 0.300 or less, and (c) an oxide of the metal element A and an oxide of the metal element B forming no solid solution, and oxide of the metal element A being deposited on surfaces of oxide particles of the metal element B.

9. The metal carrier material according to claim 1, wherein the general formula (1) is represented by a composition of general formula (3):

$$L_nN_{1-n}O_x \qquad (3)$$

the composite oxide having the following characteristics (a) to (e):

(a) the metal element L being an oxide of any element(s) selected from the group consisting of Ba and Sr, (b) the metal element N comprising a Group 1 or Group 2 element other than the metal element L, (c) n of 0.001 or more and 0.300 or less, (d) the oxide of the metal element L and the oxide of the metal element N forming no solid solution, and oxide of the metal element L being deposited on surfaces of oxide particles of the metal element N, and (e) x is the number of oxygen atoms required to keep the composite oxide electrically neutral.

10. The metal carrier material according to claim 9, wherein the metal element N represents a metal element that is a weakly basic element having a value of partial negative charge ($-\delta_{OB}$) of oxygen in an oxide state of 0.35 or more and 0.55 or less.

11. The metal carrier material according to claim 9, wherein the composite oxide is a binary composite oxide consisting of a metal element A contained in the metal element L and a metal element B contained in the metal element N, wherein the general formula (3) is represented by a composition of general formula (4):

$$A_nB_{1-n}O_x \qquad (4)$$

the composite oxide having the following characteristics (a) to (d);

(a) the metal element B representing a Group 2 element that is a weakly basic element having a value of partial negative charge ($-\delta_{OB}$) of oxygen in an oxide state of 0.35 or more and 0.55 or less, (b) n of 0.001 or more and 0.300 or less, (c) an oxide of the metal element A and an oxide of the metal element B forming no solid solution, and oxide of the metal element A being deposited on surfaces of oxide particles of the metal element B, and (d) x is the number of oxygen atoms required to keep the composite oxide electrically neutral.

12. The metal carrier material according to claim 1, wherein the composite oxide is $Ba_nMg_{1-n}O_x$, where $0.001 \leq n \leq 0.300$.

13. The metal carrier material according to 12, wherein an amount of carbonate contained in the composite oxide is 10 mol % or less based on Ba.

14. The metal carrier material according to claim 2, wherein the metal element N represents a metal element that is a weakly basic element having a value of partial negative charge $(-\delta_{OB})$ of oxygen in an oxide state of 0.35 or more and 0.55 or less.

15. The metal carrier material according to claim 2, wherein the composite oxide is a binary composite oxide consisting of a metal element A contained in the metal element L and a metal element B contained in the metal element N, wherein the general formula (1) is represented by a composition of general formula (2):

$$A_nB_{1-n} \tag{2}$$

the composite oxide having the following characteristics (a) to (c);

(a) the metal element B representing a Group 2 element that is a weakly basic element having a value of partial negative charge $(-\delta_{OB})$ of oxygen in an oxide state of 0.35 or more and 0.55 or less, (b) n of 0.001 or more and 0.300 or less, and (c) an oxide of the metal element A and an oxide of the metal element B forming no solid solution, and oxide particles of the metal element A being deposited on surfaces of oxide particles of the metal element B.

16. The metal carrier material according to claim 2, wherein the general formula (1) is represented by a composition of general formula (3):

$$L_nN_{1-n}O_x \tag{3}$$

the composite oxide having the following characteristics (a) to (e):

(a) the metal element L being an oxide of any element(s) selected from the group consisting of Ba and Sr, (b) the metal element N comprising a Group 1 or Group 2 element other than the metal element L, (c) n of 0.001 or more and 0.300 or less, (d) the oxide of the metal element L and the oxide of the metal element N forming no solid solution, and oxide of the metal element L being deposited on surfaces of oxide particles of the metal element N, and (e) x is the number of oxygen atoms required to keep the composite oxide electrically neutral.

17. The metal carrier material according to claim 16, wherein the composite oxide is a binary composite oxide consisting of a metal element A contained in the metal element L and a metal element B contained in the metal element N, wherein the general formula (3) is represented by a composition of general formula (4):

$$A_nB_{1-n}O_x \tag{4}$$

the composite oxide having the following characteristics (a) to (d);

(a) the metal element B representing a Group 2 element that is a weakly basic element having a value of partial negative charge of oxygen in an oxide state of 0.35 or more and 0.55 or less, (b) n of 0.001 or more and 0.300 or less, (c) an oxide of the metal element A and an oxide of the metal element B forming no solid solution, and oxide of the metal element A being deposited on surfaces of oxide particles of the metal element B, and (d) x is the number of oxygen atoms required to keep the composite oxide electrically neutral.

18. The metal carrier material according to claim 2, wherein the composite oxide is $Ba_nMg_{1-n}O_x$, where $0.001 \leq n \leq 0.300$.

19. An ammonia synthesis catalyst comprising the metal-carrier material according to claim 2.

20. A method of producing ammonia, comprising bringing hydrogen and nitrogen into contact with a catalyst, the catalyst being the ammonia synthesis catalyst according to claim 19.

\* \* \* \* \*